US012265175B2

(12) United States Patent
Roger et al.

(10) Patent No.: US 12,265,175 B2
(45) Date of Patent: Apr. 1, 2025

(54) PROCESSING RADAR SIGNALS

(71) Applicant: Infineon Technologies AG, Neubiberg (DE)

(72) Inventors: Andre Roger, Munich (DE); Simon Achatz, Munich (DE); Dian Tresna Nugraha, Bandung (ID); Ljudmil Anastasov, Munich (DE); Markus Bichl, Feldkirchen-Westerham (DE); Mayeul Jeannin, Munich (DE); Maximilian Eschbaumer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 246 days.

(21) Appl. No.: 17/324,675

(22) Filed: May 19, 2021

(65) Prior Publication Data
US 2021/0364596 A1    Nov. 25, 2021

(30) Foreign Application Priority Data

May 20, 2020   (DE) .......................... 102020113678.1
Jun. 15, 2020   (DE) .......................... 102020115709.6
Jul. 22, 2020   (DE) .......................... 102020004411.5

(51) Int. Cl.
*G01S 7/35*      (2006.01)
*G01S 7/288*     (2006.01)
(Continued)

(52) U.S. Cl.
CPC ............ *G01S 7/354* (2013.01); *G01S 7/2883* (2021.05); *G01S 7/356* (2021.05);
(Continued)

(58) Field of Classification Search
CPC ........ G01S 7/356; G01S 7/2882; G01S 7/032; G01S 13/584; G01S 13/87
(Continued)

(56) References Cited

U.S. PATENT DOCUMENTS 7,639,171 B2 * 12/2009 Alland ..................... H01Q 3/24
                                                          342/25 R
7,787,819 B2 *  8/2010 Walker ................. H04B 7/2041
                                                          455/12.1
(Continued)

FOREIGN PATENT DOCUMENTS

CN        110646771 A       1/2020
JP      2021148733 A *      9/2021     ............. G01S 13/42

OTHER PUBLICATIONS

Wikipedia; "Constant false alarm rate"; Nov. 9, 2020; https://en.wikipedia.org/wiki/Constant_false_alarm_rate.
(Continued)

*Primary Examiner* — Vladimir Magloire
*Assistant Examiner* — Michael W Justice
(74) *Attorney, Agent, or Firm* — Eschweiler & Potashnik, LLC

(57) ABSTRACT

It is suggested to process radar signals including: (i) receiving reception signals via at least one antenna of a first receiving circuit; (ii) determining an interim result by processing the reception signals via a frequency transformation; (iii) determining an error compensation vector based on the interim result and an expected characteristic; and (iv) applying the error compensation vector on other reception signals that have been processed via the frequency transformation.

14 Claims, 32 Drawing Sheets

(51) Int. Cl.
  *G01S 13/44* (2006.01)
  *G01S 13/536* (2006.01)
  *G01S 13/58* (2006.01)
  *G01S 13/931* (2020.01)

(52) U.S. Cl.
  CPC ........ *G01S 13/4436* (2013.01); *G01S 13/536* (2013.01); *G01S 13/584* (2013.01); *G01S 13/931* (2013.01)

(58) Field of Classification Search
  USPC ................ 342/196, 165, 174, 175, 192, 195
  See application file for complete search history.

(56) References Cited

U.S. PATENT DOCUMENTS

| | | | | |
|---|---|---|---|---|
| 7,925,504 | B2 * | 4/2011 | Tsujikawa | H04R 3/005 704/233 |
| 8,270,899 | B2 * | 9/2012 | Walker | H04B 7/2041 455/12.1 |
| 8,369,445 | B2 * | 2/2013 | Hensley | H04L 1/0026 342/353 |
| 9,448,300 | B2 * | 9/2016 | Jansen | G01S 13/34 |
| 9,891,312 | B2 * | 2/2018 | Lee | G01S 13/878 |
| 10,158,436 | B2 * | 12/2018 | Shimbo | H04B 17/21 |
| 10,286,915 | B2 * | 5/2019 | Xiao | B60W 30/18154 |
| 10,389,421 | B2 * | 8/2019 | Lee | G01S 13/931 |
| 10,571,550 | B2 * | 2/2020 | Theurer | G01S 7/414 |
| 10,615,958 | B2 * | 4/2020 | Vigier | G01S 13/878 |
| 10,627,480 | B2 * | 4/2020 | Nayyar | G01S 7/03 |
| 10,644,872 | B2 * | 5/2020 | Pavao Moreira | G01S 13/878 |
| 10,656,257 | B2 * | 5/2020 | Lee | G01S 13/04 |
| 10,670,705 | B2 * | 6/2020 | Malinovskiy | G01S 7/023 |
| 10,759,446 | B2 * | 9/2020 | Motomura | B60W 60/001 |
| 10,953,850 | B1 * | 3/2021 | Pertsel | B60R 21/01538 |
| 10,956,759 | B1 * | 3/2021 | Pertsel | G06V 40/103 |
| 10,967,824 | B1 * | 4/2021 | Pertsel | B60R 21/01538 |
| 11,016,173 | B2 * | 5/2021 | Hoffman | G01S 7/4021 |
| 11,054,513 | B2 * | 7/2021 | Doaré | G01S 13/34 |
| 11,092,683 | B2 * | 8/2021 | Wu | G01S 13/584 |
| 11,105,918 | B2 * | 8/2021 | Achour | G01S 13/931 |
| 11,125,869 | B2 * | 9/2021 | Santra | G01S 13/72 |
| 11,131,749 | B2 * | 9/2021 | Loesch | H01Q 21/28 |
| 11,269,049 | B2 * | 3/2022 | Wu | G01S 13/42 |
| 11,320,526 | B2 * | 5/2022 | Salle | G01S 13/878 |
| 11,402,542 | B2 * | 8/2022 | Rothenberg | G06N 20/20 |
| 11,520,030 | B2 * | 12/2022 | Wu | G01S 13/325 |
| 11,609,305 | B2 * | 3/2023 | Dvorecki | G01S 7/4026 |
| 2008/0154592 | A1 * | 6/2008 | Tsujikawa | H04R 3/005 704/255 |
| 2009/0085800 | A1 * | 4/2009 | Alland | G01S 13/343 342/25 R |
| 2011/0109495 | A1 * | 5/2011 | Takeya | G01S 13/34 342/107 |
| 2014/0320335 | A1 * | 10/2014 | Lee | G01S 13/878 342/107 |
| 2015/0070207 | A1 * | 3/2015 | Millar | G01S 13/4454 342/174 |
| 2015/0346321 | A1 * | 12/2015 | Jansen | H03M 7/30 342/107 |
| 2016/0018511 | A1 * | 1/2016 | Nayyar | G01S 13/931 342/27 |
| 2016/0238695 | A1 * | 8/2016 | Theurer | G01S 13/958 |
| 2017/0117946 | A1 * | 4/2017 | Lee | G01S 3/72 |
| 2017/0146638 | A1 * | 5/2017 | Aoyama | G01S 7/288 |
| 2017/0254891 | A1 * | 9/2017 | Malinovskiy | G01S 13/34 |
| 2017/0338900 | A1 * | 11/2017 | Shimbo | H04B 1/06 |
| 2018/0105186 | A1 * | 4/2018 | Motomura | G08G 1/0962 |
| 2018/0128910 | A1 * | 5/2018 | Lee | G01S 13/426 |
| 2018/0172813 | A1 * | 6/2018 | Rao | G01S 13/536 |
| 2018/0201273 | A1 * | 7/2018 | Xiao | B60W 30/18163 |
| 2018/0231636 | A1 * | 8/2018 | Maher | G01S 13/87 |
| 2018/0348365 | A1 * | 12/2018 | Achour | H01Q 3/46 |
| 2019/0023208 | A1 * | 1/2019 | Boston | G06V 20/597 |
| 2019/0025403 | A1 * | 1/2019 | Hoffman | H04B 17/103 |
| 2019/0242973 | A1 * | 8/2019 | Schat | G01S 7/4021 |
| 2019/0391230 | A1 * | 12/2019 | Loesch | G01S 13/42 |
| 2020/0003862 | A1 * | 1/2020 | Doaré | H04L 7/065 |
| 2020/0003882 | A1 * | 1/2020 | Salle | H04L 27/0008 |
| 2020/0003883 | A1 * | 1/2020 | Doaré | G01S 13/878 |
| 2020/0007309 | A1 * | 1/2020 | Vigier | H04L 27/0008 |
| 2020/0007310 | A1 * | 1/2020 | Pavao Moreira | H04L 7/065 |
| 2020/0116850 | A1 * | 4/2020 | Santra | A61B 5/0507 |
| 2020/0132812 | A1 * | 4/2020 | Dvorecki | G01S 13/931 |
| 2020/0132884 | A1 * | 4/2020 | Rothenberg | G06N 5/04 |
| 2020/0233061 | A1 * | 7/2020 | Lang | B60W 40/02 |
| 2020/0300965 | A1 * | 9/2020 | Wu | G01S 7/2883 |
| 2020/0300995 | A1 * | 9/2020 | Wu | G01S 7/41 |
| 2020/0301002 | A1 * | 9/2020 | Wu | G01S 7/41 |
| 2021/0011121 | A1 * | 1/2021 | Arbabian | G01S 7/411 |
| 2021/0293921 | A1 * | 9/2021 | Yomo | G01S 7/038 |
| 2021/0382169 | A1 * | 12/2021 | Achour | H01Q 3/24 |
| 2021/0405183 | A1 * | 12/2021 | Vossiek | G01S 13/003 |
| 2022/0099817 | A1 * | 3/2022 | Crouch | G01S 7/354 |

OTHER PUBLICATIONS

European search report dated Feb. 4, 2022 for European application No. 21174760.5.

\* cited by examiner

PROCESSING RADAR SIGNALS

REFERENCE TO RELATED APPLICATION

This application claims priority to German Application No. 10 2020 004 411.5 filed on Jul. 22, 2020 which claims priority to German Application No. 10 2020 115 709.6 filed on Jun. 15, 2020, which claims priority to German Application No. 10 2020 113 678.1 filed on May 20, 2020, the contents of which are hereby incorporated by reference in their entirety.

FIELD

Embodiments of the present disclosure relate to radar applications, in particular an efficient way to process radar signals obtained by at least one radar sensor, e.g., via at least one antenna. Processing radar signals in this regard in particular refers to radar signals received by a sensor or an antenna.

BACKGROUND

Several radar variants are used in cars for various applications. For example, radar can be used for blind spot detection (parking assistant, pedestrian protection, cross traffic), collision mitigation, lane change assist and adaptive cruise control. Numerous use case scenarios for radar appliances may be directed to different directions (e.g., back, side, front), varying angles (e.g., azimuth direction angle) and/or different distances (short, medium or long range). For example, an adaptive cruise control may utilize an azimuth direction angle amounting to ±18 degrees, the radar signal is emitted from the front of the car, which allows a detection range up to several hundred meters.

A radar source emits a signal and a sensor detects a returned signal. A frequency shift between the emitted signal and the detected signal (based on, e.g., a moving car emitting the radar signal) can be used to obtain information based on the reflection of the emitted signal. Front-end processing of the signal obtained by the sensor may comprise a Fast Fourier Transform (FFT), which may result in a signal spectrum, i.e. a signal distributed across the frequency. The amplitude of the signal may indicate an amount of echo, wherein a peak may represent a target that needs to be detected and used for further processing, e.g., adjust the speed of the car based on another car travelling in front.

A radar processing device may provide different types of outputs, e.g., a command to a control unit, an object or an object list to be post-processed by at least one control unit, at least one FFT peak to be post-processed by at least one control unit. Utilizing FFT peaks enables high performance post processing.

Constant false alarm rejection (CFAR), also referred to as constant false alarm rate, is in particular known as a threshold method for FFT result analysis which may be based on a signal power. CFAR allows adapting a threshold to decide whether the FFT signal indicates a potential target. CFAR in particular considers background noise, clutter and interference. Several CFAR algorithms are known. For details, reference is made to http://en.wikipedia.org/wiki/Constant_false_alarm_rate.

SUMMARY

The objective is to improve existing solutions and in particular to efficiently process signals in a radar system.

This problem is solved according to the features of the independent claims. Further embodiments result from the depending claims.

The examples suggested herein may in particular be based on at least one of the following solutions. In particular combinations of the following features could be utilized in order to reach a desired result. The features of the method could be combined with any feature(s) of the device, apparatus or system or vice versa.

A method is provided for processing radar signals comprising:
  receiving reception signals via at least one antenna of a first receiving circuit;
  determining an interim result by processing the reception signals via a frequency transformation;
  determining an error compensation vector based on the interim result and an expected characteristic;
  applying the error compensation vector on other reception signals that have been processed via the frequency transformation.

The reception signals are processed via the frequency transformation to interim results. These interim results are used to determine the error compensation vector. The error compensation vector is then applied to other reception signals or reception signals of different shape or format that have been processed via the frequency transformation. These other reception signals may also be used to further improve or adjust the error compensation vector, which may then be utilized for subsequently processing additional (further) reception signals.

As an option, the method can be run in a vehicle, in particular in a car.

According to an embodiment, the frequency transformation comprises at least one of the following:
  a Fourier transformation;
  a wavelet transformation.

The Fourier transformation may in particular be a fast Fourier transformation (FFT). The Fourier transformation may be a first, second or third stage FFT.

According to an embodiment, the interim result is based on a peak of a second stage FFT and/or a coherent or a non-coherent integration and/or a CFAR processing.

According to an embodiment, applying the error compensation vector on other reception signals comprises applying the error compensation vector to at least a portion of the data cube containing digitized reception signals.

According to an embodiment, the expected characteristic is determined based on remote data and/or an intrinsic signal characteristic of the signal in one or several of the dimensions angle, range and Doppler range.

According to an embodiment, remote data comprises at least one of the following:
  data resulting from radar signal processing, in particular of a different radar system or MMIC;
  data referring an criterion indicating which portions of the memory/data cube are to be considered when computing the error compensation vector;
  data indicating characteristics and/or configuration information;
  initialization values based on which the error compensation vector is determined;
  offset information.

The criterion may be an address information, index or threshold towards a memory and/or a radar data cube.

According to an embodiment, the error compensation vector is determined based on at least one of the following:
- a signal linearity,
- a signal invariability,
- an anticipated signal behavior in at least one of the dimensions angle, range and Doppler range.

According to an embodiment, the error compensation vector is updated on a regular or an irregular basis and/or based on a trigger.

According to an embodiment, the error compensation vector is determined via at least one of the following:
- a machine-learning algorithm;
- an optimization algorithm;
- a self-adaptive algorithm;
- an interpolation algorithm;
- a fitting model algorithm.

According to an embodiment, the error compensation vector is determined for phase errors, amplitude errors and/or gain errors.

According to an embodiment, the error compensation vector is determined based on a history buffer utilizing local and/or remote data.

According to an embodiment, at least a portion of the error compensation vector is implemented to adjust the configuration of at least one device of the radar system, in particular at least one MMIC.

It is an option that the error compensation vector is applied to at least one previous interim result.

According to an embodiment, determining the error compensation vector can be switched on or off based on an acquisition mode.

This acquisition mode may be used for, e.g., beam steering and/or modulation purposes.

According to an embodiment, the error compensation vector is determined in a first mode and the determined error compensation vector is applied in a second mode, wherein the second mode is triggered after the first mode.

At least one type of trigger may be used to switch between the first mode and the second mode. At least one first type of trigger may be used to switch from the first mode to the second mode and a second type of trigger may be used to switch from the second mode to the first mode. The first type of trigger and the second type of trigger may be the same or they may be different types of triggers. The first type of trigger and/or the second type of trigger may be activated by at least one component of the radar system. It may be the actual processing unit or MMIC or a unit external to the actual processing unit. The error compensation vector is computed using the effects of errors rather than having to know and counteract the reason for each individual error.

According to an embodiment, the error compensation vector is further determined based on
- at least a portion of the error compensation vector, and/or
- an information for the computation, adjustment or utilization of the error compensation vector received from an external device.

According to an embodiment, the method further comprises:
- at a first radar device,
  - receiving reception signals via at least one antenna of a first receiving circuit;
  - determining an interim result by processing the reception signals via a frequency transformation;
  - providing at least the interim result to a second radar device;
- at the second radar device,
  - determining an error compensation vector based on at least the interim result and an expected characteristic;
  - providing the error compensation vector to the first radar device;
- at the first radar device, applying the error compensation vector on other reception signals that have been processed via the frequency transformation.

Also, a device is suggested for processing radar signals comprising, wherein the device is configured to conduct the acts of the method as described herein.

Further, a radar system is provided comprising a first radar device and a second radar device,
- wherein the first radar device is configured to conduct the acts:
  - receiving reception signals via at least one antenna of a first receiving circuit;
  - determining an interim result by processing the reception signals via a frequency transformation;
  - providing at least the interim result to a second radar device;
- wherein the second radar device is configured to conduct the acts:
  - determining an error compensation vector based on at least the interim result and an expected characteristic;
  - providing the error compensation vector to the first radar device;
- wherein the first radar device is further configured to conduct the act:
  - applying the error compensation vector on other reception signals that have been processed via the frequency transformation.

In addition, a vehicle is suggested comprising at least one device and/or at least one system as described herein.

Also, a computer program product is suggested, which is directly loadable into a memory of a digital processing device, comprising software code portions for performing the acts of the method as described herein.

DETAILED DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Figure 1:
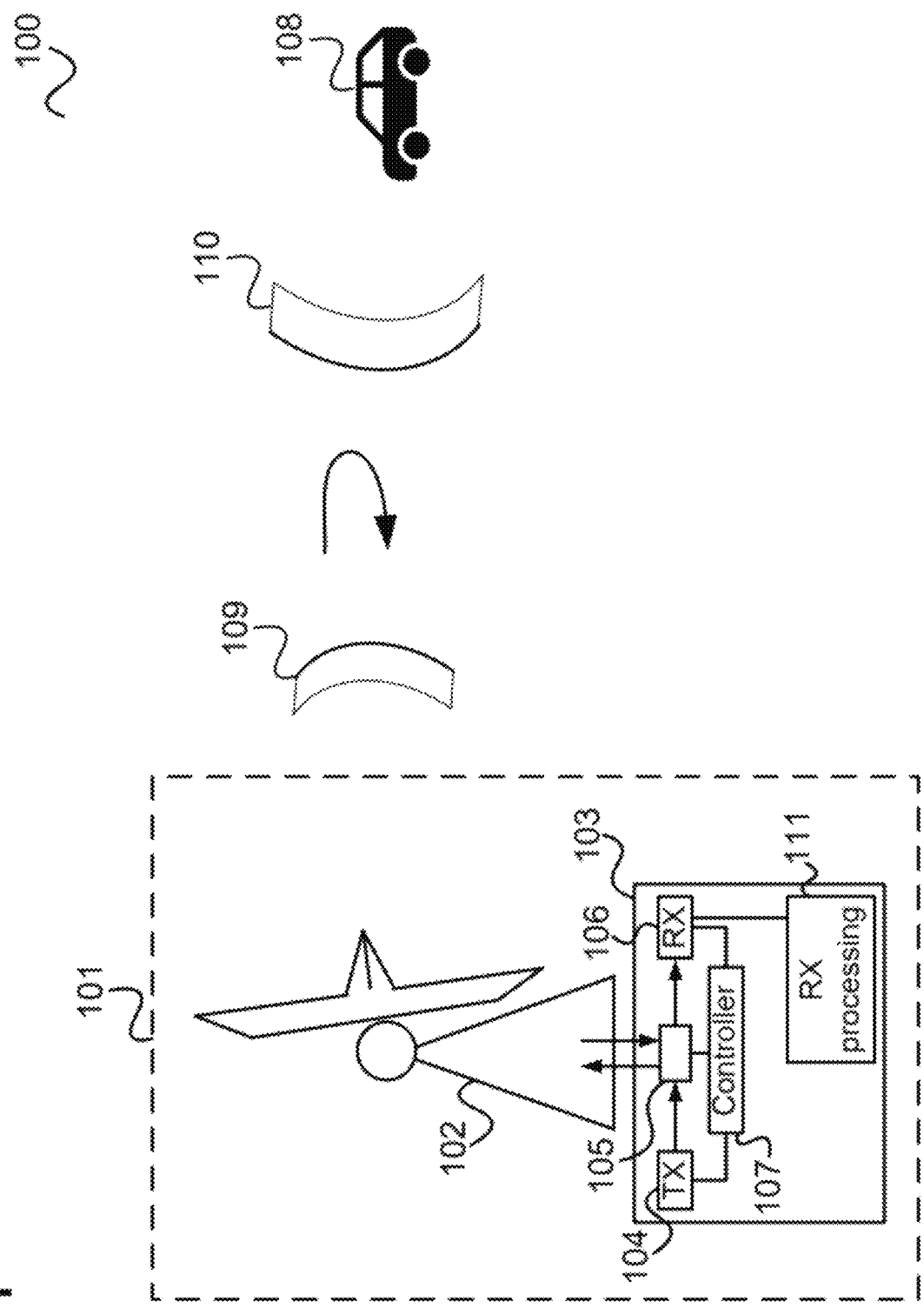
FIG. 1 shows a radar arrangement.

FIG. 1 shows a radar arrangement 100. The radar arrangement 100 includes a radar device 101 that includes an antenna arrangement 102 and a radar control device 103. The radar control device 103 includes one or more (radar) transmitters 104, a duplexer 105 (i.e. a circuit to separate transmitted signals from received signals), a (radar) receiver 106 and a controller 107. The radar arrangement, although illustrated as a dish here, may include multiple transmit antennas in form of a transmit antenna array and multiple receive antennas in form of a receive antenna array.

For the detection of an object 108, the controller 107 controls the one or more transmitters 104, the duplexer 105 and the receiver 106 as follows: The one or more transmitters 104 transmit a transmit signal 109 via the antenna arrangement 101 and the transmit signal 109 is reflected by a target, e.g., the object 108. The radar device 101 receives the echo 110 of the transmitted signal.

From the received signal, the radar control device 103 (e.g. a radar signal processing circuit 111) determines information about, e.g., position and speed of the object 108.

It should be noted that while in the radar arrangement 100 of FIG. 1 the radar device 101 is illustrated as a (big) stationary installment detecting a large object 108 like the illustrated vehicle, a radar device 101 may also be mobile, smaller and/or used to detect smaller objects. For example, a radar device may be installed in a vehicle for detection of objects in the vicinity of the vehicle, which may be advantageous for assisted driving functions, e.g., (semi-)autonomous driving.

The transmit signal 109 may include a plurality of pulses. Pulse transmission includes the transmission of short high-power bursts in combination with times during which the radar device 101 listens for echoes 110. This, however, may not be optimal for a highly dynamic situation like assisted or autonomous driving.

Therefore, a continuous wave (CW) may instead be used as transmit signal. Since a continuous wave only allows velocity determination, but does not provide range information (due to the lack of a time mark that could allow distance calculation) an approach is frequency-modulated continuous wave (FMCW) radar.

Figure 2:
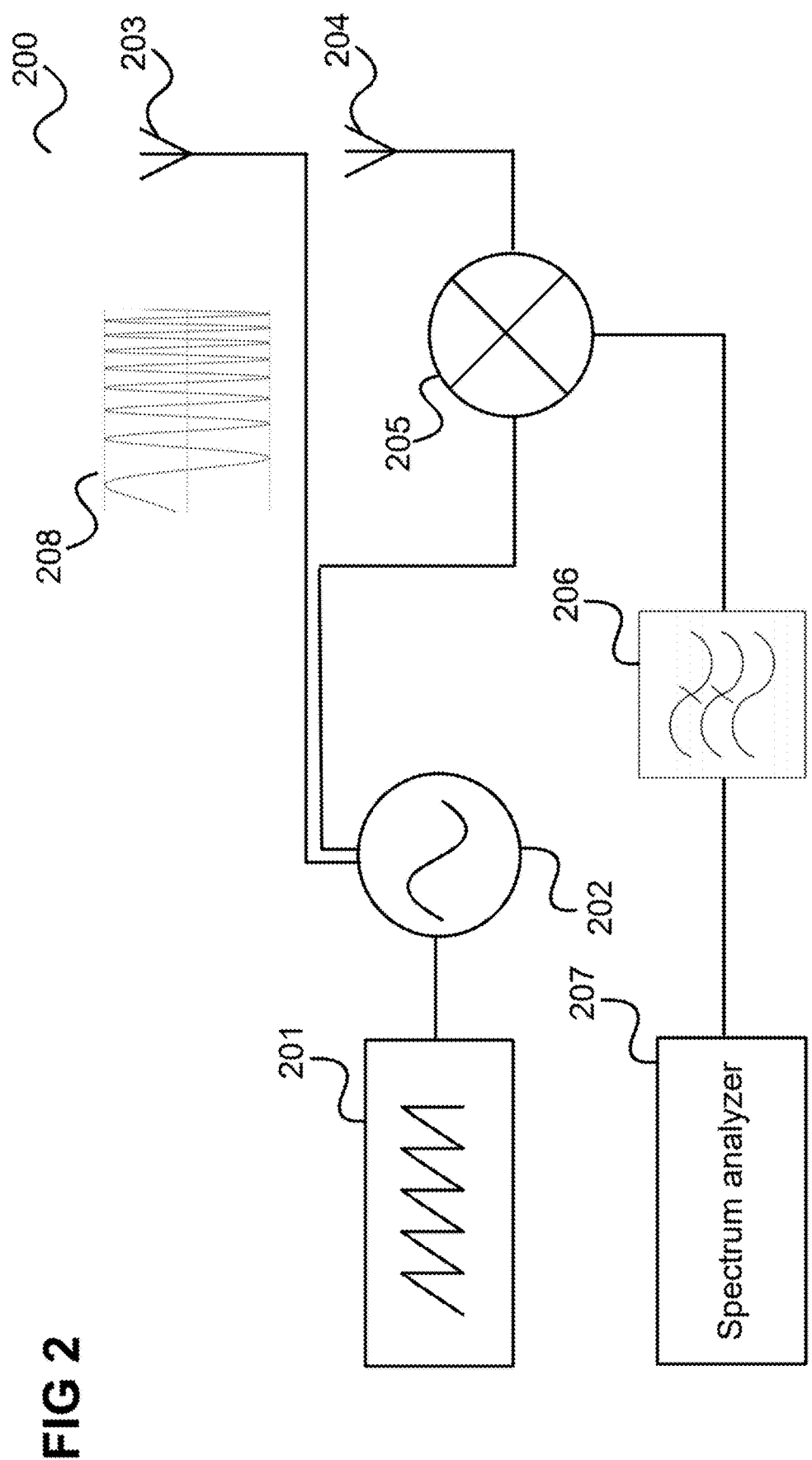
FIG. 2 illustrates a frequency-modulated continuous-wave (FMCW) radar system.

FIG. 2 illustrates an example FMCW radar system 200. In an FMCW radar system, rather than sending a transmit signal with a constant frequency, the frequency of the transmit signal is periodically ramped up and reset according to a sawtooth (or alternatively a triangle) waveform 201. The sawtooth waveform 201 frequency-modulates an oscillator 202 and the resulting transmit signal is fed to a transmit antenna 203.

A receive antenna 204 receives the echo of the transmit signal (in addition to noise etc.) as receive signal. A mixer 205 mixes the transmit signal with the receive signal. The result of the mixing is filtered by a low pass filter 206 and processed by a spectrum analyzer 207.

The transmit signal has the form of a sequence of chirps, which are a result of the modulation of a sinusoid with the sawtooth waveform 201. One single chirp 208 corresponds to the sinusoid of the oscillator signal frequency-modulated by one "tooth" of the sawtooth waveform 201 from the minimum frequency to the maximum frequency.

As will be described in detail further below, the spectrum analyzer 207 (e.g. implemented by radar signal processing circuit 111) performs two FFT (Fast Fourier Transform) stages to extract range information (by a first stage FFT) as well as velocity information (by a second stage FFT) from the receive signal. The spectrum analyzer 207 may work on digital samples so an A/D (analog-to-digital) conversion is included in the path from the receive antenna 204 to the spectrum analyzer 207. For example, the filter 206 is an analog filter and an analog-to-digital converter (ADC) is arranged between the filter 206 and the spectrum analyzer 207.

To further allow determination of a direction (of movement) of the object 108 with respect to the radar device 101, the antenna arrangement 101 may include a plurality of receive antennas, i.e. an array of receive antennas. The direction of an object 108 may then be determined from phase differences by which the receive antennas receive an echo from an object 110. Accordingly, a radar receiver may include a mixer 205, an analog filter 206 and an ADC for each receive antenna.

The signals received by a plurality of antennas may be processed by means of an MMIC (Monolithic Microwave Integrated Circuit). Since the number of receive signals that an MMIC may process in parallel is limited (and thus an MMIC can only serve a limited number of receive antennas), multiple MMICs may be cascaded to allow using a higher number of receive antennas and thus improve angular resolution of the radar device 101.

Figure 3:
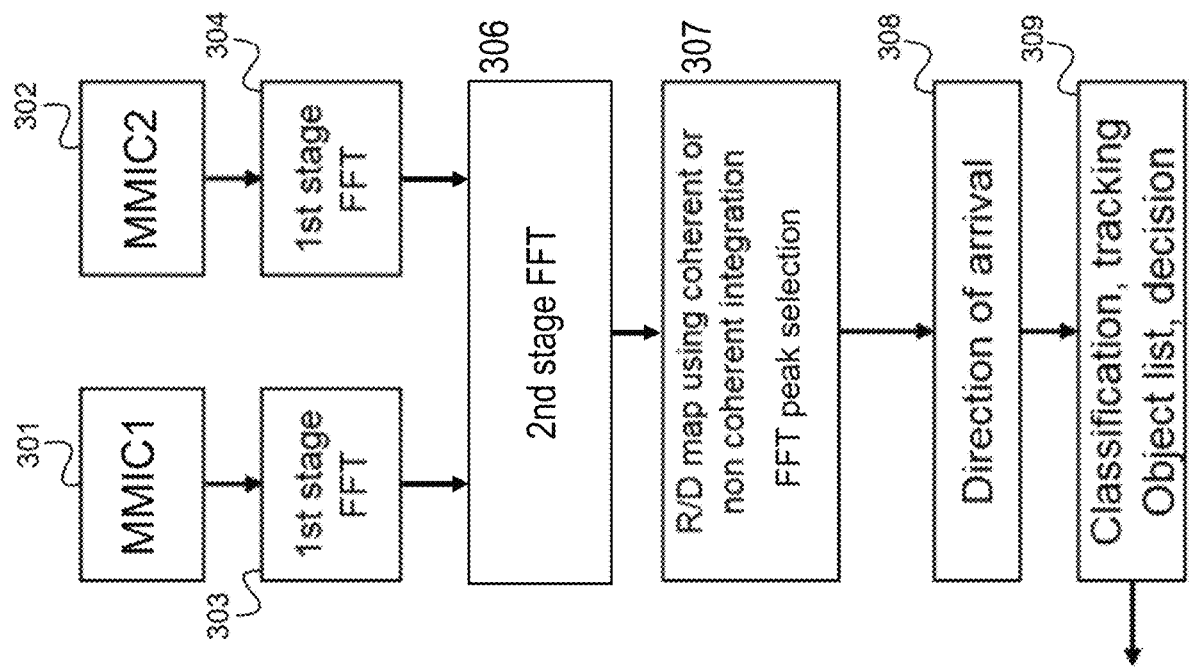
FIG. 3 illustrates the processing of radar receive signals using two monolithic microwave integrated circuits (MMICs).

FIG. 3 illustrates the processing of radar receive signals exemplarily using two MMICs 301, 302. The MMICs 301, 302 may be part of the receiver 106. Each MMIC 301, 302 is coupled with a plurality of antennas and is supplied with received signals from the respective plurality of antennas. The MMICs 301, 302 perform processing of the received signals like amplification, frequency down conversion (i.e. for example the functionality of mixer 205 and filter 206) and A/D conversion. The MMICs may also implement the duplexer 105, i.e. may be configured to separate transmission signals from reception signals. Each MMIC 301, 302 supplies the resulting digitized receive signals to a respective first FFT (Fast Fourier Transform) stage 303, 304. Based on the outputs of the second FFT stage 306 the radar signal processing circuit 111 determines range information as well as velocity information (e.g. in form of a R/D (range/Doppler) map) for one or more objects in act 307.

The second stage FFT 306 goes over the result of the first FFT stages 303, 304 over multiple chirps, for each range bin, generating, per range bin, a complex value for each Doppler bin. For multiple-input-multiple-output (MIMO) radar systems, the result of the second FFT stage 306 includes, for each virtual antenna, a complex value for each combination of Doppler bin and range bin (i.e. for each Doppler/range bin). It is known that a MIMO radar system comprises a number of M transmitters and a number of N receivers, which results in M×N signals representing a number of N×M virtual antennas. This provides an antenna-specific R/D map.

To generate an aggregate R/D map, the MMIC-specific R/D maps are combined, e.g., by means of coherent or non-coherent integration. The velocity and range of specific objects may then be estimated by identifying peaks in the R/D map utilizing, e.g., a CFAR (Constant False Alarm Rate) algorithm. As an FFT output consists in general of complex values, a peak selection in an FFT output (such as the aggregate R/D map) may be understood as a selection based on absolute values (i.e. complex magnitudes of the complex outputs) or power (i.e. squares of absolute values).

At 308, the radar signal processing circuit 111 may further determine the direction of at least object. This may be achieved based on phase differences of the output values of the second stage FFT between different (in particular virtual) receive antennas.

Based on the results obtained so far, further processing such as object classification, tracking, generation of an object list and/or decision-making (e.g. in assisted, in particular autonomous driving scenarios) may be performed in act 309. Such further processing may be conducted by a further component such as a vehicle controller.

In the example use case utilizing two MMICs 301, 302, the data cube containing the digitized receive signals for all receive antennas may be split into two parts, one for each MMIC 301, 302.

Figure 4:
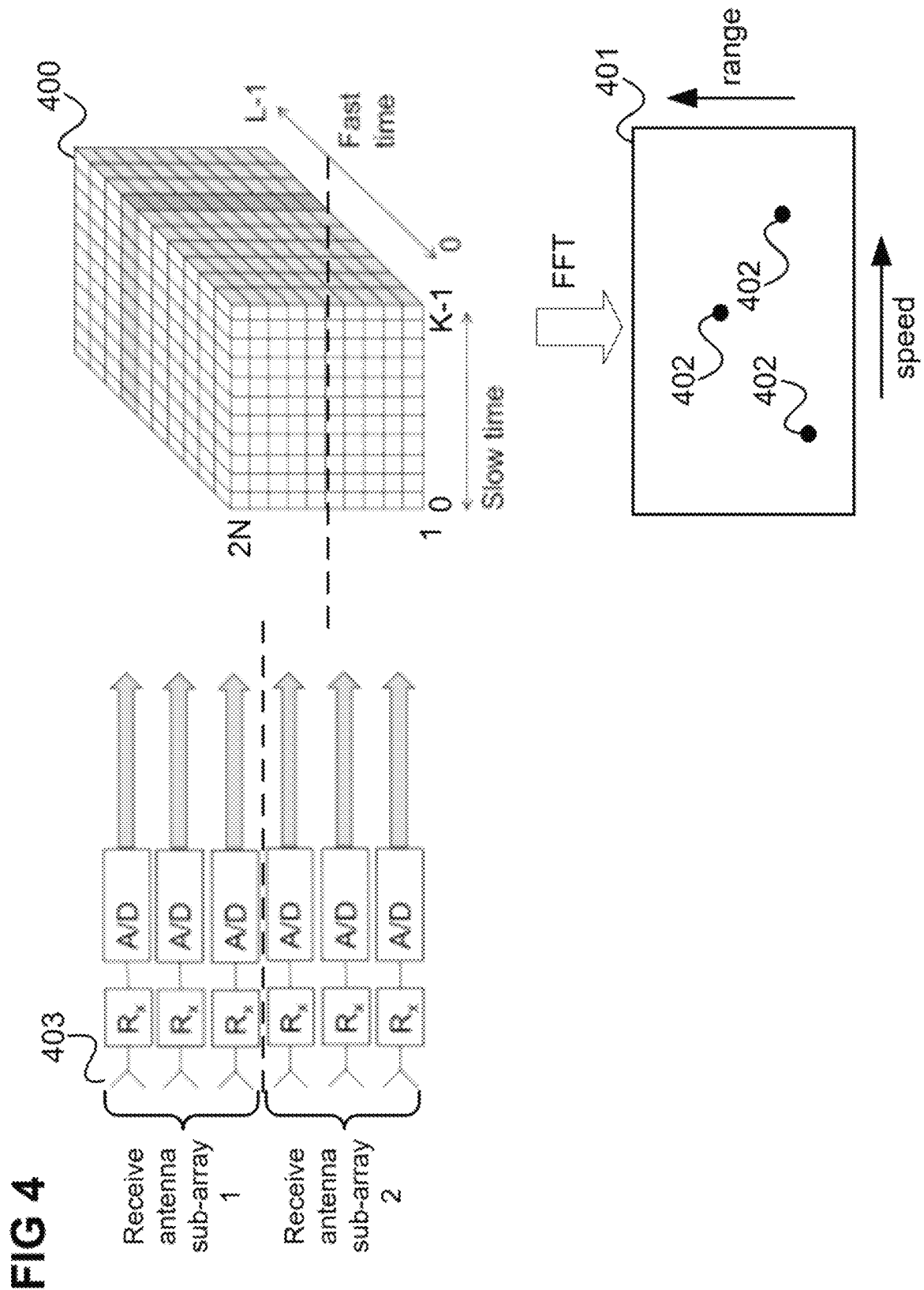
FIG. 4 shows a data cube.

FIG. 4 shows an example illustration of a data cube 400. The data cube 400 includes digitized samples of receive signals from M antennas forming a receive antenna array 403 divided into two receive antenna sub-arrays in particular in case a single transmitter is used.

In fact, in case of the single transmitter there are N1 antennas in a first subarray and N2 antennas in a second subarray. M indicates the number of antennas of both subarrays, i.e.

$$M=N1+N2.$$

For example, the first MMIC 301 processes receive signals received by the first receive antenna sub-array and the second MMIC 302 processes receive signals received by the second receive antenna sub-array. In particular, the MMICs 301, 302 perform analog/digital conversion to generate the digitized samples.

For example, for each chirp (e.g., K=64 chirps), the received signal is sampled to have L samples (e.g. L=512).

The L samples collected for each chirp are processed by the respective first stage FFT 303, 304.

The first stage FFT is performed for each chirp and each antenna so that the result of the processing of the data cube 400 by the first stage FFT 303, 304 has again three-dimension and may have the size of the data cube 400 but does no longer have values for L sampling times but instead values for L range bins. It is noted that usually only the 0 to L/2 range bins may be useful, as the spectrum of the first stage FFT is mirrored at L/2 and the second half may be discarded.

The result of the processing of the data cube 400 by the first stage FFT 303, 304 is then processed by the second stage FFT 306 along the chirps (for each virtual antenna and for each range bin).

The dimension of the first stage FFT is referred to as fast time, whereas the dimension of the second stage FFT is referred as slow time (direction of the chirps). In other words, L is denoted as sample dimension (fast time), K is denoted as chirp dimension (slow time) and M is denoted as antenna dimension.

The result of the second-stage FFT gives, for each virtual antenna, a range/Doppler map, which, when aggregated over the virtual antennas (e.g., using NCI (non-coherent integration) to improve the signal-to-noise ratio and have higher probability of detection), results in a range/Doppler (R/D) map 401 which has FFT peaks 402, i.e. peaks of FFT output values (in terms of absolute values) for certain range/speed combinations (i.e. for certain range/Doppler bins) which the radar signal processing circuit 111 expects to correspond to detected object(s) 108 (of a certain range and speed).

In a practical use case, phase errors between multiple cascaded MMICs 301, 302 add phase errors to the second stage FFT results between different virtual antennas that cause a loss of angular precision or even a loss of sensitivity. Reasons for phase errors between MMICs are further illustrated with regard to FIG. 5.

Figure 5:
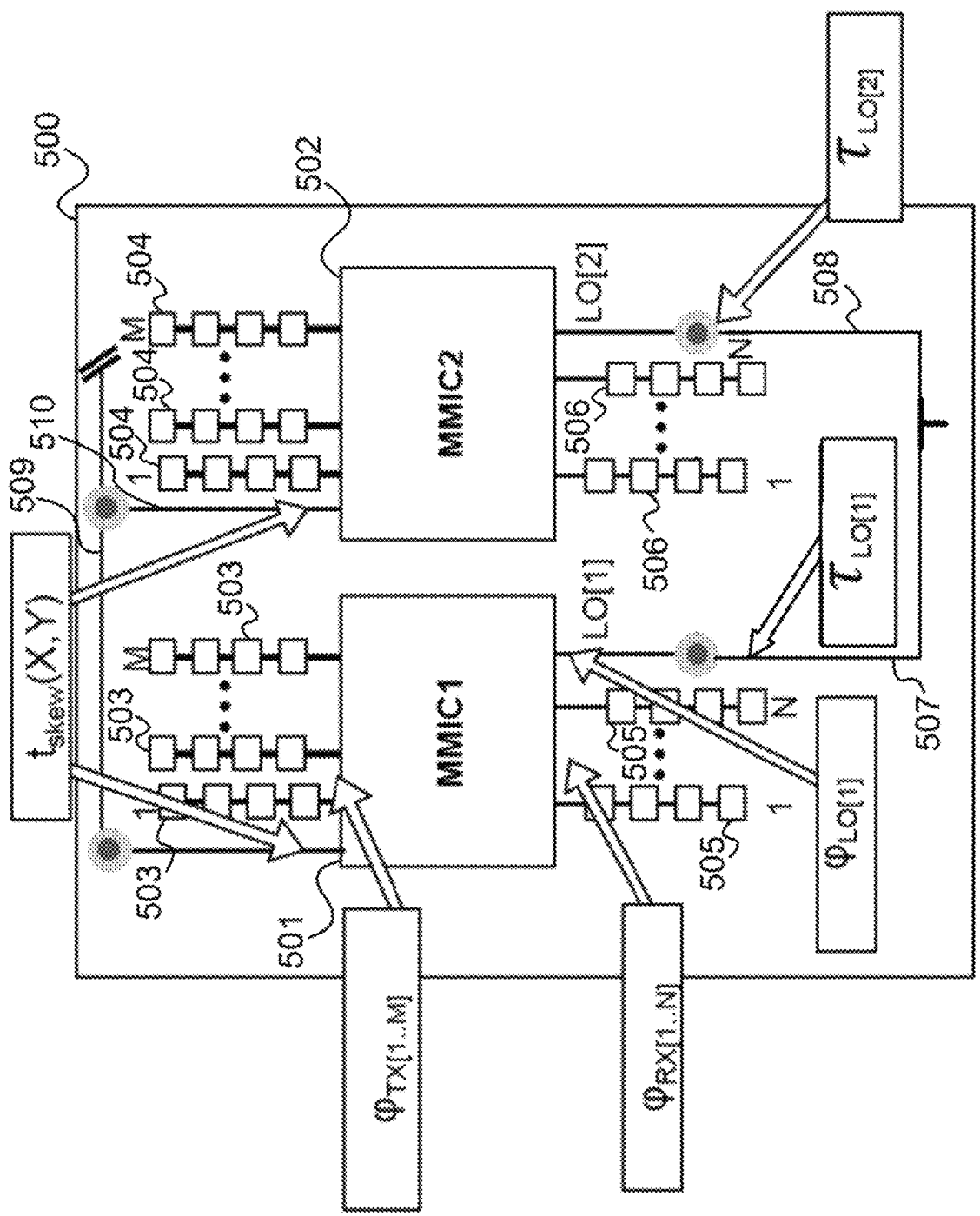
FIG. 5 shows a printed circuit board including two MMICs.

FIG. 5 shows a printed circuit board 500 including two MMICs 501, 502. Each MMIC 501, 502 is coupled with M transmit antennas 503, 504 and N receive antennas 505, 506.

In this example N=M=4, i.e. each MMIC 501, 502 has four transmit channels and four receive channels.

The MMICs are provided with an oscillator signal (e.g., for frequency down conversion purposes) from a local oscillator (LO; not shown) via a respective LO path and with an ADC clock from a clock generator (not shown) via a respective clock path 509, 510.

Phase errors between the MMICs 501, 502 may arise due to the following reasons.

1. A phase drift between channels of the MMICs 501, 502: Internal RF blocks of the MMIC 501, 502 have a temperature dependent behavior which changes the phases of the antennas ($\varphi_{TX[1 \ldots M]}$, $\varphi_{RX[1 \ldots N]}$) with respect to the local oscillator signal.

2. Different time delays on LO paths 507, 508 between MMICs 501, 502:
Different time delays $\tau$ in the LO paths 507, 508 cause different offsets $\Delta f_{IF}$ for RX/TX combinations in beat frequency $f_{IF}$. The frequency offsets for the RX/TX combinations are denoted as $\Delta f_{IF\_RX\_TX}(T_{LO})$. Target reflections might occur on different range bins.

3. ADC clock skew between the MMICs 501, 502:
A constant ADC clock skew $t_{skew}(X, Y)$ between MMIC[X] and MMIC[Y] causes range-dependent phase shift of the IF signals $\Delta \varphi_{IF\_RX}(t_{skew})$. If not considered in digital signal processing, the signal $\Delta \varphi_{IF\_RX}$ contributes to the total phase drift and thus effects the accuracy of the angle estimation.

While delay differences of the LO paths 507, 508 between the MMICs 501, 502 can be reduced by design tools (e.g., by length matching when designing LO distribution to reduce phase error between MMICs), other delays (related to differences between MMIC dices) cannot be easily compensated.

Delay may be compensated focusing on time domain, at the level of ADC samples (e.g., at MMIC 301, 302 output level) or at alternative locations like first stage FFT 303, 304 output level or second stage FFT 306 output level. This may be performed using compensation values that have been pre-computed through calibration. However, pre-computed calibration values may not suffice in all conditions, e.g., due temperature variation or general fluctuation(s) over time. A local compensation conducted during the life time of the radar device may allow determining an error compensation vector (i.e. one or more compensation values) based on measurements of temperature, voltage etc. However, such approach is limited to a knowledge of average silicon variations and does not account for outliers. Hence, such compensation can only mitigate a portion of potential real-world error(s).

Hence, delay or phase error compensation need to be improved. For example, phase correction (i.e. phase error correction) may be conducted at a later stage than the stage of the ADC sample level, when an FFT stage or multiple FFT stages have provided a gain (hence, after the first stage FFT 303, 304 or after the second stage FFT 306). Then, according to various embodiments, as having a reasonable gain, one or more FFT peaks (of the aggregate R/D map) can be determined, selected (e.g., by the radar signal processing circuit 111) according to at least one of the following criteria:

ensure that FFT peaks are from multiple parts of the range/Doppler map;
select at least one of the highest FFT peaks.

The radar signal processing circuit 111 may analyze FFT peaks according to the origin of the data used to compute the FFT (for example per MMIC 301, 302 and for a given set of transmitters 104 or transmit antennas). The radar signal processing circuit 111 then uses this analysis to compute a correction vector between FFT bins (e.g., containing FFT output values per MMIC 301, 302 and for a given set of transmitters 104 or transmit antennas, e.g., associated with the MMIC 301, 302).

The analysis can be done using a technique which may be implemented in software and/or hardware. The technique may comprise linear interpolation or use a neural network. The radar signal processing circuit 111 may then apply the error compensation vector to the detected peaks of the range/Doppler map or even all areas indicated by the range/Doppler map (e.g., to the second stage FFT output values in other areas of the range/Doppler map besides the FFT peak whose values have been used for computing the compensation value). In case the radar signal processing circuit 111 determines multiple error compensation vectors, each for a respective FFT peak, it may average the error compensation vectors to generate an averaged error compensation vector before applying it to other areas of the range/Doppler map.

Figure 6:
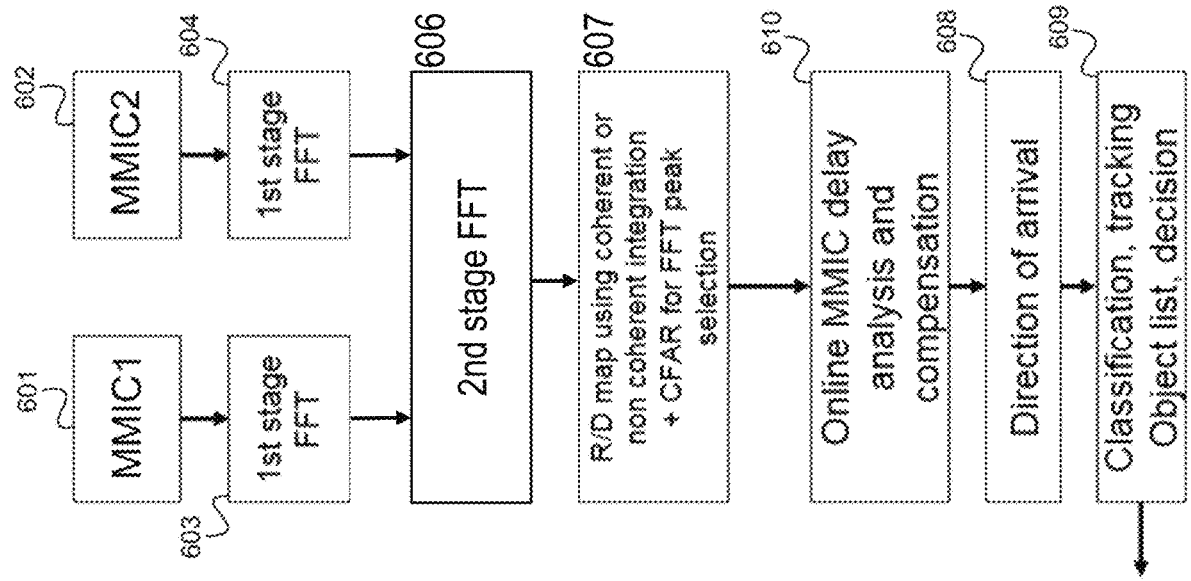
FIG. 6 illustrates the processing of radar receive signals using two MMICs including MMIC phase error compensation.

FIG. 6 shows a diagram illustrating the processing of radar receive signals using two MMICs 601, 602 utilizing MMIC phase error compensation.

Similar to what has been noted with regard to FIG. 3, the processing shown in FIG. 6 includes FFT stages 603 to 606, an R/D map determination 607, a direction of arrival determination 608 and a further processing 609.

In addition to the processing described in FIG. 3, the processing of FIG. 6 further includes act 610 conducting online MMIC delay analysis and compensation, i.e. phase error compensation as exemplarily described herein.

According to various embodiments, a phase difference $\Delta \varphi$ between two MMICs 601, 602 may be corrected by conducting the following acts:

1) Compute aggregate range-Doppler map 401.
2) Find FFT peaks 402 in the range-Doppler map 401.
3) Select strongest FFT peak 402. Compile second stage FFT output for each virtual antenna of the range/Doppler bin of the selected FFT peak. These values (hereinafter also referred to as "samples") of the strongest FFT peak 402 are used as reference for the compensation.
4) Find at least one error compensation vector (phase shift), e.g., by at least one of the following approaches:
   a) finding a preferable (improved, optimized or optimal) line by utilizing the least squares method, which indicates the phase shift between groups of samples (i.e. between samples of virtual antennas across different MMICs).
   b) utilize a different methods, e.g., a neural network, trained to find an error compensation vector for the sets of samples as input.
5) Apply phase shift on other peaks 402 (i.e. on samples of other FFT peaks 402).

In other words, information coming from the result of the processing of the reception signals done by the MMICs may be used to compute an error compensation vector (also referred to as error compensation vector). This error compensation vector is then used to compensate the results of any radar signal processing.

Error Compensation Vector

It is noted that some embodiments as described herein refer to using at least two MMICs. However, it is emphasized that the concept addressed herein may in particular apply to a single MMIC or to several MMICs, even if the other MMICs merely have transmitters, but no receive channels.

It is further noted that the solutions described throughout this application may refer to a compensation of phase errors or other errors like amplitude errors on the transmission channel, gain error on the receive channel, etc.

Any compensation of errors may refer to a partial or full compensation of at least one type of error, in particular different types of errors.

It is also noted that any "correction" or "compensation" of errors as mentioned herein may relate to any partial or full correction or any reduction or mitigation of at least one error. It is important to note that the error correction may not have to fully correct an error to unfold under the inventive concepts.

In case of multiple errors, each error contributes to an overall error that needs to be compensated. For example, an error in a radar receiver experiences error contributions from a multitude of components, e.g., an antenna of a transmitter, an antenna of the receiver, a modulator at the transmitter, and a receiver array group delay (due to the local oscillator and/or due to filters).

Examples described throughout this application may in particular refer to a compensation of errors or dynamic calibration of a radar system or a portion of a radar system.

Examples described herein provide a solution that works on the effect(s) of the errors (in particular of the overall error which may be the combination of many—partially unknown or difficult to determine—single errors). Advantageously, the reasons for each single error and its (exact) contribution to an erroneous result (e.g., signal) does not have to be known in detail or in advance for the compensation to work efficiently. Instead, the solutions described herein determine an analysis of at least one interim result and then compute an error compensation vector (also referred to as "compensation vector" or "calibration vector") based on the analysis of the at least one interim result and an expected (ideal) characteristic. This error compensation vector is then applied on subsequent radar signals to obtain an error compensated result.

Figure 21:
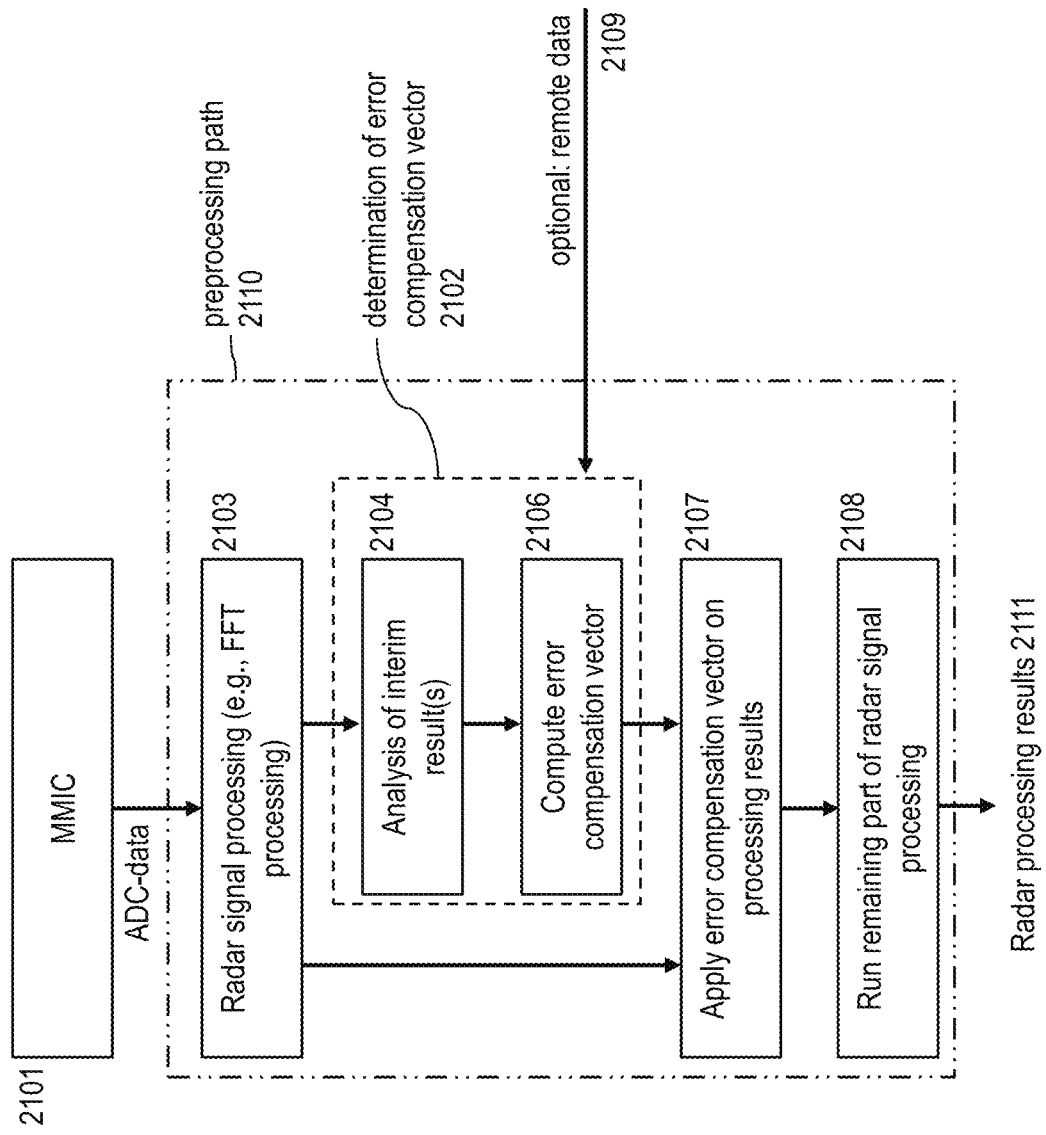
FIG. 21 shows an example block diagram comprising acts to be conducted by a radar system in order to provide error-compensated signal processing

FIG. 21 shows an example block diagram comprising acts to be conducted by a radar system in order to provide error-compensated signal processing.

Analog-to-digital converted (ADC) data are provided by an MMIC 2101 to a preprocessing path 2110, which comprises a radar signal processing act 2103. The radar signal processing act 2103 may in particular allow selecting a peak in the signal that may indicate an object in the field of view of the radar system. Such peak may be selected, e.g., after second stage FFT and/or coherent or non-coherent integration and/or CFAR processing. The output of the radar signal processing act 2103 is conveyed to a block 2102, which computes an error compensation vector.

The error compensation vector is then applied in act 2107 to results of the radar signal processing act 2103 thereby (partially or fully) compensating any error that affected the signal processing act 2103 or any other prior act. In other words, the error compensation vector can be applied to at least a portion of the data cube to improve the results of the radar signal processing.

In a subsequent act 2108, any further radar signal processing can be conducted with reduced error leading to an improved detection and thus performance of the radar system.

The acts/blocks 2103, 2102, 2107 and 2108 are part of the preprocessing path 2110.

The output of the preprocessing path 2110 radar processing results 2111.

The block 2102 determines the error compensation vector: A portion of the output of the radar signal processing act 2103, referred to as "interim result(s)", is analyzed in act 2104. It may be an option to select a suitable interim result (e.g., in the frequency domain), e.g., a portion of the processed signal that shows a clear peak or a peak structure that has a predetermined characteristic or pattern. One example is a single peak that indicates the presence of a single object detected in the processed radar data. Details of the predetermined characteristic and how to select a suitable interim result will be described in more detail below.

The suitable interim result may further be compared with an expected (ideal) characteristic to compute the error compensation vector in act 2106. It is an option that the determination of the error compensation vector utilizes remote data 2109 that may be supplied from at least one external entity, e.g., an external electronic control unit (ECU).

It is noted that the act 2106 computing the error compensation vector may be run every acquisition, every n-th acquisition, periodically or sporadically. It may be triggered based on a timer or in case a threshold reaches, exceeds or falls below a predetermined threshold.

Figure 25:
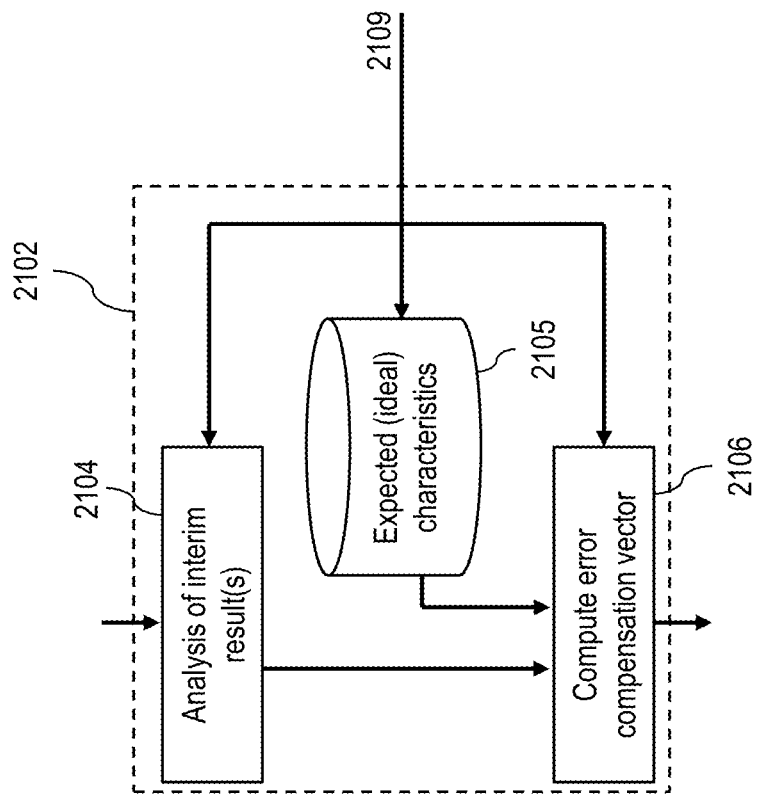
FIG. 25 shows a block diagram of an example implementation of the block determining the error compensation vector.

FIG. 25 shows a block diagram of an example implementation of the block 2102 determining the error compensation vector. The remote data 2109 may be data supplied by at least one additional, e.g., remote, ECU. Such data may comprise at least one of the following:

- data resulting from radar signal processing, e.g., a portion of a radar data cube of another MMIC;
- data referring to an address information or index towards a memory and/or a radar data cube indicating which portions of the memory/data cube are to be considered when computing the error compensation vector in act 2106;
- data indicating characteristics and/or configuration information, e.g., indicating a pattern that is to be expected as a suitable interim result or peak.

The remote data 2109 may be supplied to the block 2104 analyzing the interim result(s), to the act 2106 computing the error compensation vector and/or to a memory or database 2105. The memory/database 2105 may be used to store expected characteristics that are used to be compared with the suitable interim result(s) to determine the error compensation vector.

It is an option that remote data 2109 may provide contemporary, e.g., initial, values for the error compensation vector, which will be adapted after some time, e.g., after the analysis of interim result(s) has started. It is another option that the remote data 2109 comprise information that is used to update the error compensation vector on a regular or sporadic basis. It is also an option that the remote data 2109 provides offset information (e.g., at least one offset value) of the error compensation vector and/or information that can be used to compute the error compensation vector.

The output of act 2104 and optionally the characteristics provided by the memory/database 2105 and/or further remote data 2109 may be utilized in act 2106 to compute the error compensation vector, which will then be supplied to and used in act 2107 as described above.

As an example, the principle depicted in FIG. 21 can be applied in the context of sensing parameters resulting in errors to be compensated after a second stage FFT. It is, however, also an option to use the concept on any other processed radar data like first or third stage FFT data.

Figure 22:
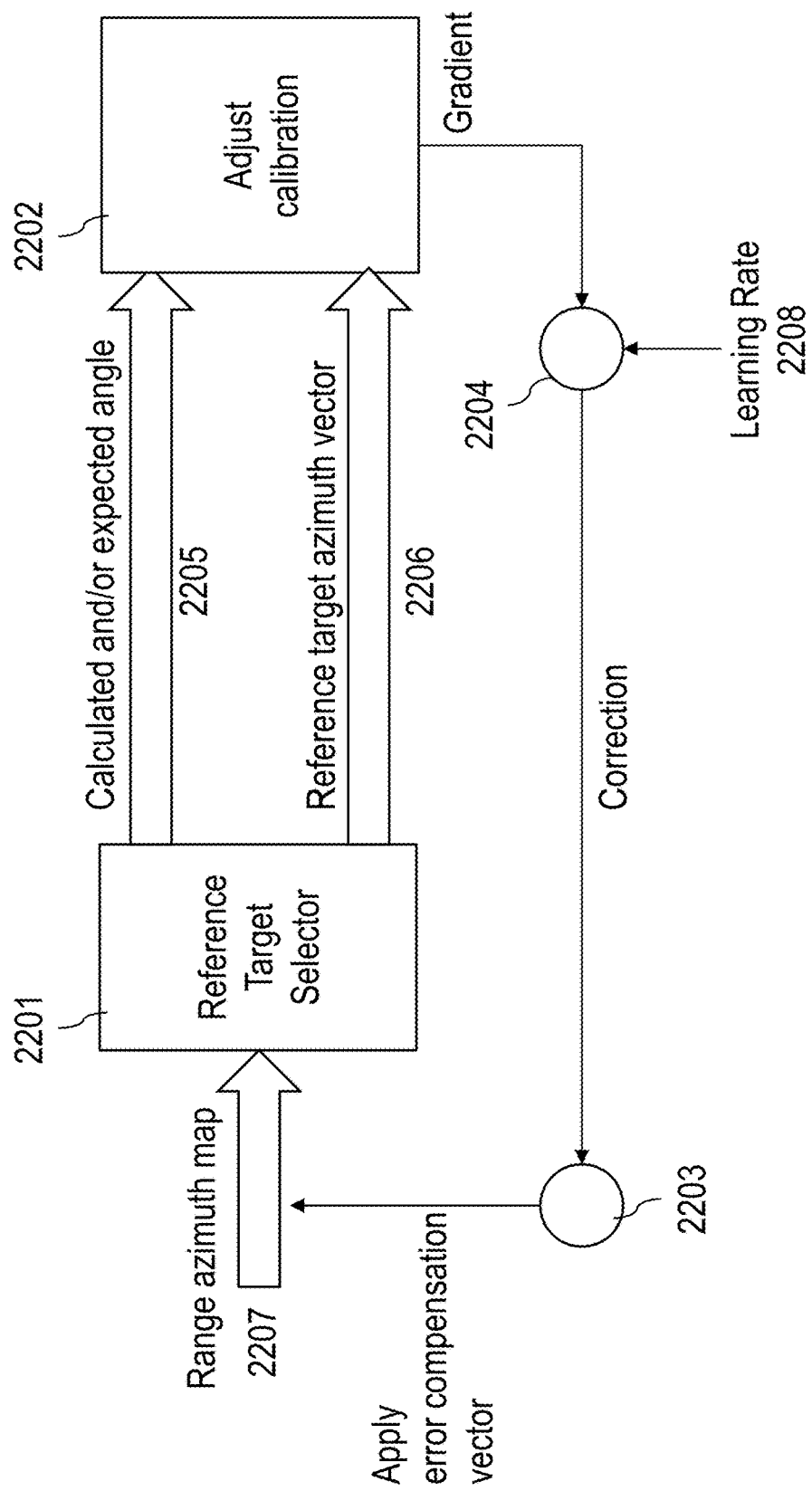
FIG. 22 shows an example diagram visualizing a machine learning approach to compute the error compensation vector.

FIG. 22 shows an example diagram visualizing a machine learning approach to compute the error compensation vector.

A range azimuth map 2207 (e.g., peak candidates (=suitable interim results) that are taken from second stage FFT results) is provided to a reference target selector 2201. The reference target selector 2201 determines a calculated and/or expected angle 2205 and a reference target azimuth vector to a block 2202 that adjusts the calibration. The block 2202 may utilize a cost function and determine a gradient to a multiplier 2204. The other input of the multiplier 2204 is a learning rate 2208 and the output of the multiplier 2204 is a correction that is input to an integrator 2203. The integrator provides an error compensation vector that is applied to the range azimuth map 2207.

The learning rate corresponds to a fraction of the gradient that can be used to update the error compensation vector. The learning rate can be a scalar value or a vector value, preferably having the same dimension as the number of virtual channels.

The machine learning approach for amplitude error compensation may assume that isolated targets reflect the same amount of power on all virtual channels. In practice, the power measured depends on the transmission channel power and the reception channel gain. If an error exists over multiple measurements, an error compensation vector may be determined based on the power values of multiple isolated targets over multiple frames.

The error compensation may be tuned such that after error compensation the peak level of the main target may substantially remain of the same level of amplitude, whereas the amplitude of side lobes are improved. This allows a better separability and hence an improved detection of objects in the radar signal.

Phase Error Detection

The error compensation can be applied to phase errors. An ideal signal characteristic is a linear variation of the phases along the virtual channels. The compensation may be achieved via machine learning utilizing a gradient decent based approach:
1) Select several strong R/D cells with only a single target detected in the angular dimension.
2) Compute ideal (suitable) phases for each virtual channel based on the measured angle.
3) Compute at least one loss function of the current phase compared to the ideal phase.
4) Adjust error compensation vector.

Figure 23:
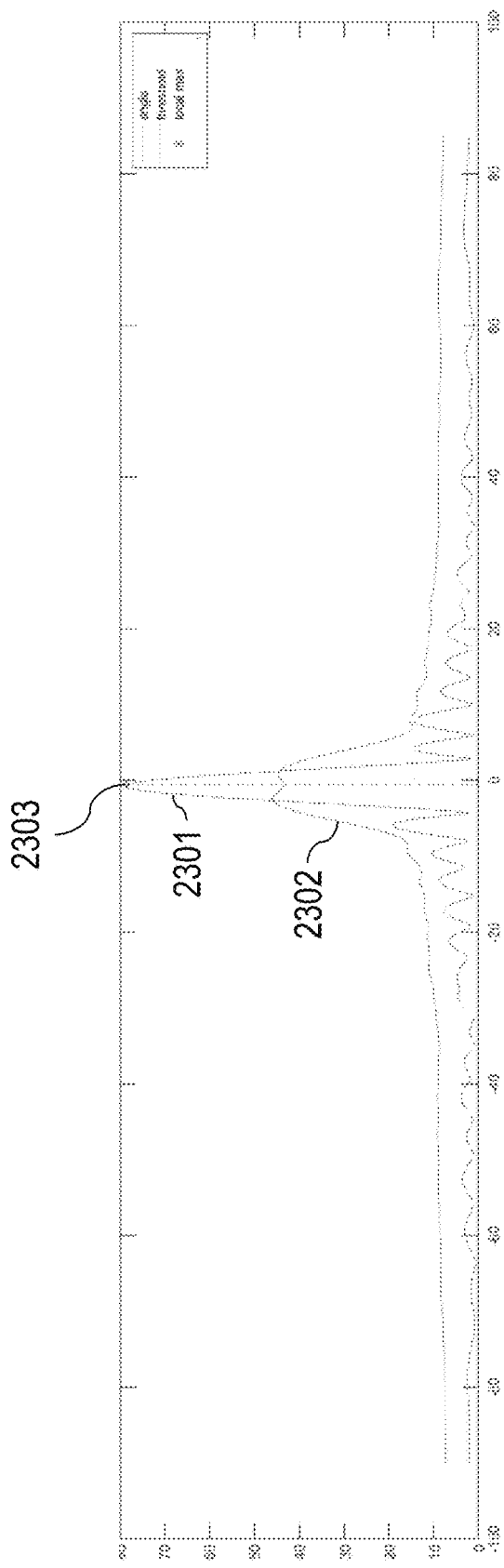
FIG. 23 shows a diagram comprising a curve of a signal power in the angular dimension with a local maximum as well as a curve of a threshold.

FIG. 23 shows a diagram comprising a curve of a signal power in the angular dimension 2301 with a local maximum 2303 as well as a curve of a threshold 2302. The local maximum 2303 corresponds to a target detected on a non-coherent integration map and CFAR based target detection.

The reference target selection may comprise the following acts:
1) For each NCI (non-coherent integration) level target detection: determine angle A to select R/D cells ("RD_ Cell"); an FFT over several virtual channels can be used to obtain the angle A as follows:

$A = \text{FFT}(\{RD\_Cell\}).$

2) R/D cells are selected, which contain only a single strong target.
3) At least one of the following selection criteria can be used to select a suitable target, e.g.:
   a) A single local maximum above a CFAR-based threshold:

$\#\text{LocalMax}(\text{CFAR}(A)>0)=1.$ b) A target power above a predefined value.
   c) A target power difference with the lobe of the next highest power value being above a predefined value.
4) A subset of selected targets can be extracted to improve computation speed and avoid overfitting. For example, machine learning can be used to remove existing (e.g., stationary) targets from the scenery.

An improved or even ideal phase may be computed as follows:
1) For each selected target (known to be unique in this R/D cell), (substantially) linear phase variations across virtual channels are expected based on a uniquely detected angle θ.
2) The ideal phase slope can be deduced from the expected phase delay from one channel to the next:

$\Phi(n) = n*(s*\sin(\theta)),$ wherein n is the channel and s is the distance between antennas.

Figure 24:
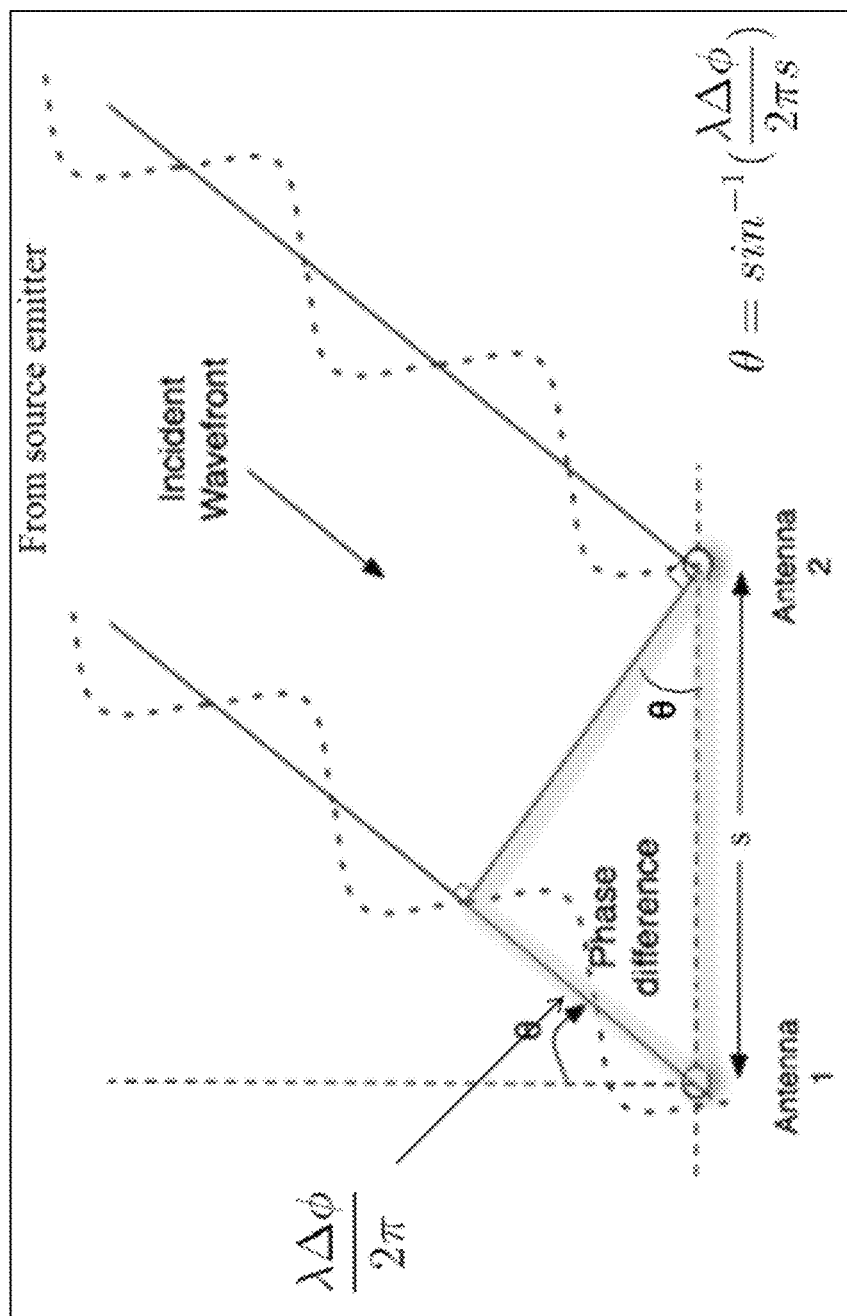
FIG. 24 shows the angle θ and the phase difference between antennas.

FIG. 24 illustrates the angle θ and the phase difference between antennas.

An example gradient decent implementation may be as follows: An overall loss function LF $$LS = \sum_{n=1}^{N} L(n)$$

shall be minimized (or reduced in order to obtain at least some improvement) for the virtual channels N of an azimuth, wherein L(n) is the loss function, e.g., $L(n) = (\hat{\varphi}_t(n) - W_i * \varphi_t(n))^2$ with
$W_i$ being the latest phase correction vector,
$\varphi_t$ being the measured phase vector of the channels of the same azimuth of a selected target t which may serve as an interim result or as a portion of an interim result;
$\hat{\varphi}_t$ being the estimated phase vector of the single target t.
The next phase error compensation vector $W_{i+1}$ could be determined as follows:

$=W_{i+1} = W_i + \eta L'(\hat{\varphi}_t, W_i * \varphi_t),$ wherein
L' is the derivative of the desired loss function L, and
η is the learning rate.

Embodiment: Utilization of History Data

Figure 26:
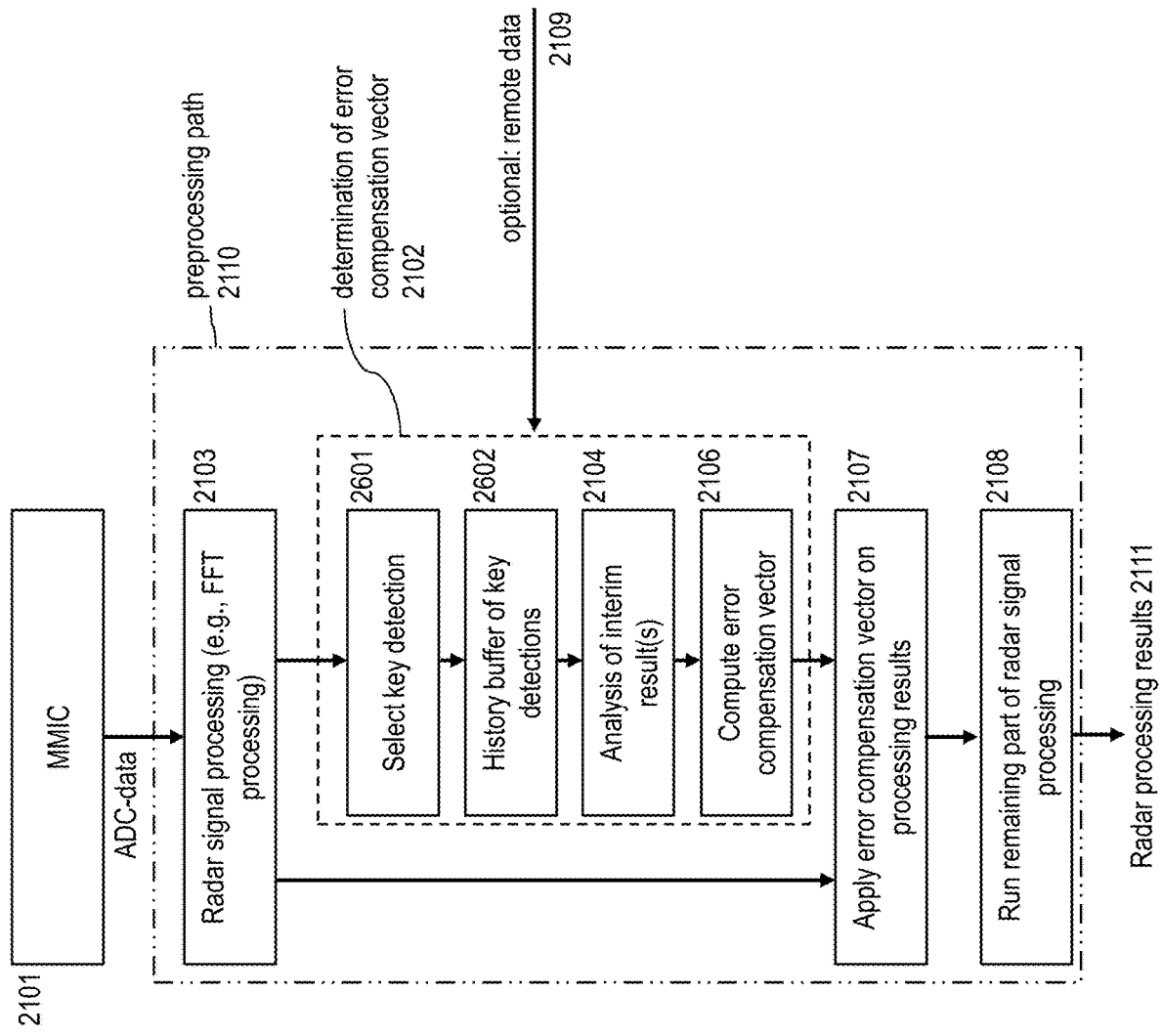
FIG. 26 shows an example diagram utilizing history data to compute the error compensation vector.

FIG. 26 shows an example diagram utilizing history data to compute the error compensation vector. The diagram shown in FIG. 26 is based on the diagram of FIG. 21, except that acts 2601 and 2602 have been inserted between the acts 2103 and 2104.

In the act 2601 at least one key detection is selected and in act 2602 a history buffer of key detections is compiled.

Due to the complexity of errors to be compensated and potential missing detections in various dimensions (Range and/or Doppler), it is proposed to provide a history buffer of results for selected detections. This may in particular be favorable as an error may change slowly over time.

The history buffer may utilize raw data of same signal reflections, but after different acquisitions. Data to be stored in the history buffer may also be based on different signal reflections from different acquisitions, which may be advantageous to become aware of the error affecting various dimensions (e.g., Range, Doppler, azimuth and/or elevation).

As described with regard to FIG. 25, the selection of the key detections (act 2601) can be done locally or utilize remote data 2109. For example, a remote ECU may provide additional data 2109 to determine the error compensation vector.

Hence, FIG. 26 shows an example where the interim processing results of selected targets are collected into an history buffer to allow characterizing complex phase or gain errors that could vary with the distance between a selected target and the current vehicle (running the radar system) and/or vary with an angle between a selected target and the current vehicle. It thus allows determining an error compensation vector for multiple distance values (e.g., a range detected by the radar system) or multiple angular values and advantageously utilizing the motion of the car to collect the evolution of the signal from the preselected target. As phase errors and/or gain errors experience merely slow variations in real systems compared to the processing time of the radar system, this embodiment allows detecting complex errors and compute the error compensation vector accordingly.

Embodiment: Improved Electronic Zoom

In case of gain errors, the error compensation vector may in particular mathematically modify the interim results by zooming-in or zooming-out the interim results. Utilizing the approach described herein allows improving the zoom capability in the raw data while reducing the signal-to-noise ratio (SNR)

It is then also an option to split the error compensation vector into two parts:
Part 1: compensation using hardware: adjusting the gain of the relevant receive or transmit channel(s) of the at least one MMIC involved;
Part 2: compensation using software.

Figure 27:
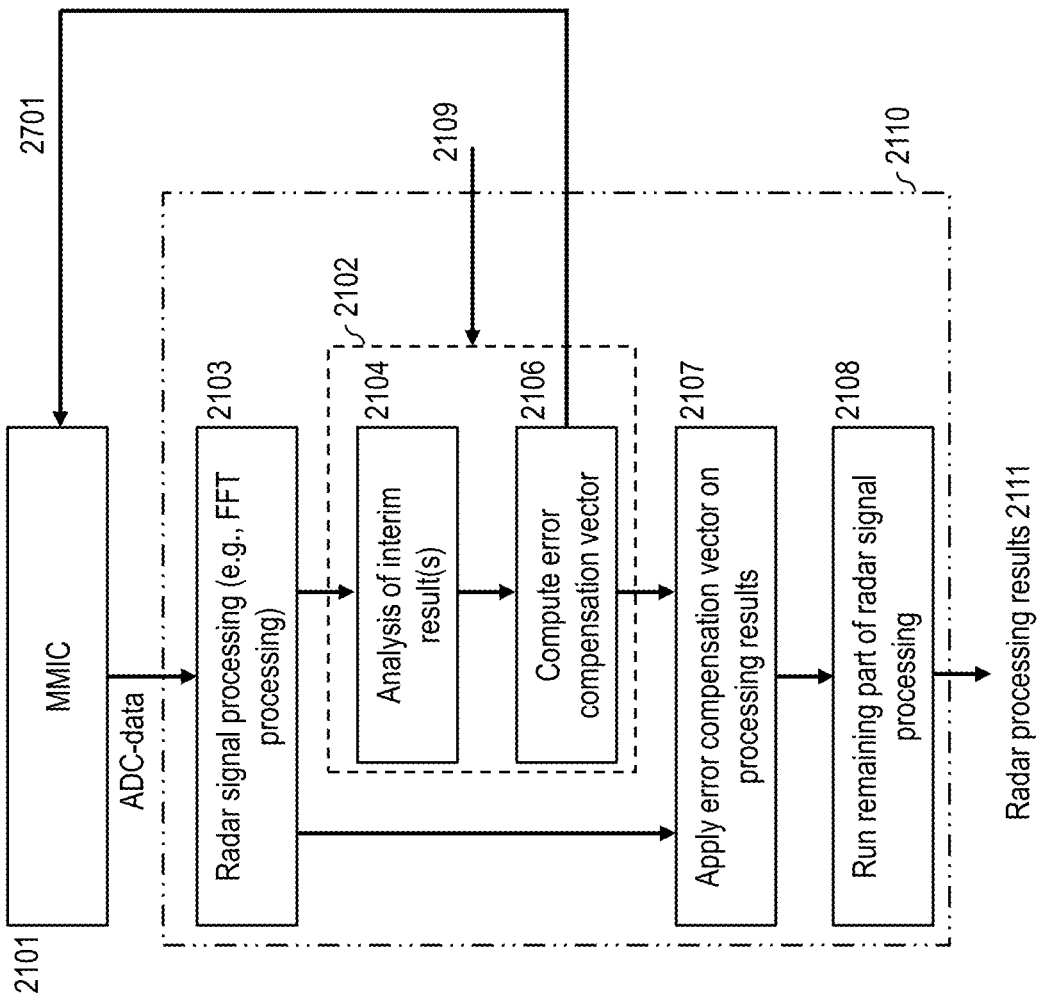
FIG. 27 shows an alternative diagram to the one shown in FIG. 21.

FIG. 27 is based on FIG. 21, but comprises an arrow 2701 from act 2106 that computes the error compensation vector to the MMIC 2101. Hence, part 1 of the error compensation vector may be used to change the configuration of the hardware (i.e. the MMIC 2101) thereby improving the SNR of subsequent acquisitions. Part 2 of the error compensation vector may be used in the processing act 2107 as described above.

This approach is in particular suitable in case of slowly changing errors (compared to the processing speed of the radar system).

A similar approach may be used for compensating phase errors.

Embodiment: Conditions for Determining the Error Compensation Vector

The computation of the error compensation vector as indicated in block 2102 may be triggered or switched on/off based on a non-applicative mode. This mode may be selected depending on a use case of the radar system. The non-applicative mode may use a different MMIC configuration.

For example, the radar system may be used to implement electronic beam steering. In such scenario, it might become challenging to find targets suitable to be used for computing an error compensation vector for each of the positions of the electronic beam. The acquisition mode of the radar system may be adjusted so that the field of view becomes wider resulting in the radar system having a higher probability to detect objects that are suitable to be used to compute the error compensation vector. The error compensation vector can then be computed as explained herein.

Once the error compensation vector is computed, the operating mode may be returned to normal operation (in this case, electronic beam steering) to apply the error compensation vector computed.

Embodiment: Error Compensation when Several Transmitters are Active

Due to the demand towards higher resolution of radar systems, the number of transmitters used in a radar system increases. Several transmitters are activated concurrently, which may result in artifacts like spur or ghost targets. However, due to the complexity of some modulation schemes, it might become difficult to impossible to compute an error compensation vector when the transmitters are activated concurrently.

In order to reduce these artifacts, a dual mode radar concept similar to the example radar with electronic beam steering can be applied.

In a non-applicative mode, the transmitters could be activated in a way to compute an error compensation vector using, e.g., time domain multiplexing. This mode may then be followed by an applicative mode utilizing the error compensation vector that has been computed during the non-applicative mode.

Update of the Error Compensation Vector

Referring to FIG. 21, the path between acts 2103 and 2107 may be used if there is no need to update the error compensation vector. On the other hand, the path between acts 2103 and 2102 may be used if the error compensation vector has to be updated.

The decision whether the error compensation vector is to be updated may be made internally by the radar signal processing 2103, it may be communicated by the MMIC 2101 and/or it may be communicated via remote data 2109.

Embodiment: Error Compensation of Gain and/or Phase

It is an option that the error compensation vector is based on gain errors and/or phase errors.

Based on the examples described herein, the error compensation vector can be computed by focusing on the effects of the different errors like phase impairments and/or gain impairments rather than by trying to understand and compensate each of the individual cause of the errors leading to an impairment.

Figure 7:
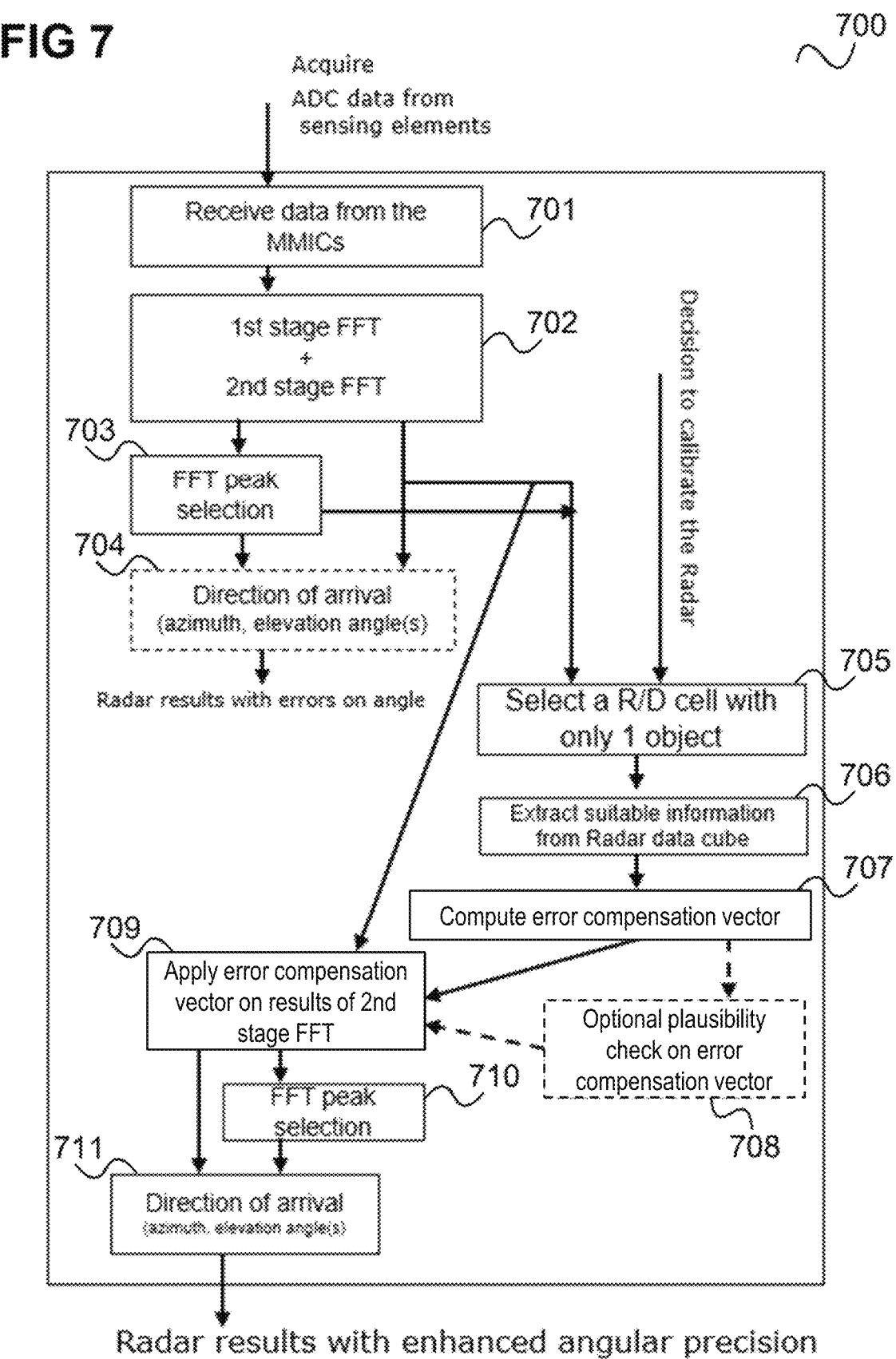
FIG. 7 shows a flow diagram illustrating an error compensation in a radar signal processing according to an embodiment.

FIG. 7 shows a flow diagram 700 illustrating an example error compensation in a radar signal processing environment.

In act 701, data is received from the MMICs.

At 702, first stage FFT and second stage FFT are performed. An FFT peak is selected in act 703. Optionally, a direction of arrival determination is be performed in act 704 (which may however be erroneous because no error compensation has been carried out yet).

If it is decided that the radar receiving system is to be calibrated, a range/Doppler bin with only a single object is selected in act 705. Act 705 may access the results from the acts 702 and 703.

Subsequent to act 705, in act 706 data corresponding to the selected range/Doppler bin is acquired (e.g., second stage FFT output for each receive antenna of the selected range/Doppler bin). Then, an error compensation vector is computed in act 707. As an option, a plausibility check for the error compensation vector may subsequently be performed in act 708.

At 709 (which may directly utilize the results provided by the acts 702 and 707), the determined error compensation vector is applied to the results of the second stage FFT. Based on corrected second stage FFT results, an FFT peak may be selected in a subsequent act 710.

Next, in act 711 utilizing the results of the acts 709 and 710, a direction of arrival determination may be performed, which results in an enhanced angular precision due to the error vector applied in act 709.

For modulation activating Tx channels only in a full sequential way, the error correction vector may be applied to the first stage FFT results instead of the second stage FFT results.

Acquisitions specific to compute an error compensation vector and normal acquisitions may be conducted in an interleaved way. Hence, an error compensation vector may (e.g., periodically or at a given time scheme) be determined using acts 701 to 703 and 705 to 708 and in between the determination of the error compensation vector objects and their directions may be detected using the flow without determination of any error compensation vector (but using the error compensation vector for compensation according to its last determination) using acts 701, 702, and 709 to 711.

According to one embodiment, the processing shown in FIG. 7 may be distributed among several devices, for example ECUs (Electronic Control Units) in a vehicle.

Figure 8:
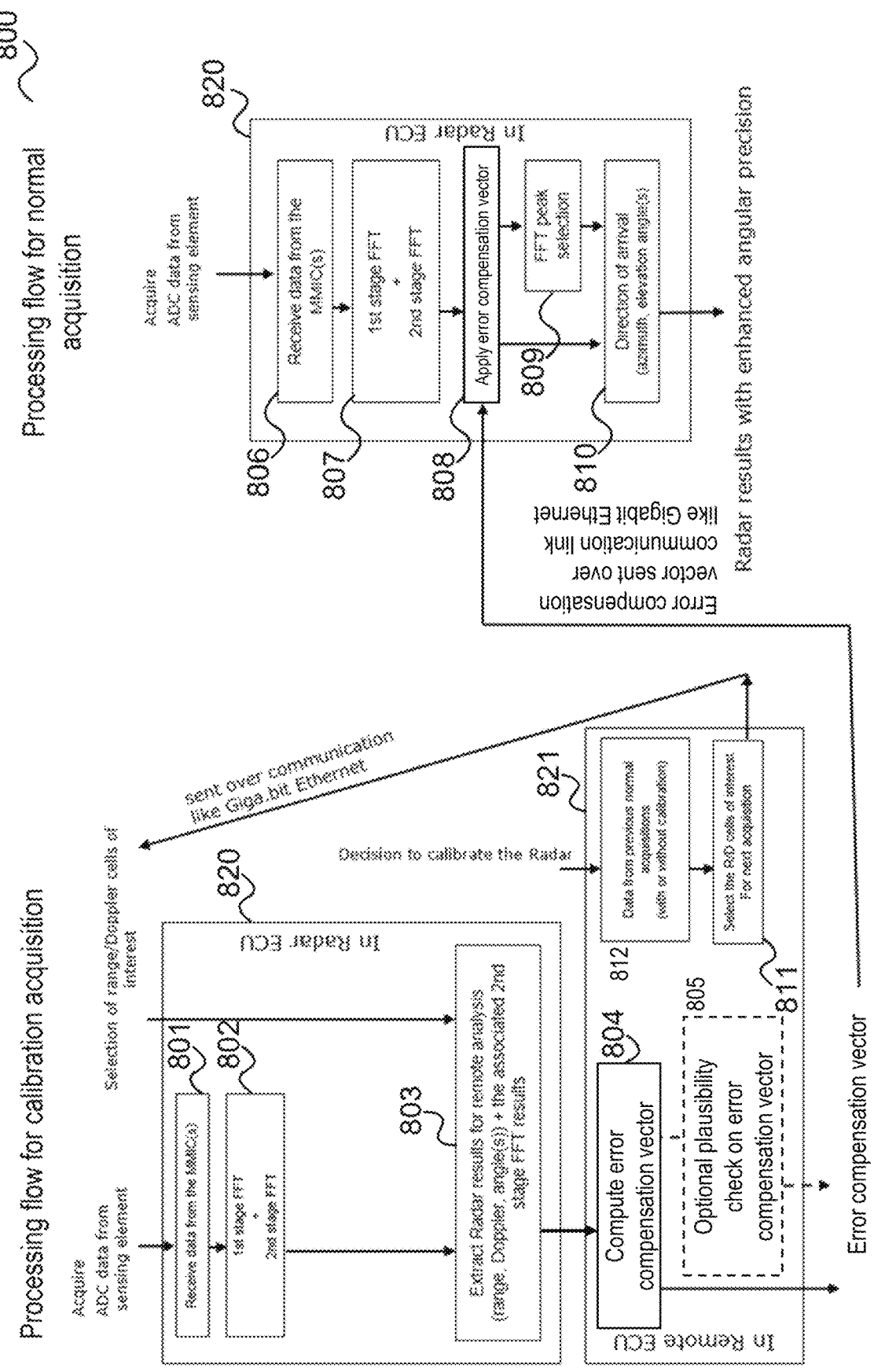
FIG. 8 shows a flow diagram illustrating an error compensation in a radar signal processing according to an embodiment, wherein the processing is distributed over multiple devices.

FIG. 8 shows flow diagram 800 illustrating another example error compensation in a radar signal processing environment. The processing itself may in particular be distributed over multiple devices.

At 801, a first radar ECU 820 receives data from one or more MMIC(s). In a next act 802, the first radar ECU 820 performs first stage FFT and second stage FFT.

At 803, the first radar ECU 820 extracts radar results for further analysis and sends it to a second radar ECU 821.

At 804, the second radar ECU 821 computes an error compensation vector based on the data provided by the first radar ECU 820. As an option, the second radar ECU 821 performs a plausibility check in act 805 based on the output of act 804.

The second radar ECU 821 may use the data from the current "calibration acquisition" (i.e. the data provided by the first radar ECU 820 in act 803) for the computation of the error compensation vector, but may also use data from earlier normal acquisitions (see act 812). The second radar ECU 821 may also select R/D bins (also denoted as R/D cells) of interest for a next acquisition in act 811 subsequent to act 812, e.g., may request data (e.g., second stage FFT results) from the first radar ECU 820 for those R/D bins. In particular, the second radar ECU 821 may define criteria for extracting the radar results, which is done in act 803 by the first radar ECU 820.

The second radar ECU 821 provides the error compensation vector to the first radar ECU 820, which, for normal acquisitions, performs processing acts 806 to 810 similar to acts 701, 702, 709, 710, 711 shown in FIG. 7.

In the following, an approach for finding the error compensation vector based on least squares is described. It is exemplarily assumed that two MMICs (MMIC #1 and MMIC #2) are utilized, which each serves four receive antennas, i.e. there is a sample group of four samples (second-stage FFT output value) for each MMIC. Thus, in total one sample for each of the eight antennas is served by the two MMICs.

Again, it is noted that the use case showing several MMICs is only an example. There is no limitation of the concepts described herein to two or more MMICs.

Figure 9:
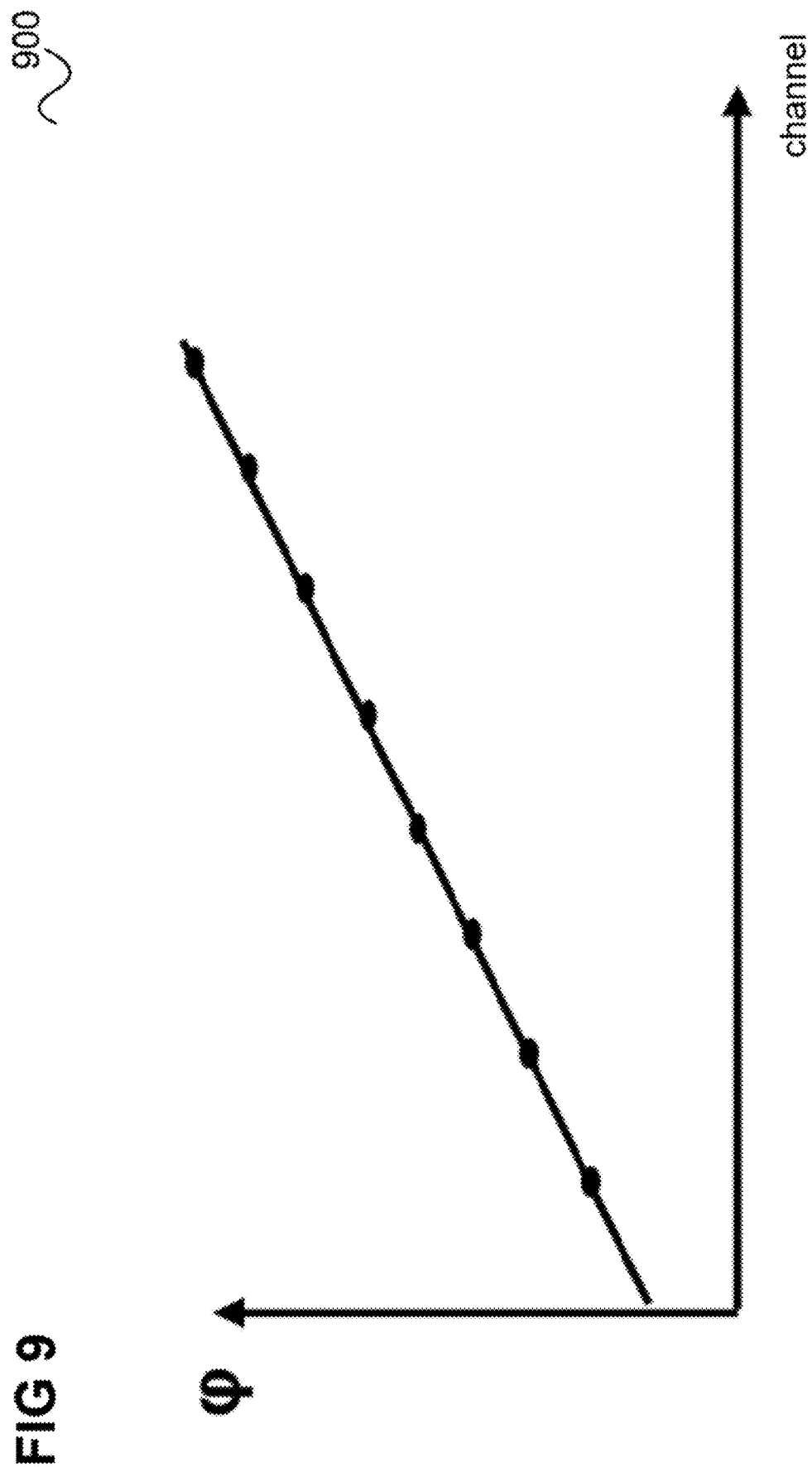
FIG. 9 shows a diagram illustrating the ideal relation between antenna number (or number of Rx channel, indicated along the x-axis) and phase (indicated along the y-axis).

FIG. 9 shows a diagram 900 illustrating an ideal relation (i.e. a straight line) between antenna number (or number of Rx channel, indicated on the x-axis) and phase φ (y-axis).

The ideal relation is that the phase varies linearly over the receive antenna array (according to the direction the object 108 has with respect to the antenna arrangement 102). It is assumed that the antennas are numbered in the order as they are arranged in the antenna array. For example, with regard to the antenna array shown in FIG. 4, the numbering could be 1 to 7 from bottom to top or in the example of FIG. 5 numbered 1, 2, . . . , N, N+1, 2N from left to right (with N=4).

Figure 10:
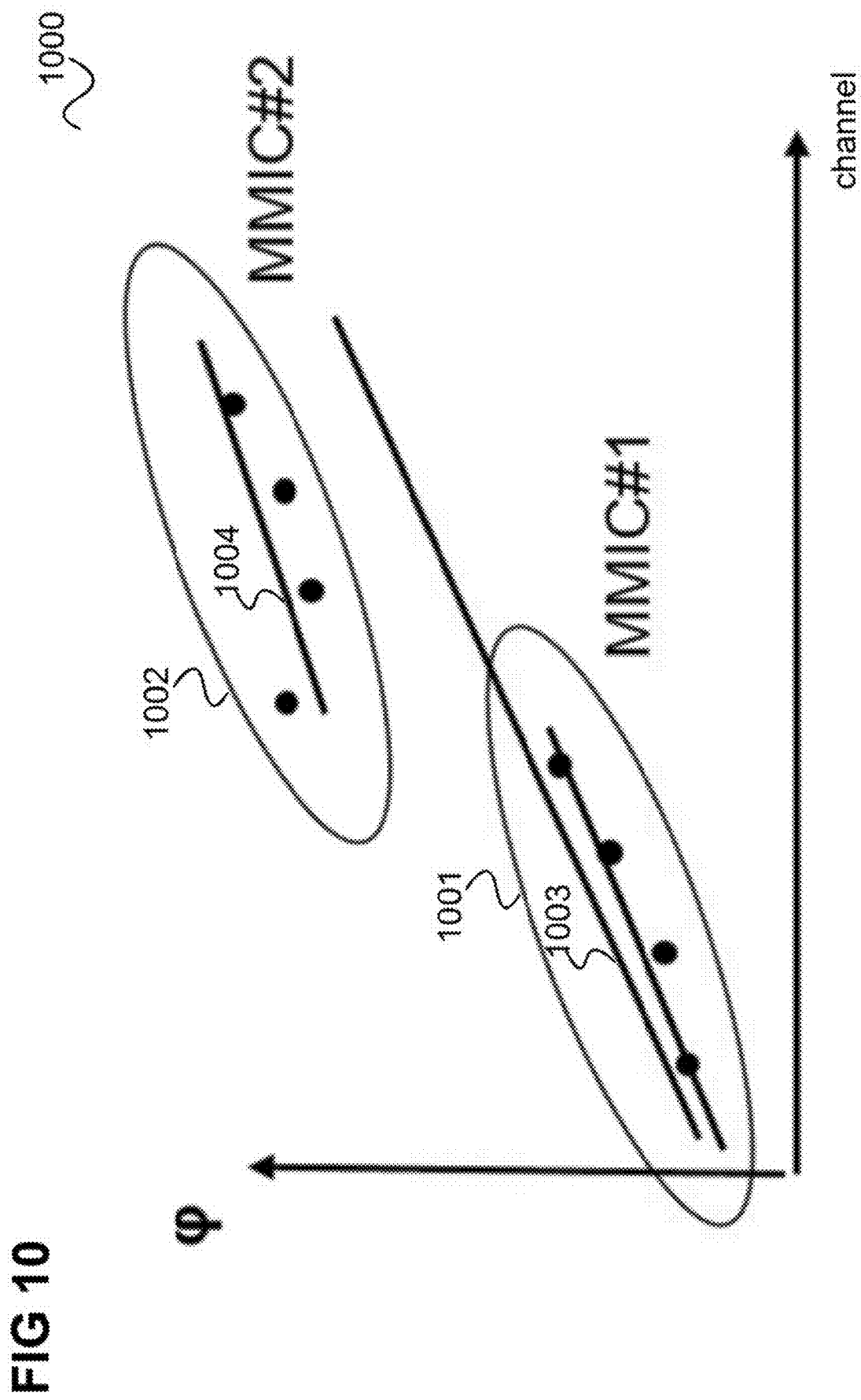
FIG. 10 shows a diagram illustrating an example of the relation between antenna number and phase as it may occur in practical application.

FIG. 10 shows a diagram 1000 illustrating an example of a relation between antenna number and phase.

It is assumed that the first four samples (from left to right) forming a first sample group 1001 belong to the receive antennas served by MMIC #1 and the fifth to eighth samples forming a second sample group 1002 belong to receive antennas served by MMIC #2.

As illustrated by lines 1003, 1004, there is an almost linear relation between phase and antenna number within each sample group 1001, 1002. However, between the sample groups 1001, 1002, there is a discontinuity due to a phase error between the two MMICs.

Figure 11:
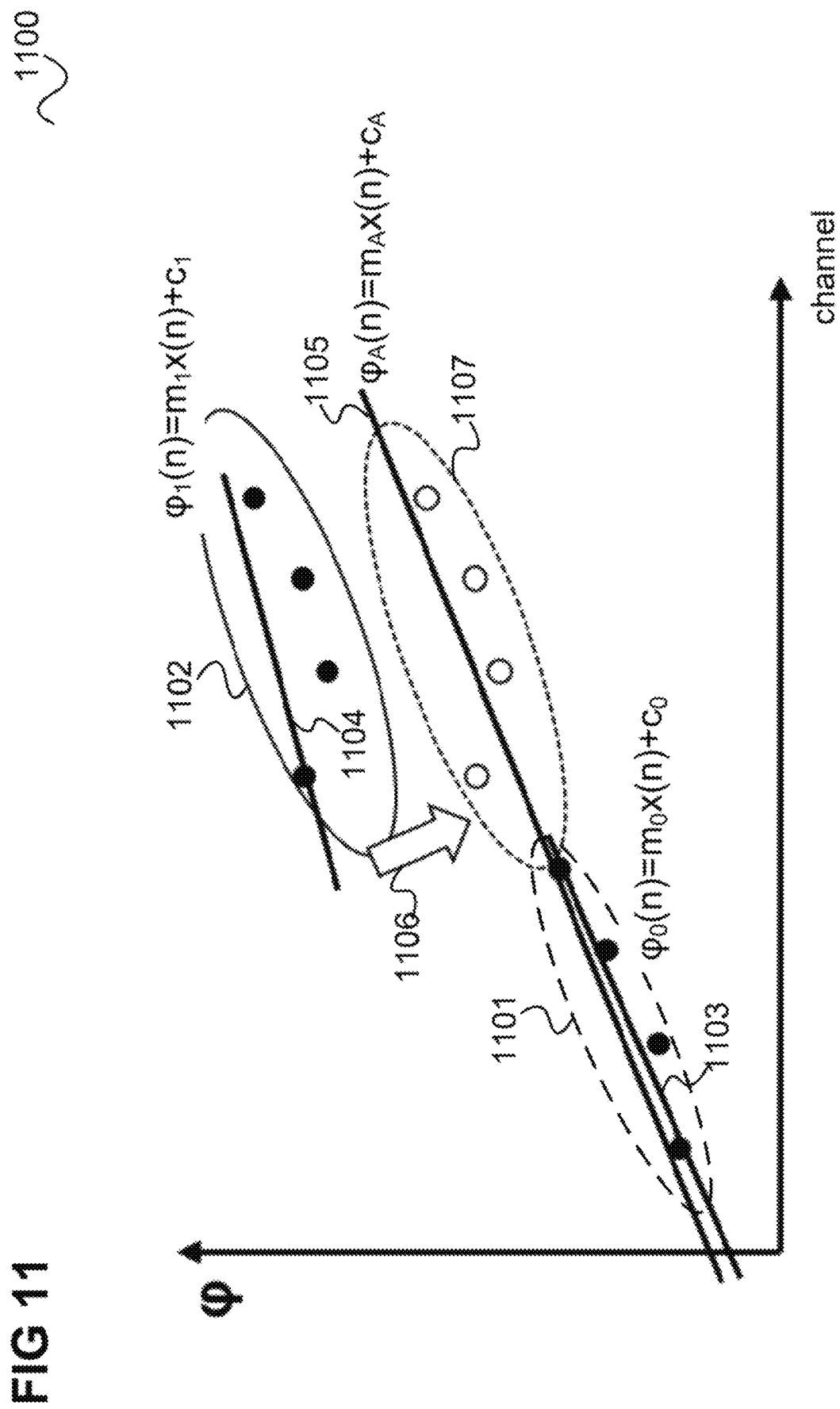
FIG. 11 shows a diagram illustrating the compensation of the phase error between the MMICs.

FIG. 11 shows a diagram 1100 illustrating an example compensation of the phase error between the two MMICs.

As is also shown in FIG. 10, a first line 1103 visualizes the relation between the samples of the first sample group 1101 and a second line 1104 illustrates the relation between the samples of the second sample group 1102.

The signal processing circuit 111 may determine the lines 1103, 1104 by performing a line fitting algorithm for the two sample groups 1101 and 1102.

The first line 1103 is assumed to be given by $$\varphi_0(n) = m_0 \cdot x(n) + c_0$$

and the second line 1104 is assumed to be given by $$\varphi_1(n) = m_1 \cdot x(n) + c_1,$$

where n is the antenna number,
x(n) is the physical position of the antenna n, and
m0, m1, c0, c1 are constants.

The antenna may be positioned with uniform spacing between each other or with non-uniform spacing (sparse arrangement) between each other.

According to the (ideal) linear relationship (as illustrated in FIG. 9), the relation between phase and antenna number should be given by a single line 1105 according to $$\varphi_A(n) = m_A \cdot x(n) + c_a,$$

defined by constants $m_A$ and $c_A$.

According to one example embodiment, the signal processing circuit 111 may determine the constant mA such that $$\text{sqErr} = (m_0 - m_A)^2 + (m_1 - m_A)^2$$

is minimized.

The phases of the samples may be denoted by φ(n) with n=0 . . . (R−1) for MMIC #1 (first group) and n=R . . . (R+S−1) for MMIC #2 (second group).

Here, R may be the number of channels in the first group 1001 and S may be the number of channels in the second group 1002.

For example: R=S=4, hence: n=0 . . . 3, 4 . . . 7.

The signal processing circuit 111 may determine the constant mA by calculating for k=0 . . . (K−1):

$$\text{sqErr}[k] = (m_0 - m_A[k])^2 + (m_1 - m_A[k])^2$$

wherein $m_A[k]$ is a slope obtained (e.g., by linear line fitting) for the phases $$\varphi_A(n) = \varphi_0(n) \text{ with } n=0 \ldots 3,$$

$$\varphi_A(n) = \varphi_1(n) - P[k] \text{ with } n=4 \ldots 7,$$

wherein P[k] are trial values created around $(c_0 - c_1)$.

For example:

$$-G^*(c_0-c_1) \leq P[k] \leq G^*(c_0-c_1),$$

wherein G may be suitably set to 4.

There is a P[k*] with a minimum sqErr[k*] among the P[k]s of all K iterations. Since this is not necessarily the best compensation value, further optimization (e.g., parabolid optimization) may be applied. Hence, the created points (P[k], sqErr[k]) may be interpolated, e.g., using a parabolic function, and the minimum sqErrmin with corresponding Pmin may be located.

Figure 12:
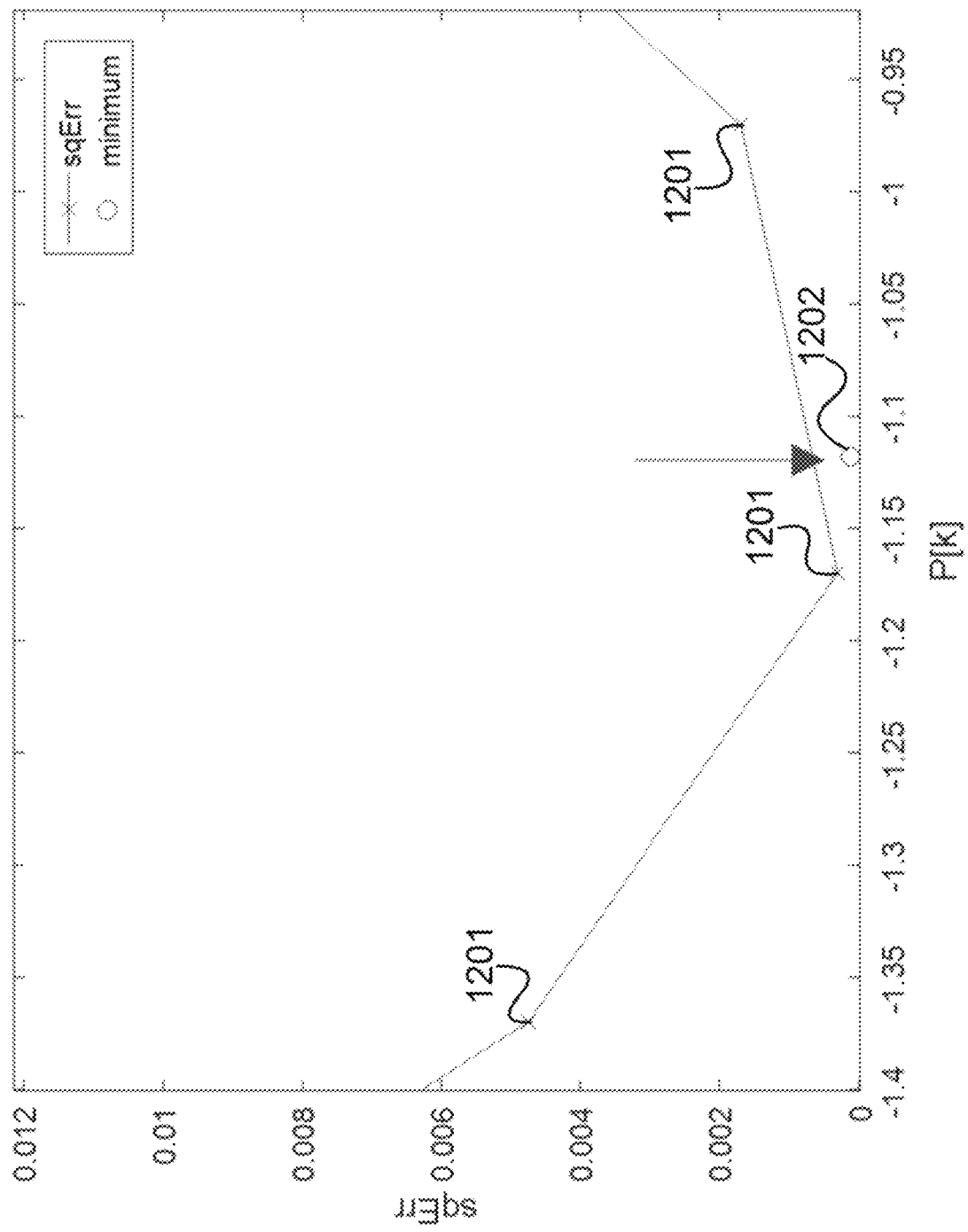
FIG. 12 illustrates the performance of different phase compensation values.

FIG. 12 shows an example curve of the squared error sqErr[k] for various values of P[k] (indicated as pairs 1201 of P[k] and sqErr[k]). The unknown best compensation value 1202 (with a minimum error sqErr) does not correspond to any of the P[k] values.

Figure 13:
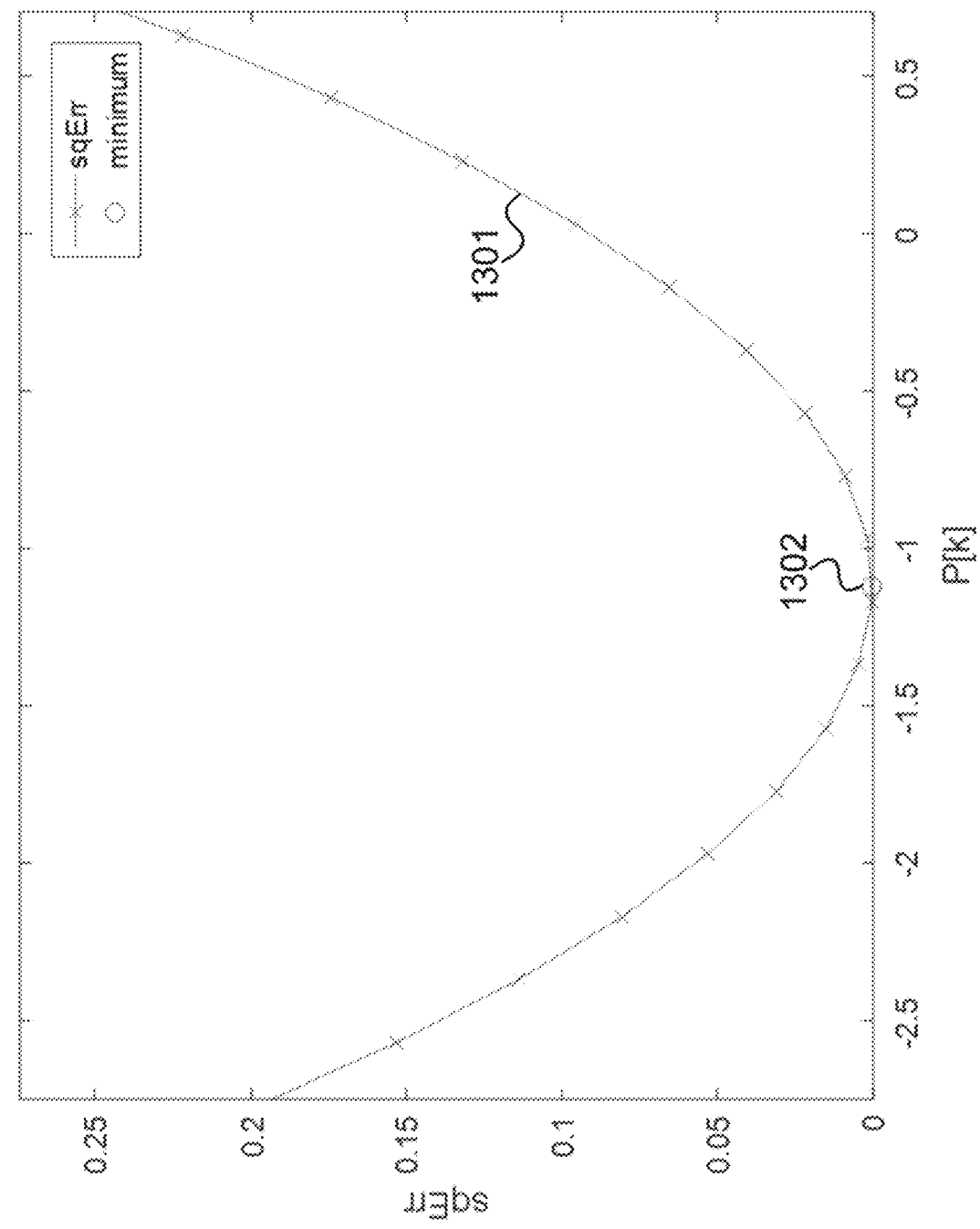
FIG. 13 illustrates parabolic interpolation to determine the best compensation value.

FIG. 13 illustrates an example parabolic interpolation to determine (or at least estimate) the best compensation value. Value pairs of P[k] and sqErr[k] are interpolated by a parabola 1301 with a minimum 1302 to determine the best compensation value (also showing minimum error sqErr).

By compensating the second group of samples 1102 according to the best compensation value (as indicated by arrow 1106 in FIG. 11), the first group of samples 1101 and the compensated second group of samples 1107 fit a common (in other words: joint) relationship given by the line 1105. Both groups 1101 and 1102 may be compensated to fit a common relationship, e.g., given by a line lying between the first line 1103 and the second line 1104.

In FIG. 11, instead of using the index n in the linear models, the more general term x(n) is used which denotes the position of the n-th antenna (e.g., on a printed circuit board). This is because the approaches described herein may also be used for sparse arrays as illustrated in FIGS. 14 to 16.

Figure 14:
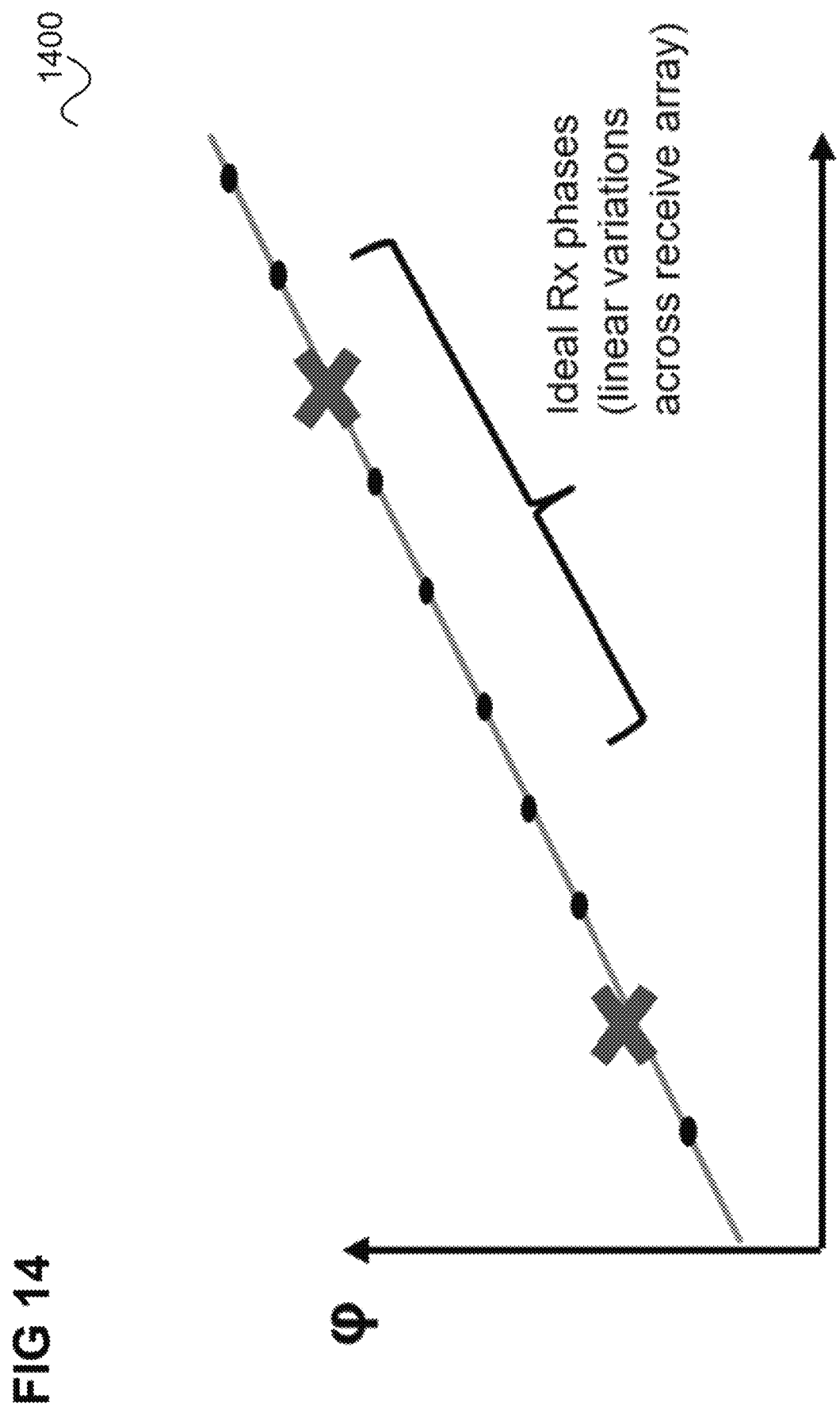
FIG. 14 shows a diagram illustrating the ideal relation between antenna position and phase for a sparse antenna array.

FIG. 14 shows a diagram 1400 illustrating an ideal relation between antenna position (or number of Rx channel, indicated along the x-axis) and phase (indicated along the y-axis) for a sparse antenna array.

As indicated by the crosses, some antenna positions are not occupied (i.e. some antennas are omitted, e.g., to extend the aperture of the radar signals).

Figure 15:
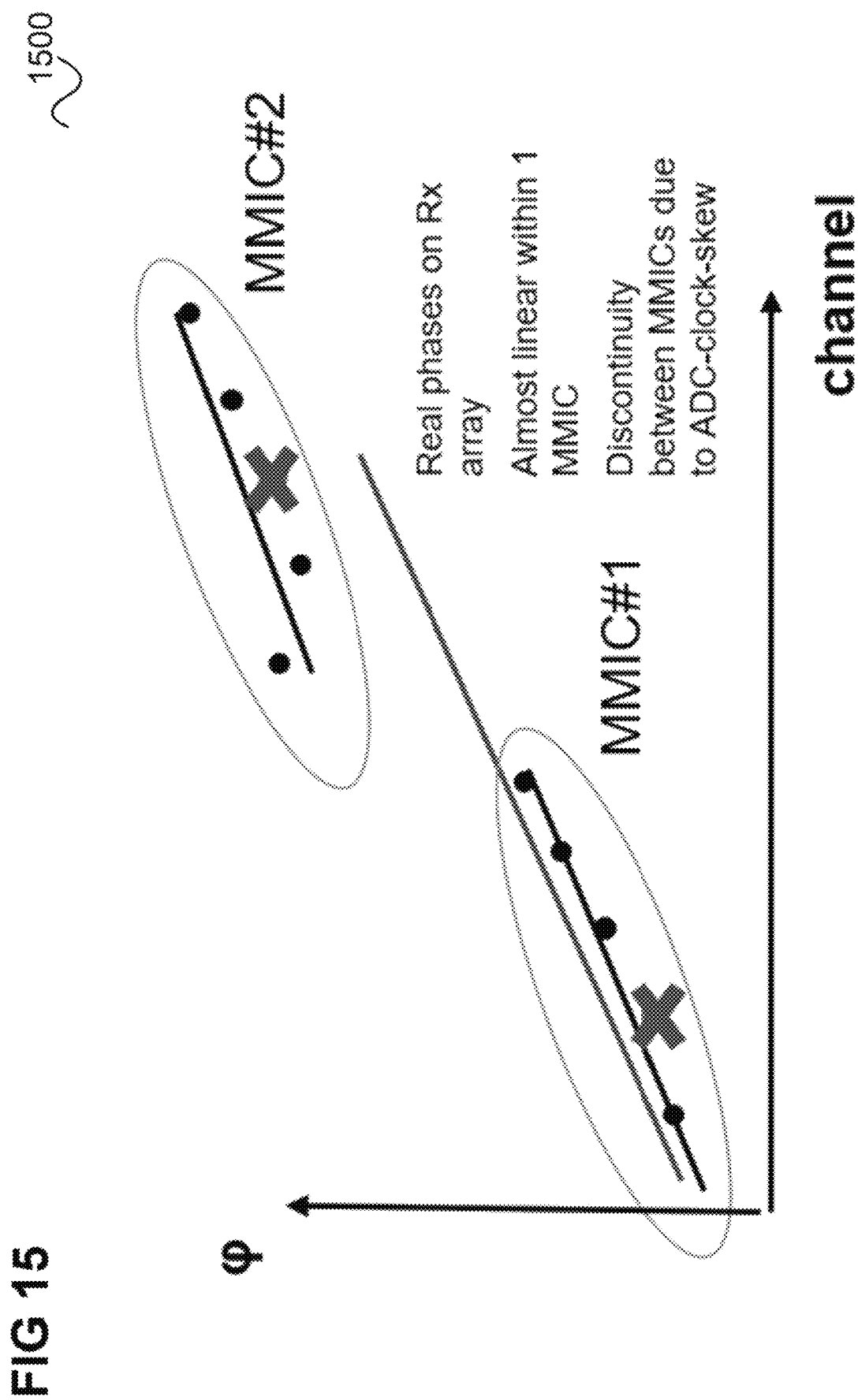
FIG. 15 shows a diagram illustrating an example of the relation between antenna number and phase as it may occur in practical application for a sparse antenna array.
Figure 16:
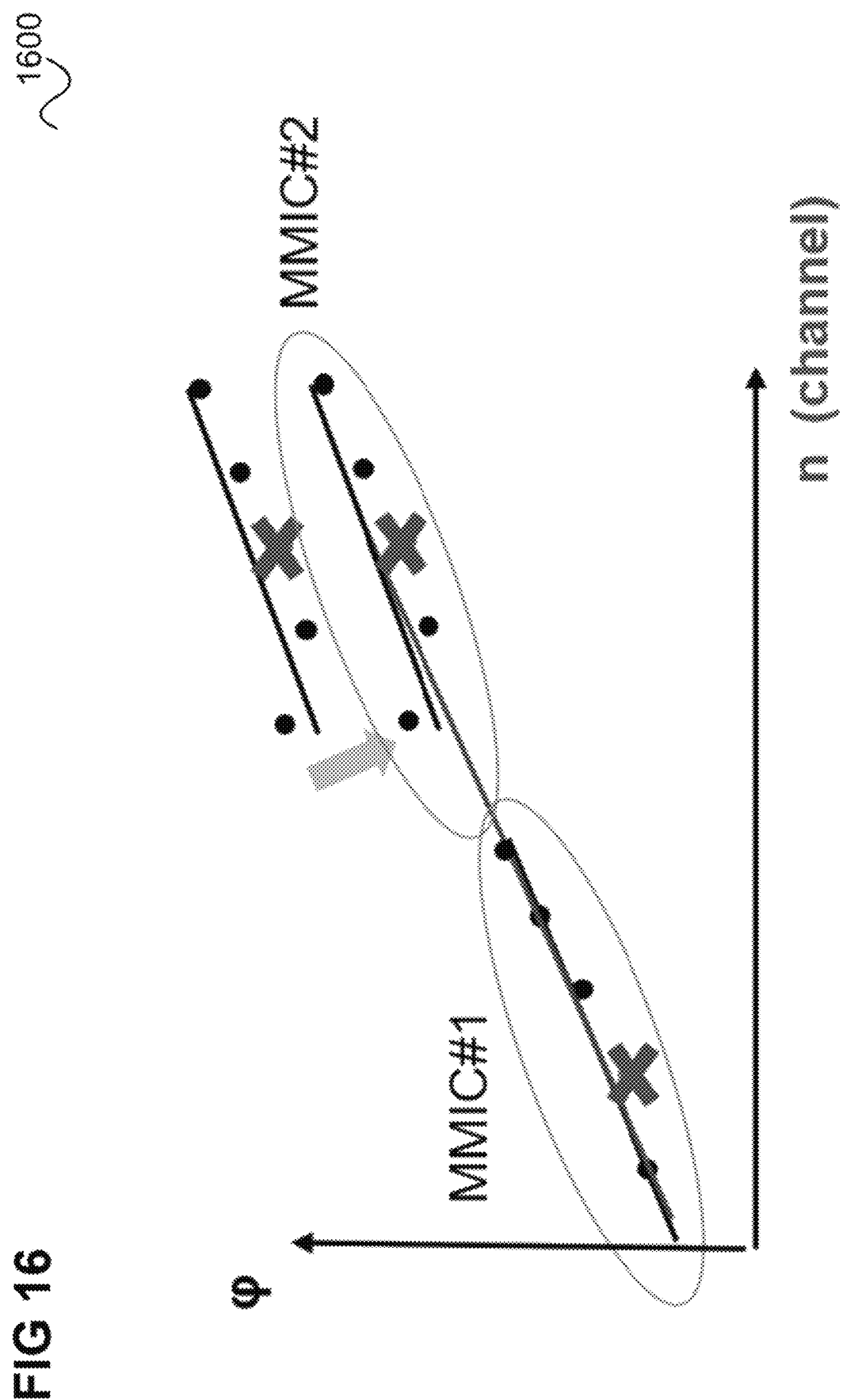
FIG. 16 shows a diagram illustrating the compensation of the phase error between the MMICs for a sparse antenna array.

FIG. 15 shows a diagram 1500 illustrating an example of the relation between antenna position (antenna number) and phase as it may occur in a use case scenario of a sparse antenna array. Each of the crosses indicates an antenna position that is not occupied by an actual antenna.

FIG. 16 shows a diagram 1600 illustrating the compensation of the phase error between the MMICs for a sparse antenna array. Again, as also indicated in FIG. 14 and FIG. 15, the crosses depict unoccupied antenna positions.

Figure 17:
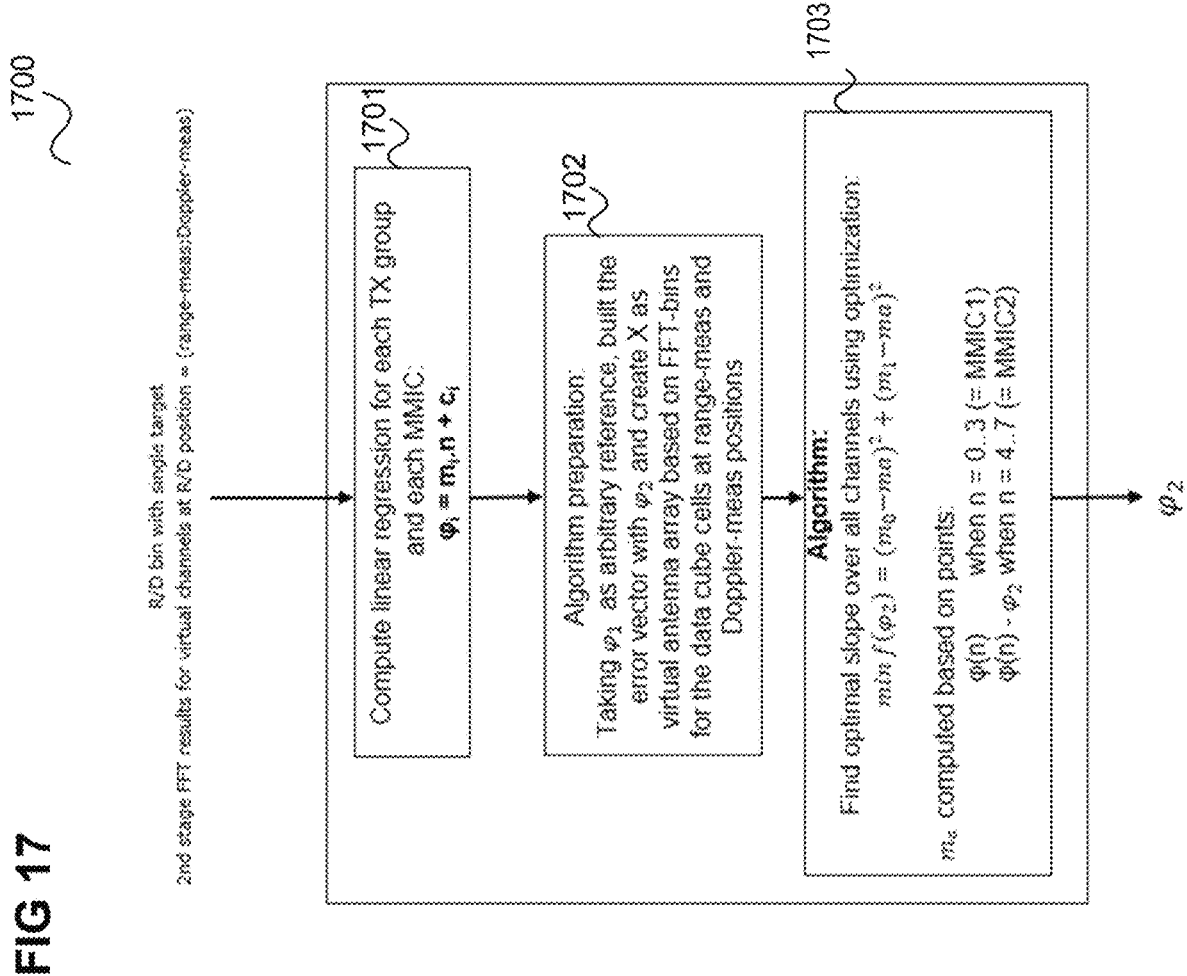
FIG. 17 shows a flow diagram illustrating an example for the calculation of a compensation value.

FIG. 17 shows a flow diagram 1700 comprising example acts to determine a compensation value. In this example, azimuth compensations are performed. However, the concept suggested applies accordingly for compensation of an elevation.

It is assumed that there are two MMICs, i.e. MMIC #1 and MMIC #2, each having one transmitter and four receivers. This results in 2×4 virtual channels. An input vector X for the compensation is a vector with eight elements, each being a complex value.

At 1701, a linear regression is performed for each MMIC to obtain a phase value $\varphi_i$ (with i being either 1 or 2) for each MMIC.

As input serves at least one antenna vector (of each FFT peak), each comprising of complex values for each virtual antenna. From these complex samples the phase information can be derived.

Each MMIC may have multiple transmission (TX) channels. It is desired to compensate the induced error of each TX channel of every MMIC according to $$\varphi_i = m_i \cdot n + c_i,$$

wherein
- $m_i$ is the slope of the linear regression,
- $c_i$ is the intercept with the y axis,
- n is the antenna (which may indicate an index of virtual channels), and
- $\varphi_i$ is the phase value.

The phase value $\varphi_1$ is used as a reference phase value. The compensation is computed on the phase value $\varphi_2$ for the transmitter of MMIC #2.

Input to block 1701 are complex values from a selected range-Doppler bin, e.g., a range-Doppler bin with a single target above a certain threshold, across all virtual channels.

The virtual channels are divided into i subgroups, e.g., one group per transmit channel. The subgroup 0 may be set as a reference. The error compensation vector P $$P=[P_0, P_1, \ldots, P_i],$$

may be initialized, which contains a complex value for each subgroup, to zero.

Input to block 1702 are the complex values divided into subgroups. A linear regression model is computed for each subgroup:

$$\varphi_i(n) = m_i \cdot x(n) + c_i,$$

wherein
- $m_i$ is the slope of the linear regression,
- $c_i$ is the intercept with the y axis,
- n is the index of virtual channel of subgroup i,
- $\varphi_i$ is the (complex) phase value,
- x is the position of the virtual channel.

Input to block 1703 are the computed slopes mi of each subgroup from block 1702. A linear regression model is computed for all channels together, where the error compensation vector P is added to the phase values:

$$\varphi_A(n) + P = m_A \cdot x(n) + c_A,$$

wherein P contains a phase shift value for each subgroup. Then, values for $P_i$ are determined by means of optimization (via at least one optimization algorithm) thereby minimizing the following equation:

$$\min f(P) = \Sigma(m_i - m_A)^2$$

for all subgroups i.

An output of the algorithm is the error compensation vector P containing a phase shift value for each subgroup.

For more accurate calibration, the error compensation vector can be computed on several FFT peaks or an average of multiple FFT peaks can be used to compute the error compensation vector.

Having found a suitable, in particular the best, error compensation vector the radar signal processing circuit 111 may compensate other samples (i.e. second stage FFT outputs of range/Doppler bins other than the previously selected (e.g., strongest or otherwise suitable) FFT peak) using this error compensation vector.

The above approach for finding an error compensation vector is only an example and more complex approaches, including neural networks, may be used. It should be noted that with the processing capabilities of next generation radar signal processing circuits, complex algorithms may be supported.

When there is a single object in one range-Doppler bin, the situation is preferable since the sample groups 1001, 1002 each lie (approximately) on a respective straight line (even if there is a phase shift between the sample groups and thus a shift between the two lines). In case there are more objects in one range-Doppler bin, the samples within the sample groups 1001, 1002 may typically be more scattered. Still, a line (i.e. linear model) can be found for each sample group 1001, 1002 and the above approach can similarly be applied to determine the shift between the lines (and thus the error compensation vector). In this case, complex mathematics may be used to find the linear model for a sample group.

Similarly, it is noted that the while in the above the compensation is shown for a single transmitter, similar and more complex mathematics may be applied for computing the error compensation vector over an (virtual) array formed by more than one transmitter channel.

The approaches described above to determine and compensate phase errors between MMICs may be combined with approaches to reduce phase errors between MMICs (to reduce or minimize differences between MMIC phases and thus facilitate phase error compensation).

One example for such an approach are pre-acquisition ramps: As some delays to be compensated relate to junction temperature, dummy preacquisition ramps may be used. These are ramps determined before the actual acquisition ramps in order to warm-up the dies before the acquisition of receive signals begins. The preacquisition ramps may be calculated before the actual acquisition ramps with a different TX modulation scheme merely to warm the dices rapidly while ensuring the transmitted spectrum remains within a regulation envelop. Multiple transmitters may be activated concurrently with the same modulation that may be different from a modulation used normally because it prevents demodulation.

Further, the phase error compensation (or delay compensation) may be done inside a radar ECU or outside the radar ECU by providing only the data of virtual channels for the selected peaks. Approaches for delay compensation, e.g., for antenna related delays (such as pre-calibration) may be combined with MMIC related compensation as described above.

The examples described above may be applied to an FMCW radar or a PMCW (phase modulated continuous-wave) radar.

Figure 18:
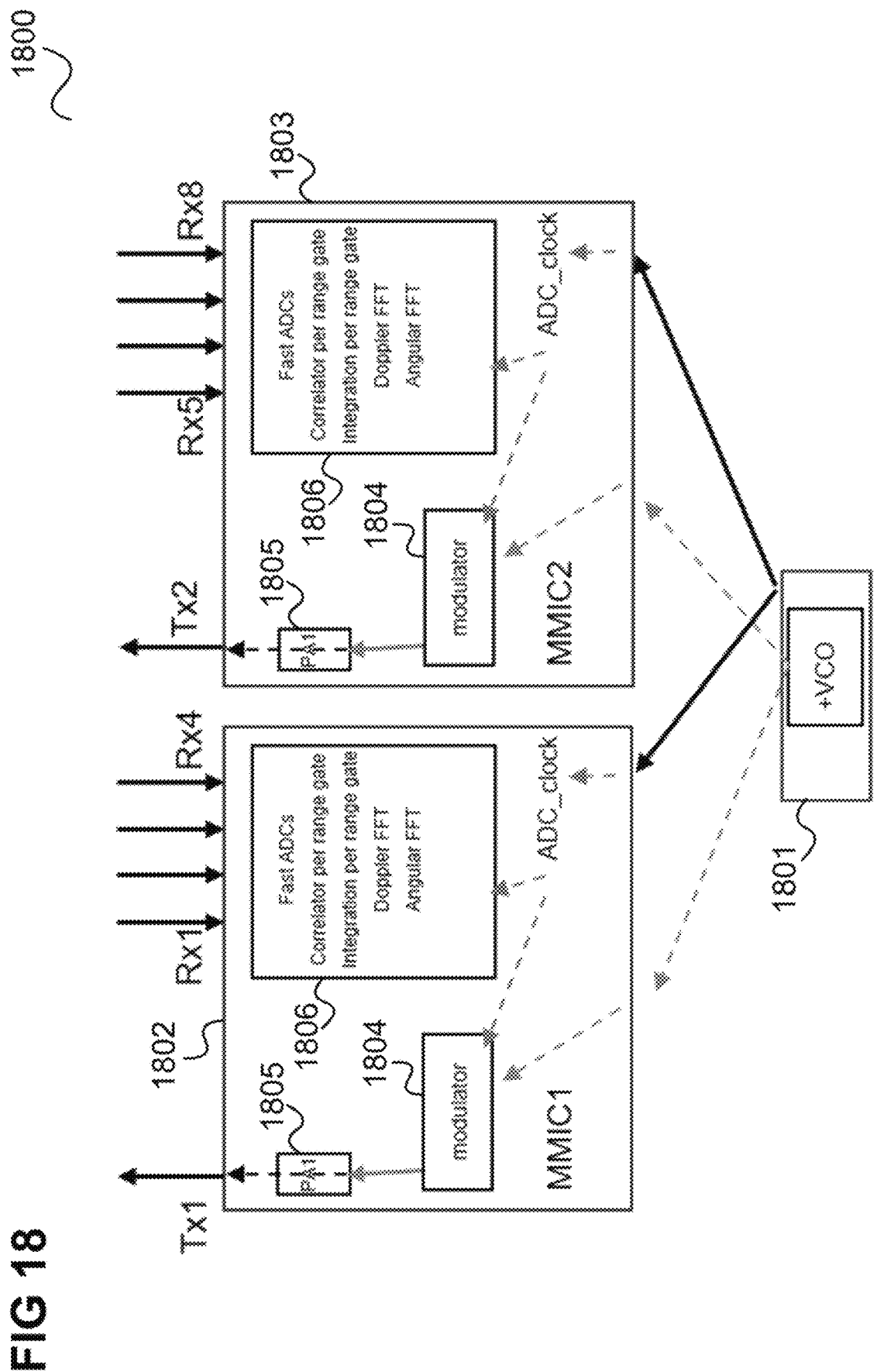
FIG. 18 shows a PMCW (phase modulated continuous-wave) radar device.

FIG. 18 shows a block diagram of an example PMCW radar device 1800. An oscillator 1801 provides oscillation signals to a first MMIC 1802 and to a second MMIC 1803. Each MMIC 1802, 1803 has a transmit path (including a respective modulator 1804 and a respective amplifier 1805) and obtains receive signals via multiple receive antennas (Rx1 to Rx4 for the MMIC 1082 and Rx5 to Rx8 for the MMIC 1803). The receive signals are processed by a respective radar signal processing circuit 1806.

In this example the radar signal processing circuits 1806 are located within the MMICs 1802, 1803. As an option, however, at least a part of the processing circuit (e.g., circuits performing FFTs) may be located external to at least one of the MMICs 1802, 1803.

As in the case of FMCW radar, cascaded MMICs of a PMCW radar device (or system) may exhibit angular errors, because of differential phase errors between the oscillation signals for the modulators 1804 and/or between the ADC clocks (clock skew error). These may be compensated as described above for FMCW. The same applies to OFDM radar environments.

Figure 19:
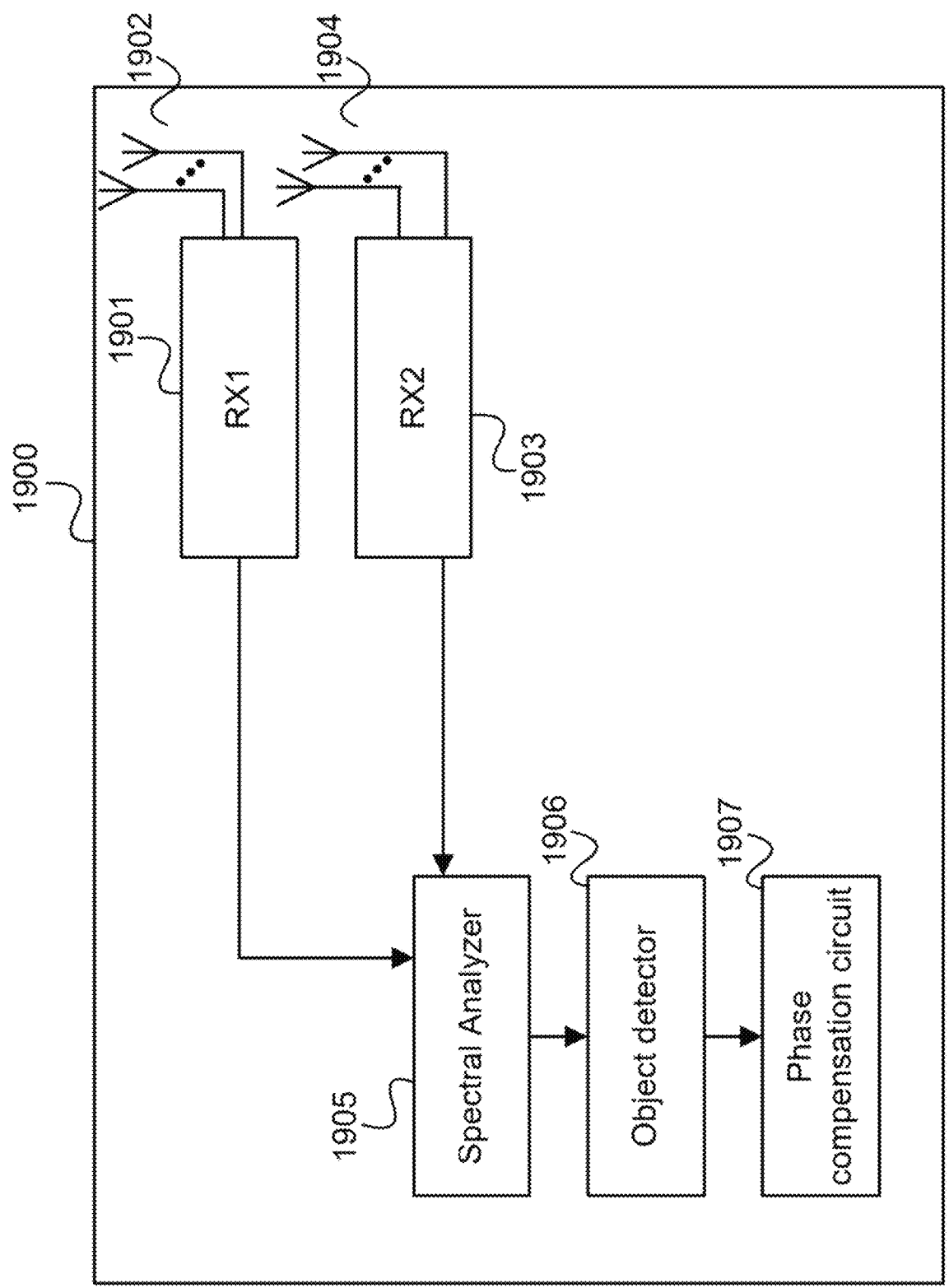
FIG. 19 shows a radar receiving system according to an embodiment.

FIG. 19 shows an example radar receiving system 1900. Such radar receiving system 1900 may be installed in a vehicle and it may be used for radar operations, in particular when the vehicle is moving.

The radar receiving system 1900 comprises a first receiving circuit 1901 with a first set of antennas 1902 and it is configured to receive a first plurality of receive signals via the first set of antennas 1902.

The radar receiving system 1900 also comprises a second receiving circuit 1903 with a second set of antennas 1904 and it is configured to receive a second plurality of receive signals via the second set of antennas 1904.

The first set of antennas 1902 and the second set of antennas 1904 may be organized in a coherent array.

Further, the radar receiving system 1900 comprises a spectral analyzer 1905 that is configured to generate, from the first plurality of reception signals, a first set of Fourier transformation output values including Fourier transformation output values assigned to each of a plurality of range/Doppler bins and, from the second plurality of reception signals, a second set of Fourier transformation output values including Fourier transformation output values assigned to each of the plurality of range/Doppler bins.

The radar receiving system 1900 further includes an object detector 1906 configured to determine a range/Doppler bin of the plurality of range/Doppler bins as an estimate of a range and speed of an object from the first set of Fourier transformation output values and the second set of Fourier transformation output values.

The radar receiving system 1900 further includes a phase compensation circuit 1907 configured to determine a phase offset between the Fourier transformation output values of the first set of Fourier transformation output values that are assigned to the range/Doppler bin which was determined as the estimate and the Fourier transformation output values of the second set of Fourier transformation output values that are assigned to the range/Doppler bin which was determined as the estimate and to compensate the phases of at least a part of the second set of Fourier transformation output values by the determined phase offset.

Hence, spectral values for a range/Doppler map are generated by processing of reception signals by two stages of (discrete) Fourier transformations (preceded by other processing stages, e.g., amplification, frequency-down conversion, analog-to-digital conversion). At least one reference range/Doppler bin is selected (corresponding to an estimate of range and velocity of an object, e.g., by peak selection in the range/Doppler map) and the phase error between the spectral values of the reference range/Doppler bin provided by a first set of antennas (i.e. determined by processing of reception signals received by the first set of antennas) and the reference range/Doppler bin coming from a second set of antennas are compensated. The corresponding phase compensation value (i.e. the phase offset determined for this compensation) may then be used for phase compensation of spectral values of other range/Doppler bins. For example, the phase offset may be determined for the spectral values coming from the second set of antennas of the reference range/Doppler bin and may after its determination be applied for compensation of spectral values coming from the second set of antennas of other range/Doppler bins (e.g. other peaks of the range/Doppler map).

In particular values coming from analog-to-digital conversion of received radar signals (possibly already mixed and/or filtered) are used as a basis for the error compensation.

The first receiving circuit 1901 and the second receiving circuit 1902 are for example (at least partially) implemented by a respective MMIC. However, each receiving circuit 1901, 1902 may also comprise several MMICs and/or there may be more than two receiving circuits 1901, 1902, each implementing or including at least one MMIC.

Each MMIC may have a plurality of receive channels (e.g., the number of four receive channels is only an example value and no limitation).

FIG. 19 thus allows compensating errors between MMICs. Due to the compensation a higher angular accuracy is reached when using the Fourier transformation output values for direction of arrival determination. Since the determination of the phase offset operates (only) on the Fourier transformation output values for the determined range/Doppler bin, the amount of data to be considered for the phase offset determination is relatively low (compared to, e.g., using all reception signal samples provided at the ADC output) and can thus be efficiently implemented. This beneficially allows for online phase error compensation, i.e. phase error compensation while the radar receiving system is in use, e.g., during operation of a vehicle. Also, an adaptation to changing conditions and/or situations (e.g., temperature changes which may result in changed phase differences between MMICs) is feasible.

The radar receiving system may be a radar receiving system for receiving FMCW radar signals or for receiving PMCW (phase modulated continuous-wave) radar signals. Although the delay changes in the MMICs are not the same for PMCW and for FMCW, the effects at application level are comparable, i.e. a linear phase variation of the results of the Doppler FFT across antenna can be expected but in practical application phase error differences occur when cascading MMICs. For compensation of such errors, a similar approach as described above for FMCW radar may be applied to PMCW radar. In case of PMCW, the reception processing may not include a range FFT, but there is a Doppler FFT which results in values for range/Doppler bins.

The radar receiving system may use various modulation types such as TDM (Time Division Multiplexing), CDM (Code Division Multiplexing) or DDM (Doppler Division Multiplexing).

The components of the radar receiving system 1900 may be implemented by one or more circuits. A circuit may be any kind of a logic implementing entity, realized in hardware, software, firmware, or any combination thereof. The circuit may be a hard-wired logic circuit or a programmable logic circuit such as a programmable processor. The circuit may also be software being implemented or executed by a processor, e.g., any kind of computer program. Also, other kind of implementations of the respective functions which are described herein may also be understood as circuit.

The receiving circuits may be implemented as hardware (e.g., integrated) circuits.

Figure 20:
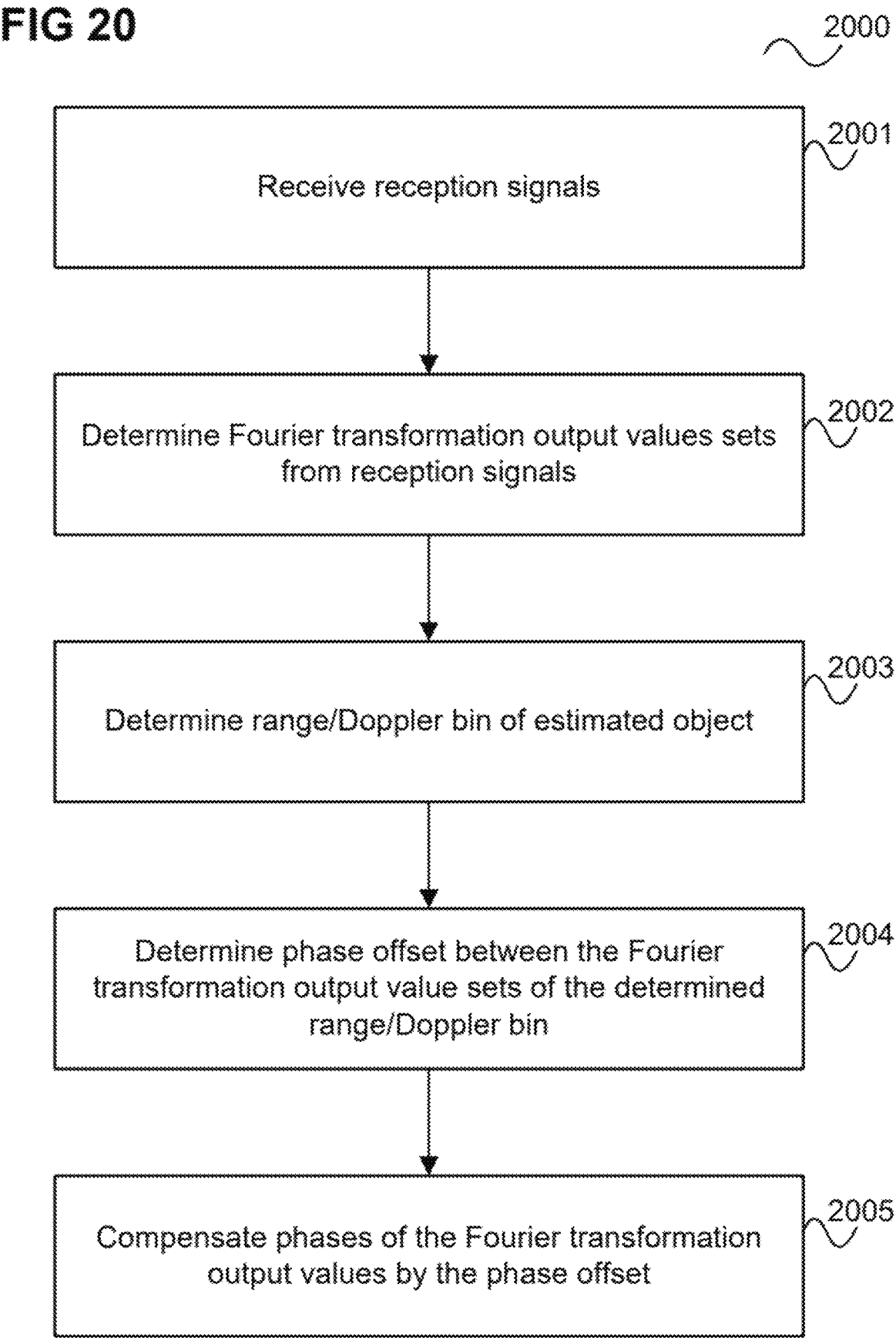
FIG. 20 shows a flow diagram illustrating a method for compensating a phase error between radar receiving circuits according to one embodiment.

FIG. 20 shows a flow diagram illustrating a method for compensating a phase error between radar receiving circuits.

At 2001, a first plurality of reception signals is received via a first set of antennas of a first receiving circuit and a second plurality of reception signals is received via a second set of antennas of a second receiving circuit.

At 2002, a first set of Fourier transformation output values including Fourier transformation output values assigned to each of a plurality of range/Doppler bins is generated from the first plurality of reception signals, and a second set of Fourier transformation output values including Fourier transformation output values assigned to each of the plurality of range/Doppler bins is generated from the second plurality of reception signals.

At 2003, a range/Doppler bin of the plurality of range/Doppler bins is determined (e.g. selected based on a certain criterion, e.g. based on a threshold) as an estimate of a range and speed of an object from the first set of Fourier transformation output values and the second set of Fourier transformation output values.

At 2004, a phase offset between the Fourier transformation output values of the first set of Fourier transformation output values that are assigned to the range/Doppler bin which was determined as the estimate and the Fourier transformation output values of the second set of Fourier transformation output values that are assigned to the range/Doppler bin which was determined as the estimate is determined.

At 2005, the phases of at least a part of the second set of Fourier transformation output values are compensated by the determined phase offset.

Example Embodiment: Distributed Processing

The radar system may comprise several radar devices, in particular MMICs and/or ECUs. For example, a car may comprise several ECUs with different processing power. A few ECUs might be coupled to MMICs.

The error compensation vector can be determined and/or utilized by at least two radar devices. Taking the ECU as example radar device, the following examples may apply:
- the error compensation vector can be determined by a first ECU based on information or data provided by a second ECU; such information or data may be a portion of the error compensation vector or configuration or calibration data;
- the error compensation vector can be compiled by the second ECU and supplied to the first ECU; the error compensation vector is then applied by the first ECU; in this scenario the error compensation vector does not have to be calculated by the first ECU; as an option, data necessary to calculate the error compensation vector may be supplied to the second ECU in advance;
- several pieces of information and/or portions of the error compensation vector may be compiled by separate ECUs and conveyed to the first ECU to determine the error compensation vector that it then applies;
- the second ECU may compile an error compensation vector and supply it to several other ECUs.

The portion of the error compensation vector may be any information or data that can be used to compile the error compensation vector.

The distributed processing approach bears the advantage that powerful ECUs can be used for dedicated processing purposes. Also, idle ECUs can be used to process (portions of) the error compensation vector in order to increase the overall performance of the system.

In order for the shared processing to efficiently work, meta data can transmitted between radar devices. The meta data may be any data that can be (directly or indirectly) used to compile or adjust the error compensation vector or to configure or adjust an MMIC. Meta data may in particular refer to data that can be used for configuration and/or calibration purposes.

Figure 28:
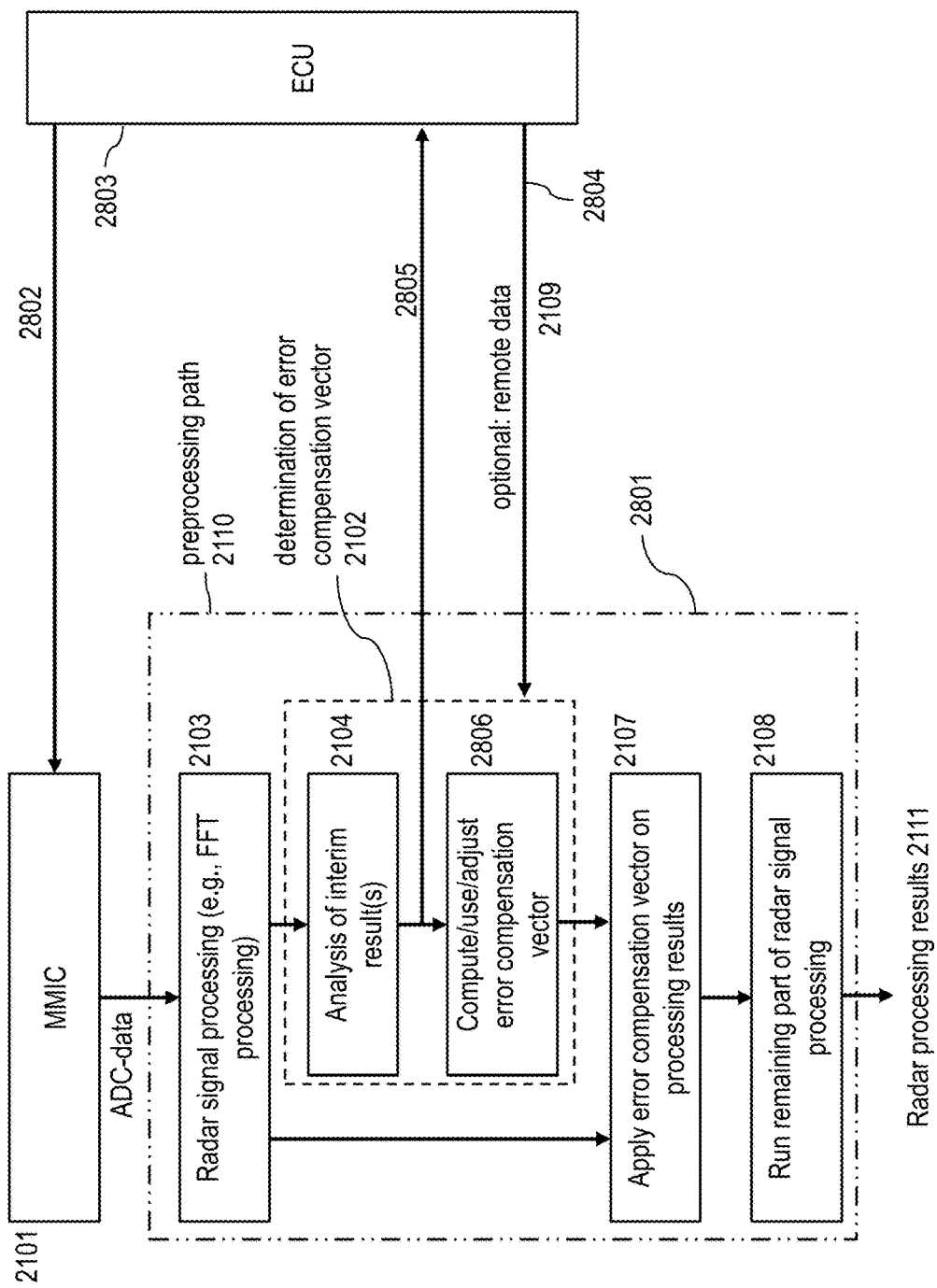
FIG. 28 shows an example diagram that is based on FIG. 21 with distributed processing among several ECUs.

FIG. 28 shows an example diagram that is based on FIG. 21. In this example, the preprocessing path 2110 is implemented in an ECU 2801. In this example, the MMIC 2101 is a separate device of the radar system that provides ADC data to the ECU 2801.

Remote data 2109 is conveyed from another ECU 2803 via a network connection 2804. This ECU 2802 may also be able to convey configuration or calibration data to the MMIC 2101 via a network connection 2802. This configuration or calibration data may affect how the ECU 2801 computes and utilizes the error compensation vector.

It is noted that the ECU 2803 may be replaced by several ECUs or devices of the radar system that are able to communicate with the MMIC 2101 and/or the ECU 2801. Hence, the ECU 2803 can be replaced by a network of radar devices.

In combination with the MMIC 2101 and/or the ECU 2801, the ECU 2803 can be used to provide or determine directly or indirectly (at least a portion of) information that could be used regarding the error compensation vector.

When the ECU 2803 provides at least a portion of the error compensation vector, it may receive information selected by the ECU 2801 via a communication link 2805 to the ECU 2803.

At 2806 at the ECU 2801, the error compensation vector is computed, adjusted or used based on information or data provided by the ECU 2803 either directly or indirectly to the ECU 2801 or via the MMIC 2101.

It is also an option that the ECU 2803 indicates to the MMIC 2101 whether or not the error compensation vector is to be calculated (e.g., for a certain amount of time or a predetermined number of iterations). For example, if the error compensation vector is not to be adjusted or calculated, it is branched from act 2103 directly to act 2107 omitting block 2102.

A radar device, e.g., ECU, may in particular send the following information/data to another radar device (combinations thereof are feasible):
 a decision (e.g., trigger) whether or not to compute or adjust the error compensation vector;
 start-up information that could be run for a limited time and/or a limited number of iterations and can be used to initially determine the error compensation vector or as an initial error compensation vector;
 address information (e.g., for the radar data cube) to select data that are used for computing the error compensation vector;
 a selection of interim results that are used to compile an error compensation vector;
 an error compensation vector or a portion thereof;
 an information that can be used to compile the error compensation vector;
 configuration or calibration data that can be used to compile at least one error compensation vector;
 configuration or calibration data for at least one MMIC.

The radar devices may communicate via a wired or wireless connection. ECUs may use, e.g., an Ethernet connection to communicate with devices of the radar system.

The communication with the external ECU may be done at a slower rate compared to the internal processing. Hence, the adjustment of the error compensation vector using information from the external ECU may be done merely every N-th cycle, wherein an inner loop may determine/utilize (or not) the error compensation vector each cycle.

It is noted that the error compensation vector can be calculated
 at least partially locally,
 locally,
 at least partially remotely, or
 remotely.

Also combinations of the above might apply, e.g., at different time frames. For example, every k-th calculation period, external information can be considered when updating the error compensation vector.

Of course, the error compensation vector might be compiled (in part or fully) externally and then be provided at a predetermined time scheme to the local ECU for further computation and/or adjustment purposes. This example is shown in FIG. 8: the remote ECU 821 computes the error compensation vector, which is provided to and used by the ECU 820.

It is also an option that a remote ECU compiling an error compensation vector decides whether or when to send this error compensation vector to at least one other ECU. Hence, the remote ECU might compare the updated error compensation vector with its predecessor and thus decide that the change of the error compensation vector is not significant (i.e. falls below a predetermined threshold) to convey an update to the other ECU(s). In other words, the remote ECU may be able to decide that an update is deemed sufficiently significant to be conveyed across the communication interface to the other ECU(s). This beneficially reduces the communication load of the network, which is in particular useful if many receiving ECUs are implemented. Also, this may apply to an information that may lead to an update of the error compensation vector or to merely a portion of the error compensation vector.

It is noted that the MMIC and the ECU may be realized as different physical entities or as a combined physical device.

Safety Concept

It might be a safety concern to apply an error compensation vector without having a solution to check whether it is suitable, e.g., if the error compensation vector deviates from an expected (maximum) variation (also regarded as tolerance or range). Leaving the variation may show that the system does not work properly. As a consequence, an predefined action might be triggered, e.g., an error or alarm notification may be issued and/or the system may enter a safe state.

Examples described herein in particular solve issues that are relevant for functional safety of a radar system, which could be implemented in a vehicle. It has to be ensured that dynamic error compensation is conducted but stays within predefined safety margins.

One example use case scenario for radar systems is assisted driving and automated driving of vehicles. Especially in these use cases the functional safety of higher resolutions radar systems is deemed crucial.

Figure 29:
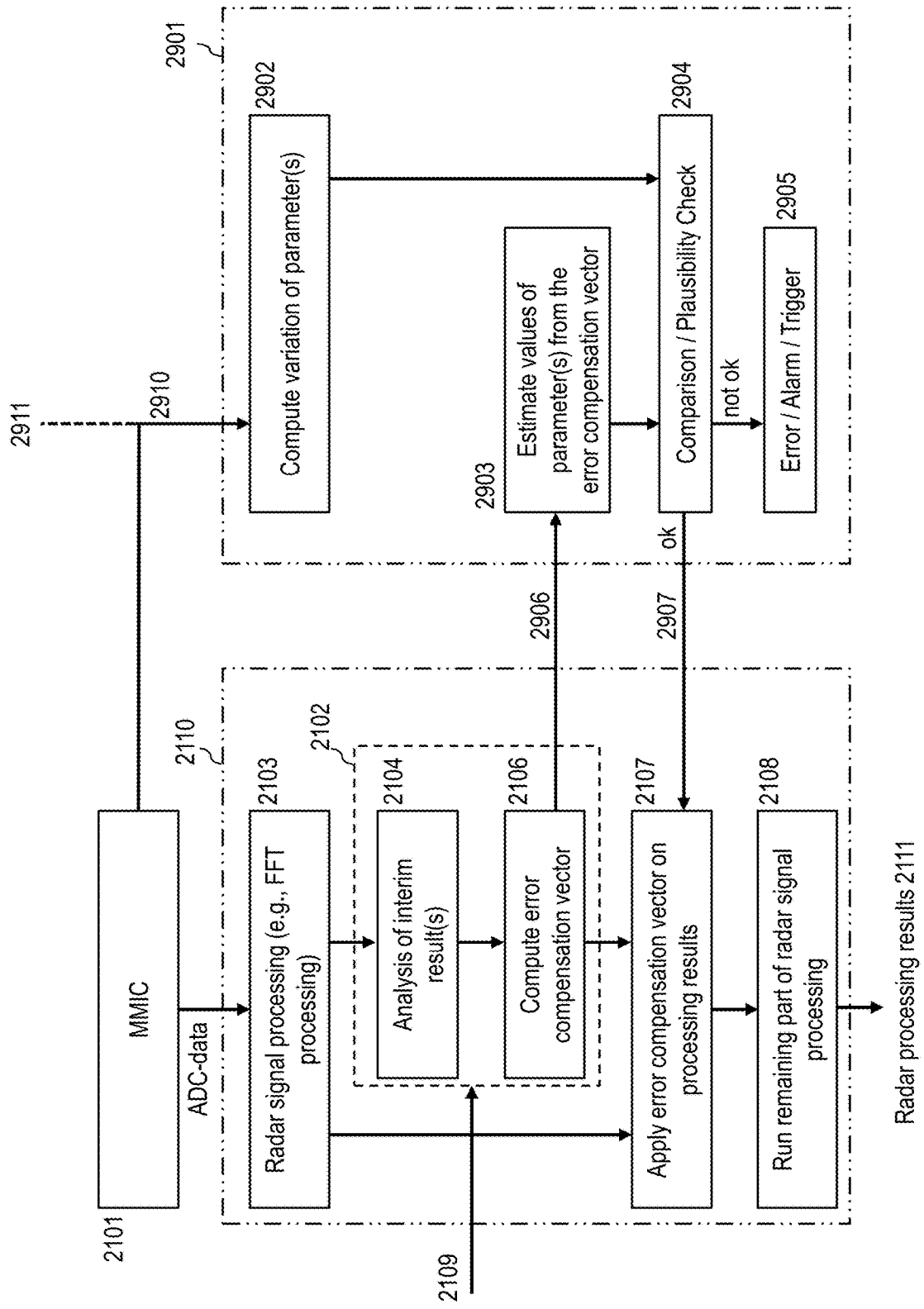
FIG. 29 shows an example diagram based on FIG. 21 adding an functional safety block.

FIG. 29 shows an example diagram comprising the block diagram of FIG. 21 and a functional safety block 2901.

Configuration data and/or meta data 2910 are provided to the functional safety block 2901 by the MMIC 2101 and/or at least one other MMICs or radar system device 2911 (e.g., ECU). The configuration data and/or meta data may provide directly or indirectly parameters that may comprise at least one MMIC parameter, at least one antenna parameter, at least one radar (system) parameter, or at least one parameter that is derived from the radar system or any of its components.

The configuration data and/or meta data 2910 are processed in act 2902 computing a variation of at least one parameter in particular based on, e.g., an MMIC configuration.

In act 2903, the functional safety block 2901 is provided with the computed error compensation vector (via a connection 2906 allowing act 2106 to provide the error compensation vector to the functional safety block 2901) and estimates at least one value of parameters (e.g., MMIC parameters) based on (i.e. from) this error compensation vector. In other words, act 2903 allows computing an estimation of the value of at least one involved parameter that would have led to the error compensation vector. An example how this can be achieved will be provided below.

Further, in act 2904, the functional safety block 2901 conducts a comparison or plausibility check based on the estimated values of the at least one parameter determined in act 2903 and the variation of the at least one parameter determined in act 2902. If a predefined condition is met, the comparison and/or plausibility is deemed "ok", i.e. no critical functional safety could be detected or "not ok", i.e. at least one functional safety issue occurred. In the latter, in act 2905 an error and/or an alarm notification is issued and/or a predetermined action is triggered. In such case, the system may enter a non-critical state.

If no safety criticality has been detected, this could be indicated as shown by an notification 2907 towards the preprocessing path 2110, which then in act 2107 applies the (with regard to functional safety confirmed to be non-critical) error compensation vector. It is noted, however, that the communication towards the preprocessing path 2110 is optional as, e.g., act 2905 may override any further utilization of the error compensation vector. In another implementation, act 2107 may require the notification 2907 to arrive before a time-out; otherwise, act 2107 will not apply the error compensation vector and issue an error/alarm notification and/or enter a safe state on its own.

The approach described herein could also be used for diagnostic purposes of at least one component of the radar system, e.g., at least one MMIC or ECU.

Meta data, in particular MMIC or ECU meta data, that could be part of the data 2910 may comprise at least one of the following:
configuration parameters:
  transmitter phase;
  transmitter power;
  receiver gain;
operating conditions:
  MMIC temperature;
  transmitter temperature;
  junction temperature of transmitters;
  receiver temperature;
  junction temperature of receivers;
diagnostic information:
  phase error between transmitters;
  phase error between receivers;
  phase error between transmitter(s) and receiver(s);
  gain mismatch between receivers;
  power mismatch between transmitters;
  cut-off frequency/frequencies of analog filters of receiver(s).

Examples for meta data may comprise ECU temperature or an ECU parameter like power, gain or phase. The ECU parameter may be regarded between transmit and/or receive antenna(s). Also, a substrate gain or phase variation with temperature may be regarded as meta data. Meta data may hence comprise also combinations of the data mentioned above.

Figure 30:
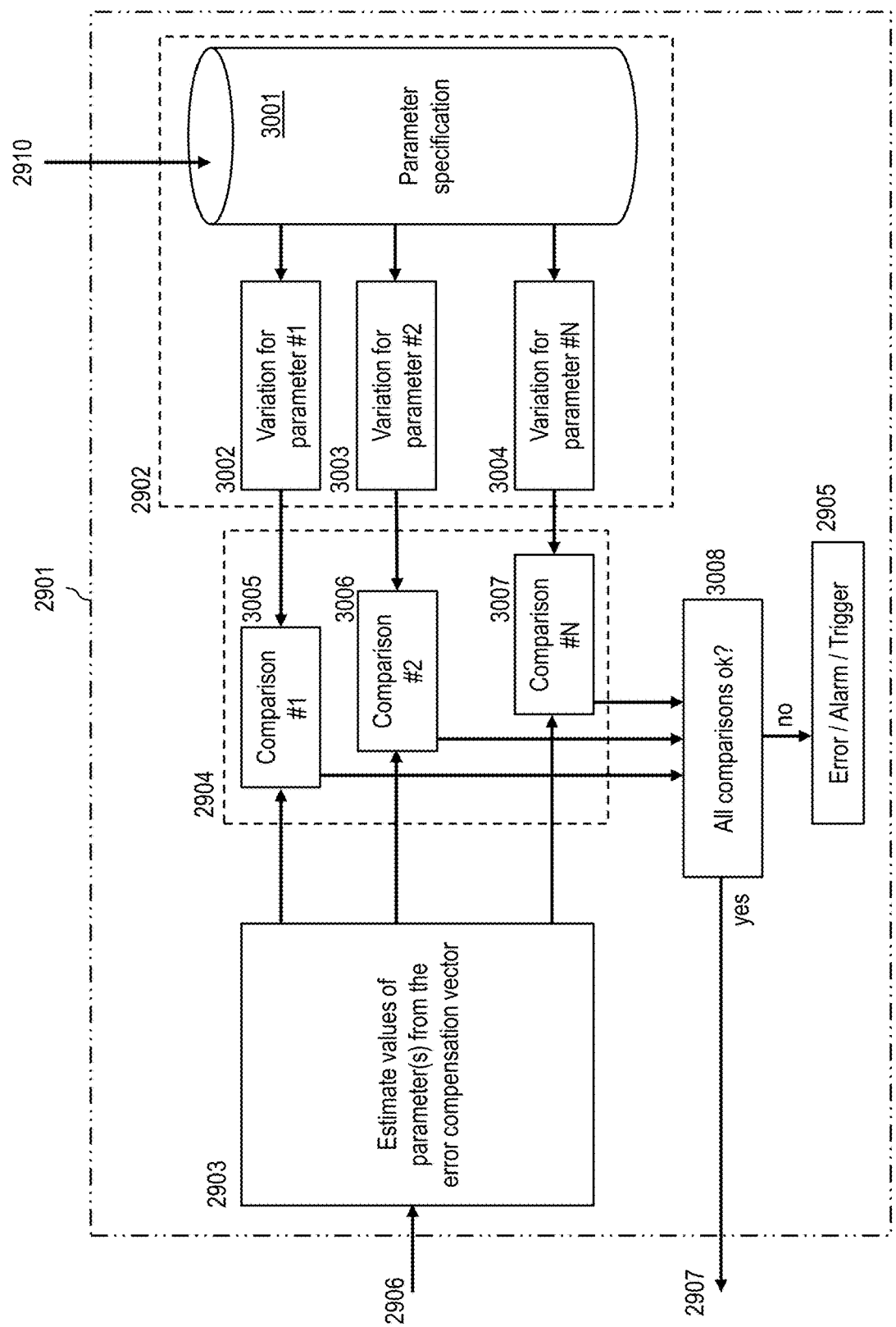
FIG. 30 shows an example schematic implementation of the functional safety block determining (maximum) variations for different parameters, in particular MMIC parameters.

FIG. 30 shows an example schematic implementation of the functional safety block 2901 determining (maximum) variations for different parameters, in particular MMIC parameters.

The configuration data and/or meta data 2910 are conveyed to a parameter specification 3001, which may be realized as a table or database. Maximum variation values for parameters #1 to #N are determined by functional blocks 3002 to 3004 based on data supplied by the parameter specification 3001.

As explained with regard to FIG. 29 above, act 2903 estimates values of parameters #1 to #N from the error compensation vector.

Act 2904 of FIG. 29 is split into several comparisons 3005 to 3007: Comparison 3305 conducts the comparison for parameter #1, comparison 3006 conducts the comparison for parameter #2 and comparison 3307 conducts the comparison for parameter #N.

It is noted that for each parameter #1 to #N a single comparison as well as a maximum variation functional block can be provided.

In act 3008 it is checked whether all comparisons #1 to #N are ok, i.e. the estimated parameter computed from the error compensation vector falls within a predefined variation set via the parameter specification 3001. If this is the case, the error compensation vector is applied (indicated by the notification 2907 as explained with regard to FIG. 29 above). If the comparison reveals that at least one comparison falls outside the given variation, it is branched to act 2905 (see also explanation with regard to FIG. 29 above).

An example of how the mechanism of FIG. 30 works can be summarized as follows: In act 2903 it is determined that
  an estimated parameter "phase error" for a transmitter #2 amounts to +2.2°; and
  an estimated parameter "phase error" for a receiver #3 amounts to −0.3°.

The parameter specification 3001 allows determining
  the parameter "phase error" of any transmitter to remain within a variation of ±3.0°; and
  the parameter "phase error" of any receiver to remain within a variation of ±0.5°.

A first comparison reveals that the estimated parameter "phase error" for the transmitter #2 is +2.2° and thus within the given variation of ±3.0°. Hence the first comparison is "ok", no violation of the maximum variation is indicated.

A second comparison reveals that the estimated parameter "phase error" for the receiver #3 is −0.3° and thus with the given variation of ±0.5°. Hence the second comparison is "ok", no violation of the maximum variation is indicated.

As the first comparison and the second comparison are "ok", the error compensation vector can be applied.

Figure 31:
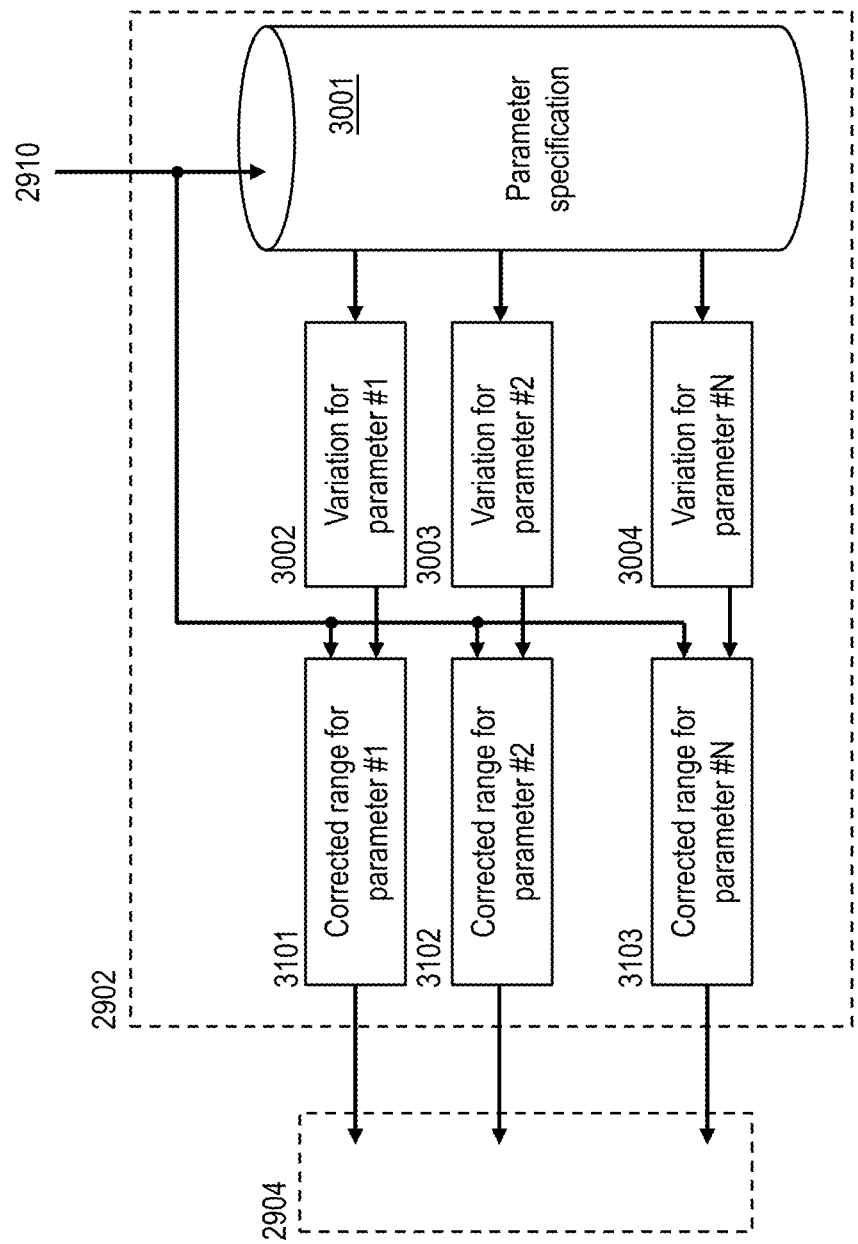
FIG. 31 shows an alternative implementation to determine a corrected variations for the respective parameters.

FIG. 31 shows an alternative implementation of act 2902 based on the variant shown in FIG. 30. The output of the functional block 3002 is conveyed to a functional block 3101, which determines a correction, i.e. an corrected variation for the parameter #1 and then conveys the corrected variation towards act 2904.

The configuration data and/or meta data 2910 are also conveyed to the input of the functional block 3101 supplying this functional block 3101 in particular with meta to be considered for correcting the variation of the parameter #1.

Accordingly, functional blocks 3102 and 3103 are provided to correct the variations of the parameter #2 and the parameter #N. These functional blocks 3102 are also supplied with the data 2910.

An example of how the corrected maximum variation is determined can be summarized as follows: In act 2903 it is determined that
  an estimated parameter "phase imbalance" between a transmitter #1 and a transmitter #2 amounts to +2.2°.

Based on the data 2910,
a parameter "phase imbalance" at 25° C. is ±1.0° (obtained via the parameter specification 3001);
a parameter "temperature drift" amounts to +2° per 50° C. junction temperature increase (obtained via the parameter specification 3001); and
the "MMIC junction temperature" received from meta data is 40° C.

The corrected maximum variation determined by the functional block 3101 at 40° C. MMIC junction temperature amounts to $$\pm 1° + 2° \cdot \frac{40° \ C - 25° \ C}{50° \ C} = \pm 1° + 0.6°$$

Hence, the phase imbalance at the transmitter #1 should be between −0.4° and +1.6°. The estimated parameter amounting to +2.2° violates this safety condition, resulting in an error or alarm notification and/or triggering a predetermined action as described with regard to act 2905 above.

As an option, a tolerance could be added to the meta data "MMIC junction temperature".

The concept described herein is applicable for frequency-modulated continuous wave (FMCW) radar systems or phase-modulated continuous wave (PMCW) radar systems.

It is noted that the variation, in particular the maximum variation, determined in act 2902 may be a single value or a set of values (e.g., a vector). This applies accordingly to the corrected (maximum) variation.

The solution applies for the use of a single MMIC or for several MMICs, in particular an array of cascaded MMICs.

Figure 32:
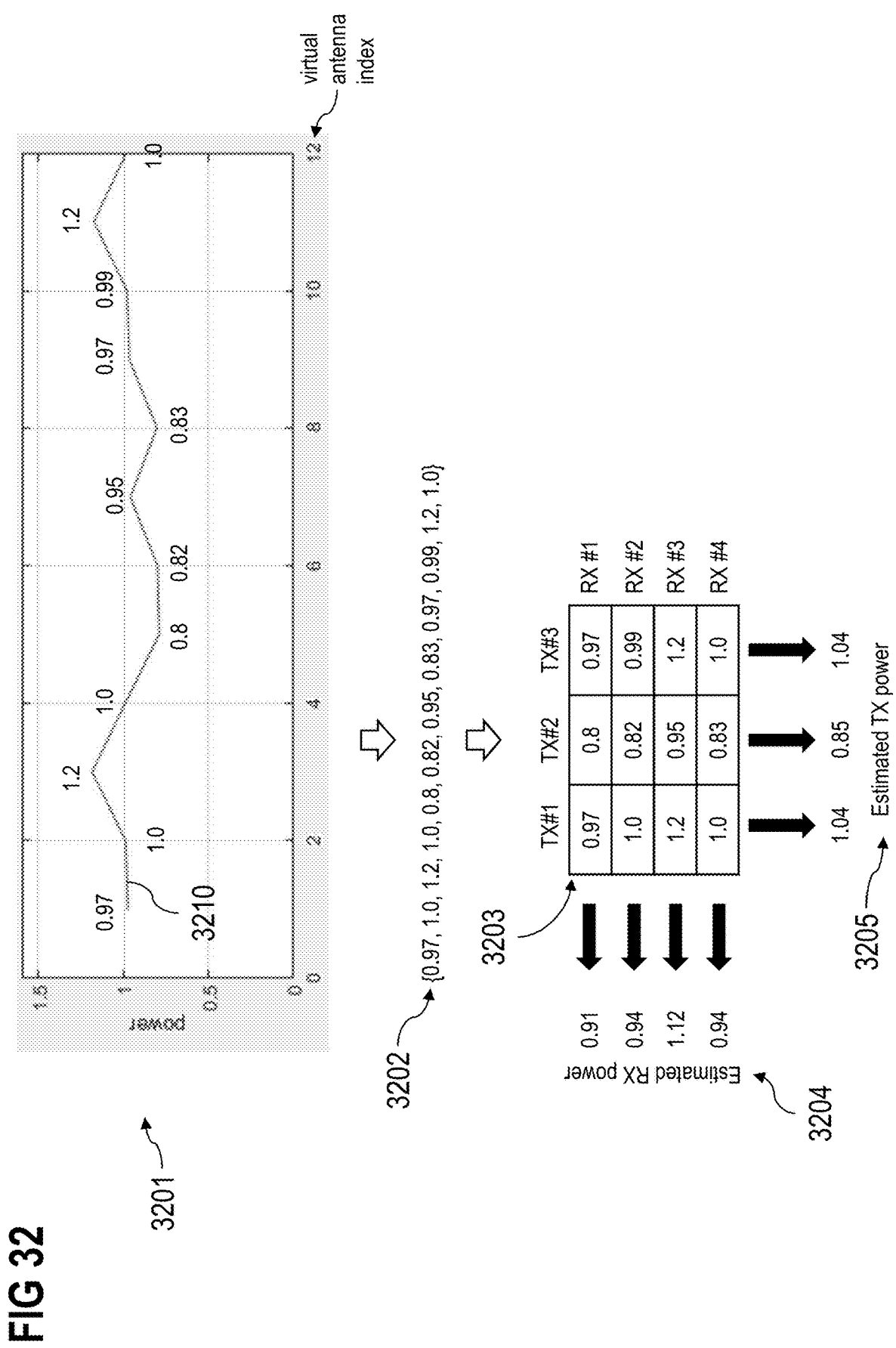
FIG. 32 shows a diagram illustrating an example implementation and operation of how the estimate values of the parameter(s) can be determined based on the error compensation vector.

FIG. 32 shows a diagram illustrating an example implementation and operation of act 2903, i.e. how the estimate values of the parameter(s) can be determined based on the error compensation vector.

A diagram 3201 shows a graphical representation of an error compensation vector 3210, which has a value for each virtual antenna index. In this example, three transmitters (TXs) and four receivers (RXs) result in 3·4=12 values for the error compensation vector 3210. In vector notation the error compensation vector 3202 is as follows:
{0.97, 1.0, 1.2, 1.0, 0.8, 0.82, 0.95, 0.83, 0.97, 0.99, 1.2, 1.0}.

A matrix 3203 comprises three columns for each of the transmitters TX #1 to TX #3 and four rows for each of the receivers RX #1 to RX #4. The entries of the matrix represent one value of the error compensation vector 3202 for the respective combination of transmitter and receiver.

For each receiver RX #1 to RX #4, an estimated RX power is determined by calculating an average value of each of the lines. For example, the estimated power for RX #2 is calculated as follows:

$$\frac{1.0 + 0.82 + 0.99}{3} = 0.94$$

For each transmitter TX #1 to TX #3, an estimated TX power is determined by calculating an average value of each of the columns. For example, the estimated power for TX #3 is calculated as follows:

$$\frac{0.97 + 0.99 + 1.2 + 1.0}{4} = 1.04$$

The result shows estimated RX power values 3204 and estimated TX power values 3205 that can be used in act 2904.

This example can be applied to values other than the power/gain accordingly. For example, a phase information can be used instead of the power.

According to an example, a method for processing radar signals may comprise:
determining a variation of at least one radar parameter provided from at least one radar device;
determining an estimated value of at least one parameter from an error compensation vector;
determining a safety condition based on the variation and the estimated value for the respective parameter.

Hence, the solution presented allows determining whether a safety condition is met and thus whether it is safe to apply the previously determined error compensation vector. The safety condition may comprise a comparison or several comparisons. A single comparison can be used for each of the parameters. It can be determined whether a single parameter falls outside a predefined (maximum) variation thereby triggering a predefined action and/or not applying this particular error compensation vector.

It is noted that several radar parameters, of the same type or of different type can be provided from several radar devices, e.g., MMICs and/or ECUs. The radar device may employ several transmitters and/or receivers.

According to an example,
the error compensation vector is applied if the safety condition is met; and
the error compensation vector is not applied if the safety condition is not met.

According to an example, a predefined action is triggered if the safety condition is not met.

The predefined action may be an error or alarm notification and/or a trigger for the system to enter a safe state.

According to an example, for each radar parameter the variation is determined based on configuration data and/or meta data.

According to an example, for each radar parameter the estimated value is determined from at least one error compensation vector.

According to an example, the radar device is at least one of the following: an MMIC or an ECU.

According to an example, the safety condition comprises comparing the variation with the estimated value for the respective parameter.

According to an example, the safety condition is met in case the estimated value falls within the variation and the safety condition is not met in case the estimated value does not fall within the variation.

According to an example, the safety condition is only met if the estimated value falls within the variation for each parameter or for a predefined subset of parameters.

According to an example, a corrected variation is determined based on meta data and/or on data that has not been used to compute the error compensation vector.

According to an example, the error compensation vector is determined comprising the acts:
receiving reception signals via at least one antenna of a first receiving circuit;
determining an interim result by processing the reception signals via a frequency transformation;
determining an error compensation vector based on the interim result and an expected characteristic;

if the safety condition is met, applying the error compensation vector on other reception signals that have been processed via the frequency transformation.

According to an example, the error compensation vector is further determined based on
- at least a portion of the error compensation vector, and/or
- an information for the computation, adjustment or utilization of the error compensation vector received from an external device.

According to an example, a device may be configured to conduct the acts of the method as described herein.

Further Examples an Embodiments

Various Examples are described in the following:

Example 1 is a radar receiving system as described with reference to FIG. 19.

Example 2 is the radar receiving system of Example 1, wherein the first plurality of antennas is a first antenna sub-array of a radio device antenna array and the second plurality of antennas is a second antenna sub-array of the radio device antenna array.

Example 3 is the radar receiving system of Example 2, wherein the first antenna sub-array or the second antenna sub-array or both are full linear arrays, sparse arrays, azimuth only arrays or being azimuth and elevation arrays.

Example 4 is the radar receiving system of any one of Examples 1 to 3, wherein the first set of Fourier transformation output values includes a Fourier transformation output value assigned to each of a plurality of range/Doppler bins for each of the first plurality of antennas and wherein the second set of Fourier transformation output values includes a Fourier transformation output value assigned to each of a plurality of range/Doppler bins for each of the second plurality of antennas.

Example 5 is the radar receiving system of Example 4, wherein the phase compensation circuit is configured to determine the phase offset such that after compensation of the phases of the Fourier transformation output values of the first set of Fourier transformation output values that are assigned to the range/Doppler bin which was determined as the estimate and the Fourier transformation output values of the second set of Fourier transformation output values that are assigned to the range/Doppler bin which was determined as the estimate fit a common model of a relation between antenna and of Fourier transformation output value phase.

Example 6 is the radar receiving system of Example 5, wherein the first plurality of antennas is a first antenna sub-array of a radio device antenna array and the second plurality of antennas is a second antenna sub-array of the radio device antenna array and the first plurality of antennas and the second plurality of antennas are arranged in a sequence in the antenna array and the relation is a relation between the antenna position in the sequence and the phase of the Fourier transformation output value assigned to the range/Doppler bin determined as the estimate for the antenna at the antenna position.

Example 7 is the radar receiving system of Example 6, wherein the common model is linear model giving a linear relation between antenna position in the sequence and the phase of the Fourier transformation output value assigned to the range/Doppler bin determined as the estimate for the antenna at the antenna position.

Example 8 is the radar receiving system of any one of Examples 5 to 7, wherein determining the phase offset includes minimizing the error between the phases of the Fourier transformation output values assigned to the range/Doppler bin determined as the estimate for the second plurality of antennas and the common model.

Example 9 is the radar receiving system of any one of Examples 5 to 8, wherein determining the phase offset includes determining a first model of the relation between antenna and of Fourier transformation output value phase for the first plurality of antennas, determining a second model of the relation between antenna and of Fourier transformation output value phase for the second plurality of antennas and determining the phase offset by minimizing an error between one or more model parameters of the common model and corresponding one or more model parameters of the first model and the second model over a set of candidate phase offsets.

Example 10 is the radar receiving system of Example 9, wherein the common model, the first model and the second model are linear models and the one or more model parameters are the slope of the respective linear model.

Example 11 is the radar receiving system of any one of Examples 1 to 10, wherein the phase compensation circuit is configured to determine the phase offset by means of a neural network.

Example 12 is the radar receiving system of Example 11, wherein the neural network is a neural network trained to determine a phase offset for at least one plurality of reception signals using an input of phases of a first plurality of reception signals and a second plurality of reception signals.

Example 13 is the radar receiving system of any one of Examples 1 to 12, wherein the phase compensation circuit is further configured to compensate the phases of at least a part of the first set of Fourier transformation output values by the determined phase offset.

Example 14 is the radar receiving system of Example 13, wherein the phase compensation circuit is configured to compensate the phases of at least a part of the Fourier transformation output values of the first set of Fourier transformation output values that are assigned to range/Doppler bins other than the range/Doppler bin determined as the estimate or the phases of at least a part of the Fourier transformation output values of the second set of Fourier transformation output values that are assigned to range/Doppler bins other than the range/Doppler bin determined as the estimate or both.

Example 15 is the radar receiving system of any one of Examples 1 to 14, further including a direction determination circuit configured to determine the direction of one or more objects using the phases of the Fourier transformation output values of the first set of Fourier transformation output values and the second Fourier transformation output values after the compensation by the phase compensation circuit.

Example 16 is the radar receiving system of any one of Examples 1 to 15, wherein the object detector is configured to determine the range/Doppler bin of the plurality of range/Doppler bins by determining the range/Doppler bin of the plurality of range/Doppler bins having the highest aggregate Fourier transformation output value over the first plurality of antennas and second plurality of antennas in terms of absolute value.

Example 17 is the radar receiving system of any one of Examples 1 to 16, wherein the first receiving circuit includes a first Monolithic Microwave Integrated Circuit and the second receiving circuit includes a second Monolithic Microwave Integrated Circuit.

Example 18 is the radar receiving system of any one of Examples 1 to 17, wherein the first receiving circuit is configured to generate a first plurality of intermediate frequency signals from the first plurality of reception signals and the second receiving circuit is configured to generate a second plurality of intermediate frequency signals from the second plurality of reception signals and wherein the spectral analyzer is configured to process the first plurality of intermediate frequency signals by a Fourier transformation over sampling times followed by a Fourier transformation over chirp times to generate the first set of Fourier transformation output values and to process the second plurality of intermediate frequency signals by a Fourier transformation over sampling times followed by a Fourier transformation over chirp times to generate the second set of Fourier transformation output values.

Example 19 is the radar receiving system of Example 18, wherein the phase compensation circuit is configured to compensate at least a part of the results of the Fourier transformation over sampling times of the second plurality of intermediate frequency signals by the determined phase offset.

Example 20 is the radar receiving system of any one of Examples 1 to 19, including a plurality of radar receiving devices, wherein at least some of the receiving circuits, the spectral analyzer, the object detector and the phase compensation unit are arranged in different radar receiving devices.

Example 21 is the radar receiving system of Example 20, wherein a first radar receiving device of the plurality of radar receiving devices includes the spectral analyzer and a second radar receiving device of the plurality of radar receiving devices includes the phase compensation circuit and the first radar receiving device is configured to transmit the first set of Fourier transformation output values and the second set of Fourier transformation output values to the second radar receiving device.

Example 22 is the radar receiving system of any one of Examples 1 to 21, wherein the radar receiving system is a frequency modulated continuous-wave radar receiving system, a phase modulated continuous-wave radar receiving system or an orthogonal frequency division multiplexing radar receiving system.

Example 23 is the radar receiving system of any one of Examples 1 to 22, configured to regularly determine a phase offset and to perform determination of one or more range/Doppler maps using a determined phase offset until determining a new phase offset.

Example 24 is a method for compensating a phase error between radar receiving circuits as described with reference to FIG. 20.

Example 25 is the method of Example 24, wherein the first plurality of antennas is a first antenna sub-array of a radio device antenna array and the second plurality of antennas is a second antenna sub-array of the radio device antenna array.

Example 26 is the method of Example 25, wherein the first antenna sub-array or the second antenna sub-array or both are full linear arrays, sparse arrays, azimuth only arrays or being azimuth and elevation arrays.

Example 27 is the method of any one of Examples 24 to 26, wherein the first set of Fourier transformation output values includes a Fourier transformation output value assigned to each of a plurality of range/Doppler bins for each of the first plurality of antennas and wherein the second set of Fourier transformation output values includes a Fourier transformation output value assigned to each of a plurality of range/Doppler bins for each of the second plurality of antennas.

Example 28 is the method of Example 27, including determining the phase offset such that after compensation of the phases of the Fourier transformation output values of the first set of Fourier transformation output values that are assigned to the range/Doppler bin which was determined as the estimate and the Fourier transformation output values of the second set of Fourier transformation output values that are assigned to the range/Doppler bin which was determined as the estimate fit a common model of a relation between antenna and of Fourier transformation output value phase.

Example 29 is the method of Example 28, wherein the first plurality of antennas is a first antenna sub-array of a radio device antenna array and the second plurality of antennas is a second antenna sub-array of the radio device antenna array and the first plurality of antennas and the second plurality of antennas are arranged in a sequence in the antenna array and the relation is a relation between the antenna position in the sequence and the phase of the Fourier transformation output value assigned to the range/Doppler bin determined as the estimate for the antenna at the antenna position.

Example 30 is the method of Example 29, wherein the common model is linear model giving a linear relation between antenna position in the sequence and the phase of the Fourier transformation output value assigned to the range/Doppler bin determined as the estimate for the antenna at the antenna position.

Example 31 is the method of any one of Examples 28 to 30, wherein determining the phase offset includes minimizing the error between the phases of the Fourier transformation output values assigned to the range/Doppler bin determined as the estimate for the second plurality of antennas and the common model.

Example 32 is the method of any one of Examples 28 to 31, wherein determining the phase offset includes determining a first model of the relation between antenna and of Fourier transformation output value phase for the first plurality of antennas, determining a second model of the relation between antenna and of Fourier transformation output value phase for the second plurality of antennas and determining the phase offset by minimizing an error between one or more model parameters of the common model and corresponding one or more model parameters of the first model and the second model over a set of candidate phase offsets.

Example 33 is the method of Example 32, wherein the common model, the first model and the second model are linear models and the one or more model parameters are the slope of the respective linear model.

Example 34 is the method of any one of Examples 24 to 33, including determining the phase offset by means of a neural network.

Example 35 is the method of Example 34, wherein the neural network is a neural network trained to determine a phase offset for at least one plurality of reception signals using an input of phases of a first plurality of reception signals and a second plurality of reception signals.

Example 36 is the method of any one of Examples 24 to 35, further including compensating the phases of at least a part of the first set of Fourier transformation output values by the determined phase offset.

Example 37 is the method of Example 36, including compensating the phases of at least a part of the Fourier transformation output values of the first set of Fourier transformation output values that are assigned to range/Doppler bins other than the range/Doppler bin determined as the estimate or the phases of at least a part of the Fourier transformation output values of the second set of Fourier transformation output values that are assigned to range/Doppler bins other than the range/Doppler bin determined as the estimate or both.

Example 38 is the method of any one of Examples 24 to 37, further including determining the direction of one or more objects using the phases of the Fourier transformation output values of the first set of Fourier transformation output values and the second Fourier transformation output values after the compensation.

Example 39 is the method of any one of Examples 24 to 38, including determining the range/Doppler bin of the plurality of range/Doppler bins by determining the range/Doppler bin of the plurality of range/Doppler bins having the highest aggregate Fourier transformation output value over the first plurality of antennas and second plurality of antennas in terms of absolute value.

Example 40 is the method of any one of Examples 24 to 39, including receiving the first plurality of reception signals by a first Monolithic Microwave Integrated Circuit and receiving the second plurality of reception signals by a second Monolithic Microwave Integrated Circuit.

Example 41 is the method of any one of Examples 24 to 40, wherein the first receiving circuit generates a first plurality of intermediate frequency signals from the first plurality of reception signals and the second receiving circuit generates a second plurality of intermediate frequency signals from the second plurality of reception signals and the method includes processing the first plurality of intermediate frequency signals by a Fourier transformation over sampling times followed by a Fourier transformation over chirp times to generate the first set of Fourier transformation output values and processing the second plurality of intermediate frequency signals by a Fourier transformation over sampling times followed by a Fourier transformation over chirp times to generate the second set of Fourier transformation output values.

Example 42 is the method of Example 41, including compensating at least a part of the results of the Fourier transformation over sampling times of the second plurality of intermediate frequency signals by the determined phase offset.

Example 43 is the method of any one of Examples 24 to 42, wherein at least some of the receiving, the generating, the determining of the estimate and determining of the phase offset are performed by different radar receiving devices.

Example 44 is the method of Example 43, including transmitting the first set of Fourier transformation output values and the second set of Fourier transformation output values from a first radar receiving device to a second radar receiving device which performs the determining of the phase offset.

Example 45 is the method of any one of Examples 24 to 44, wherein the reception signals are frequency modulated continuous-wave radar signals, phase modulated continuous-wave radar signals or orthogonal frequency division multiplexing radar signals.

Example 46 is the method of any one of Examples 24 to 45, including regularly determining a phase offset and performing determination of one or more range/Doppler maps using a determined phase offset until determining a new phase offset.

According to a further Example, a radar receiving system is provided including first receiving means for receiving a first plurality of reception signals via a first plurality of antennas of a first receiving circuit; second receiving means for receiving a second plurality of reception signals via a second plurality of antennas of a second receiving circuit; generating means for generating, from the first plurality of reception signals, a first set of Fourier transformation output values including Fourier transformation output values assigned to each of a plurality of range/Doppler bins and, from the second plurality of reception signals, a second set of Fourier transformation output values including Fourier transformation output values assigned to each of the plurality of range/Doppler bins; first determining means for determining a range/Doppler bin of the plurality of range/Doppler bins as an estimate of a range and speed of an object from the first set of Fourier transformation output values and the second set of Fourier transformation output values; second determining means for determining a phase offset between the Fourier transformation output values of the first set of Fourier transformation output values that are assigned to the range/Doppler bin which was determined as the estimate and the Fourier transformation output values of the second set of Fourier transformation output values that are assigned to the range/Doppler bin which was determined as the estimate and compensating means for compensating the phases of at least a part of the second set of Fourier transformation output values by the determined phase offset.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A radar system comprising:
    a first antenna sub-array configured to receive a first plurality of antenna signals;
    a second antenna sub-array configured to receive a second plurality of antenna signals;
    a first signal processing circuit configured to receive the first plurality of antenna signals from the first antenna sub-array and perform processing thereon to form a first digitized antenna data set;
    a second signal processing circuit configured to receive the second plurality of antenna signals from the second antenna sub-array and perform processing thereon to form a second digitized antenna data set;
    a fast fourier transform (FFT) stage, comprising:
        a first, first stage FFT device configured to receive the first digitized antenna data set and output first preliminary processed digitized antenna data;
        a second, first stage FFT device configured to receive the second digitized antenna data set and output second preliminary processed digitized antenna data; and
        a second stage FFT device configured to receive the first and second preliminary processed digitized antenna data and output FFT processed antenna data that comprises an interim result, and wherein the FFT processed antenna data contain phase errors therein due to phase errors between the first signal processing circuit and the second signal processing circuit, wherein the output FFT processed antenna data comprise a range/Doppler map for each of a plurality of virtual antennas, and wherein each range/Doppler map comprises FFT peaks;
    an electronic control circuit configured to calculate an error compensation vector using the FFT processed antenna data and an expected characteristic in the calculating, wherein the expected characteristic is determined based on remote data or an intrinsic signal characteristic of at least one of the first and second received signals in one or several of a dimensions angle, range and Doppler range, and wherein the electronic control circuit is configured to apply the calculated error compensation vector to the FFT processed antenna data to generate compensated FFT processed antenna data, wherein the electronic control circuit is further configured to select one or more FFT peaks from the compensated FFT processed antenna data.

2. The radar system according to claim 1, wherein the interim result comprises a peak in the FFT processed antenna data or a coherent or a non-coherent integration of the FFT processed antenna data or a constant false alarm rejection (CFAR) processing of the FFT processed antenna data.

3. The radar system according to claim 1, wherein the electronic control circuit is configured to apply the error compensation vector on at least a portion of a data cube containing digitized antenna data sets.

4. The radar system according to claim 1, wherein the expected characteristic is determined by the electronic control circuit based on the remote data, and wherein the remote data comprises at least one of the following:
  data resulting from radar signal processing of a different radar system or a different signal processing circuit;
  data referring to a criterion indicating which portions of a memory/data cube are to be considered when determining the error compensation vector;
  data indicating characteristics and/or configuration information;
  initialization values based on which the error compensation vector is determined; and
  offset information.

5. The radar system according to claim 1, wherein the electronic control circuit is configured to further calculate the error compensation vector based on at least one of the following:
  a signal linearity,
  a signal invariability, and
  an anticipated signal behavior in at least one of the dimensions angle, range and Doppler range.

6. The radar system according to claim 1, wherein the electronic control circuit is configured to update the error compensation vector on a regular or an irregular basis and/or based on a trigger.

7. The radar system according to claim 1, wherein the electronic control circuit is configured to calculate the error compensation vector via at least one of the following:
  a machine-learning algorithm;
  an optimization algorithm;
  a self-adaptive algorithm;
  an interpolation algorithm; and
  a fitting model algorithm.

8. The radar system according to claim 1, wherein the electronic control circuit is configured to calculate the error compensation vector to reduce phase errors, amplitude errors and/or gain errors.

9. The radar system according to claim 1, wherein the electronic control circuit is configured to calculate the error compensation vector based on a history buffer utilizing raw data based on different signal reflections from different acquisitions.

10. The radar system according to claim 1, wherein the electronic control circuit is configured to use the error compensation vector to adjust a configuration of at least one device of the radar system.

11. The radar system according to claim 1, wherein the electronic control circuit is to switch on or switch off the calculating of the error compensation vector based on an acquisition mode.

12. The radar system according to claim 1, wherein the electronic control circuit is configured to calculate the error compensation vector in a first mode and apply the calculated error compensation vector in a second mode, wherein the second mode is triggered after the first mode.

13. The radar system according to claim 1, wherein the electronic control circuit is configured to further calculate the error compensation vector based further on:
  at least a portion of another error compensation vector received from an external radar device, and
  an information for a computation, adjustment or utilization of the another error compensation vector.

14. A radar system comprising a first radar device and a second radar device, wherein the first radar device comprises:
  a first antenna sub-array configured to receive a first plurality of antenna signals;
  a second antenna sub-array configured to receive a second plurality of antenna signals;
  a first signal processing circuit configured to receive the first plurality of antenna signals from the first antenna sub-array and perform processing thereon to form a first digitized antenna data set;
  a second signal processing circuit configured to receive the second plurality of antenna signals from the second antenna sub-array and perform processing thereon to form a second digitized antenna data set;
  a fast fourier transform (FFT) stage, comprising:
    a first, first stage FFT device configured to receive the first digitized antenna data set and output first preliminary processed digitized antenna data;
    a second, first stage FFT device configured to receive the second digitized antenna data set and output second preliminary processed digitized antenna data; and
    a second stage FFT device configured to receive the first and second preliminary processed digitized antenna data and output FFT processed antenna data that contain phase errors therein due to phase errors between the first signal processing circuit and the second signal processing circuit, wherein the output FFT processed antenna data comprise a range/Doppler map for each of a plurality of virtual antennas, and wherein each range/Doppler map comprises FFT peaks;
  wherein the FFT processed antenna data comprises an interim result, and wherein the first radar device is configured to transfer the interim result to the second radar device:
  wherein the second radar device comprises an electronic control circuit configured to calculate an error compensation vector using the FFT processed antenna data from the first radar device, and provide the calculated error compensation vector to the first radar device,
  wherein the electronic control circuit is configured to calculate the error compensation vector using both the interim result and an expected characteristic in the calculating, wherein the expected characteristic is determined based on remote data or an intrinsic signal characteristic of at least one of the reception signals in one or several of a dimensions angle, range and Doppler range;

wherein the first radar device is further configured to apply the calculated error compensation vector to the FFT processed antenna data to generate compensated FFT processed antenna data, and wherein the first radar device is further configured to select one or more FFT peaks from the compensated FFT processed antenna data.

* * * * *